US007710461B2

United States Patent
Nagano et al.

(10) Patent No.: US 7,710,461 B2
(45) Date of Patent: May 4, 2010

(54) IMAGE PROCESSING DEVICE, IMAGE PROCESSING METHOD, AND IMAGE PROCESSING PROGRAM

(75) Inventors: Takahiro Nagano, Kanagawa (JP); Tetsujiro Kondo, Tokyo (JP); Tsutomu Watanabe, Kanagawa (JP); Junichi Ishibashi, Saitama (JP); Hisakazu Shiraki, Kanagawa (JP); Naoki Fujiwara, Tokyo (JP); Masanori Kanemaru, Kanagawa (JP); Shinichiro Kaneko, Tokyo (JP); Yasuhiro Suto, Tokyo (JP)

(73) Assignee: Sony Corporation, Tokyo (JP)

( * ) Notice: Subject to any disclaimer, the term of this patent is extended or adjusted under 35 U.S.C. 154(b) by 484 days.

(21) Appl. No.: 11/722,436

(22) PCT Filed: Dec. 21, 2005

(86) PCT No.: PCT/JP2005/024002

§ 371 (c)(1),
(2), (4) Date: Jun. 21, 2007

(87) PCT Pub. No.: WO2006/068293

PCT Pub. Date: Jun. 29, 2006

(65) Prior Publication Data

US 2008/0259169 A1    Oct. 23, 2008

(30) Foreign Application Priority Data

Dec. 21, 2004    (JP) .............................. 2004-369266

(51) Int. Cl.
*H04N 5/228* (2006.01)
*G06K 9/00* (2006.01)
*H04N 7/12* (2006.01)

(52) U.S. Cl. .............................. 348/208.99; 348/208.4; 348/208.14; 382/103; 382/107; 375/240.01; 375/240.16

(58) Field of Classification Search . 348/208.99–208.6; 382/103, 107; 375/240.01–240.16
See application file for complete search history.

(56) References Cited

U.S. PATENT DOCUMENTS 7,221,778 B2 *    5/2007    Kondo et al. ................ 382/107

(Continued)

FOREIGN PATENT DOCUMENTS

JP    2001 250119    9/2001

(Continued)

OTHER PUBLICATIONS

U.S. Appl. No. 11/793,701, filed Jun. 21, 2007, Nagano, et al.

(Continued)

*Primary Examiner*—Sinh Tran
*Assistant Examiner*—Christopher K Peterson
(74) *Attorney, Agent, or Firm*—Oblon, Spivak, McClelland, Maier & Neustadt, L.L.P.

(57) ABSTRACT

A motion-vector-setting section (31) sets a first motion vector in units of pixel in a target image. An exposure-time-ratio-setting section (32) sets in units of image an exposure time ratio that is a ratio between a time interval of the target image and a period of exposure time. A motion-blur-amount-setting section (33) sets a motion blur amount in units of pixel based on the exposure time ratio and the first motion vector. Based on the motion amount, a processing-region-setting section (36) sets processing regions as well as a processing-coefficient-setting section (37) sets processing coefficients. A pixel-value-generating section (38) generates pixel values that correspond to the target pixel from pixel values in the processing region and the processing coefficients. A motion-blur-adding section (41) adds a motion blur to an image containing the pixel value generated based on an input second motion vector and the first motion vector. An image-moving section (42) moves the motion-blur-added image along a counter vector of the second motion vector. Any more real arbitrary viewpoint image can be generated.

14 Claims, 31 Drawing Sheets

U.S. PATENT DOCUMENTS

2004/0066460 A1* 4/2004 Kondo et al. ............. 348/222.1
2004/0067040 A1* 4/2004 Kondo et al. .................... 386/4
2004/0081335 A1* 4/2004 Kondo et al. ................ 382/107

FOREIGN PATENT DOCUMENTS

JP          2002 373336       12/2002
JP          2003 233817        8/2003

OTHER PUBLICATIONS

U.S. Appl. No. 11/722,450, filed Jun. 21, 2007, Nagano, et al.
U.S. Appl. No. 11/722,141, filed Jun. 19, 2007, Nagano, et al.
U.S. Appl. No. 11/722,460, filed Jun. 21, 2007, Nagano, et al.

* cited by examiner

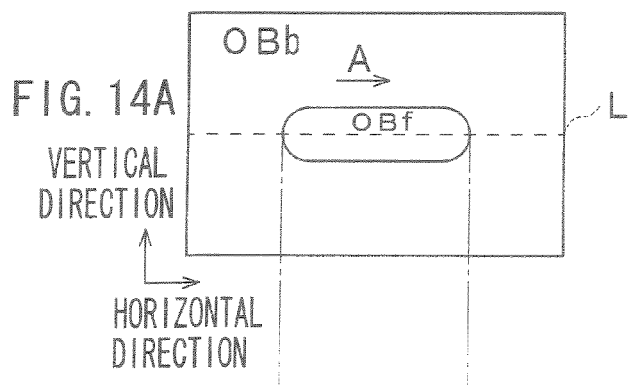
FIG. 14A
VERTICAL DIRECTION
HORIZONTAL DIRECTION
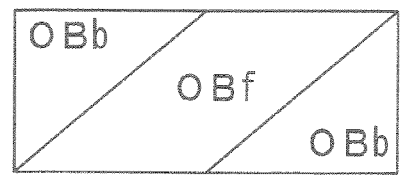
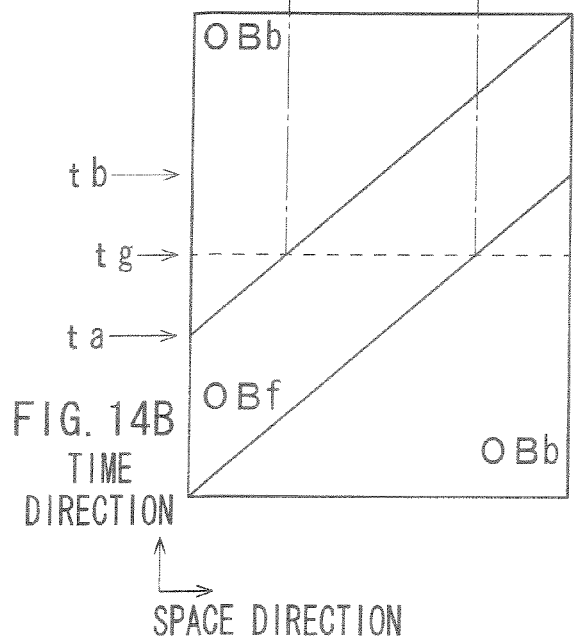
FIG. 14B
TIME DIRECTION
SPACE DIRECTION
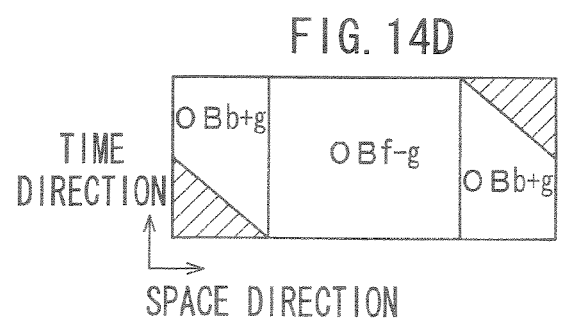
TIME DIRECTION
SPACE DIRECTION
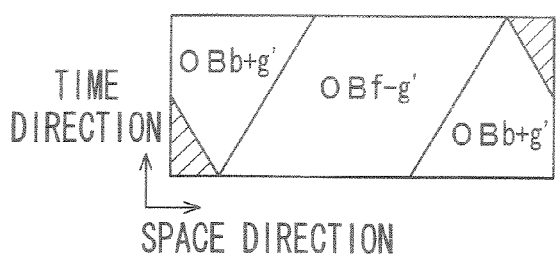
TIME DIRECTION
SPACE DIRECTION

TIME DIRECTION / SPACE DIRECTION

TIME DIRECTION / SPACE DIRECTION

TIME DIRECTION / SPACE DIRECTION

TIME DIRECTION / SPACE DIRECTION

TIME DIRECTION / SPACE DIRECTION

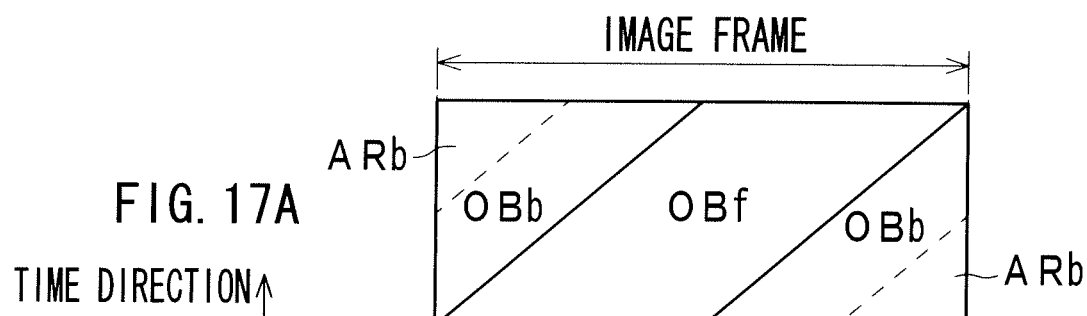
FIG. 17A
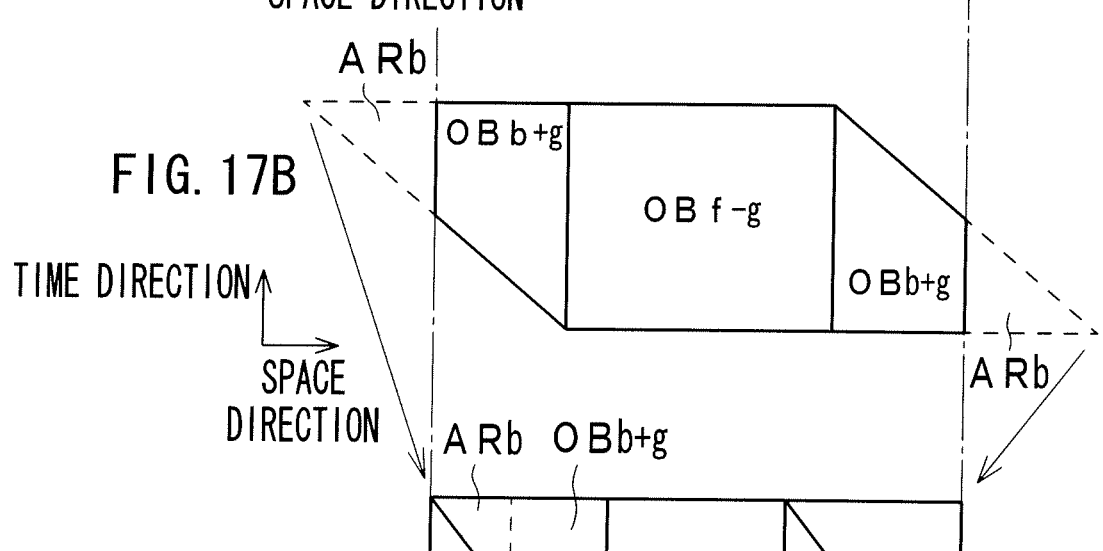
FIG. 17B
FIG. 17C
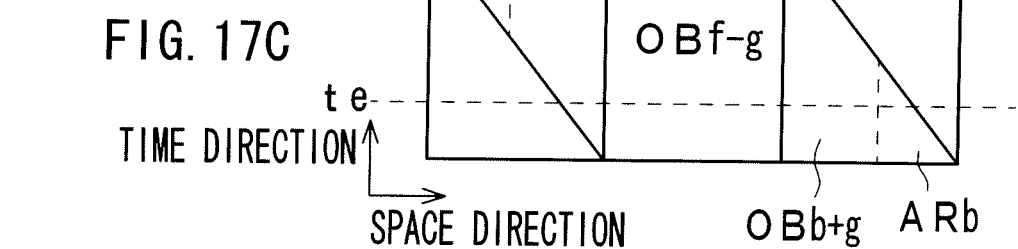
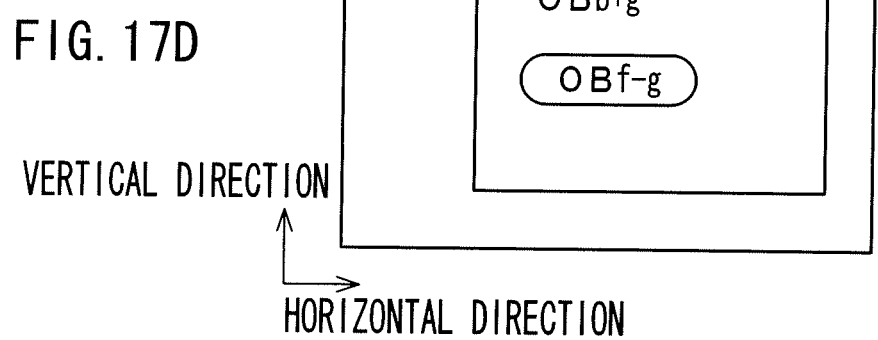
FIG. 17D

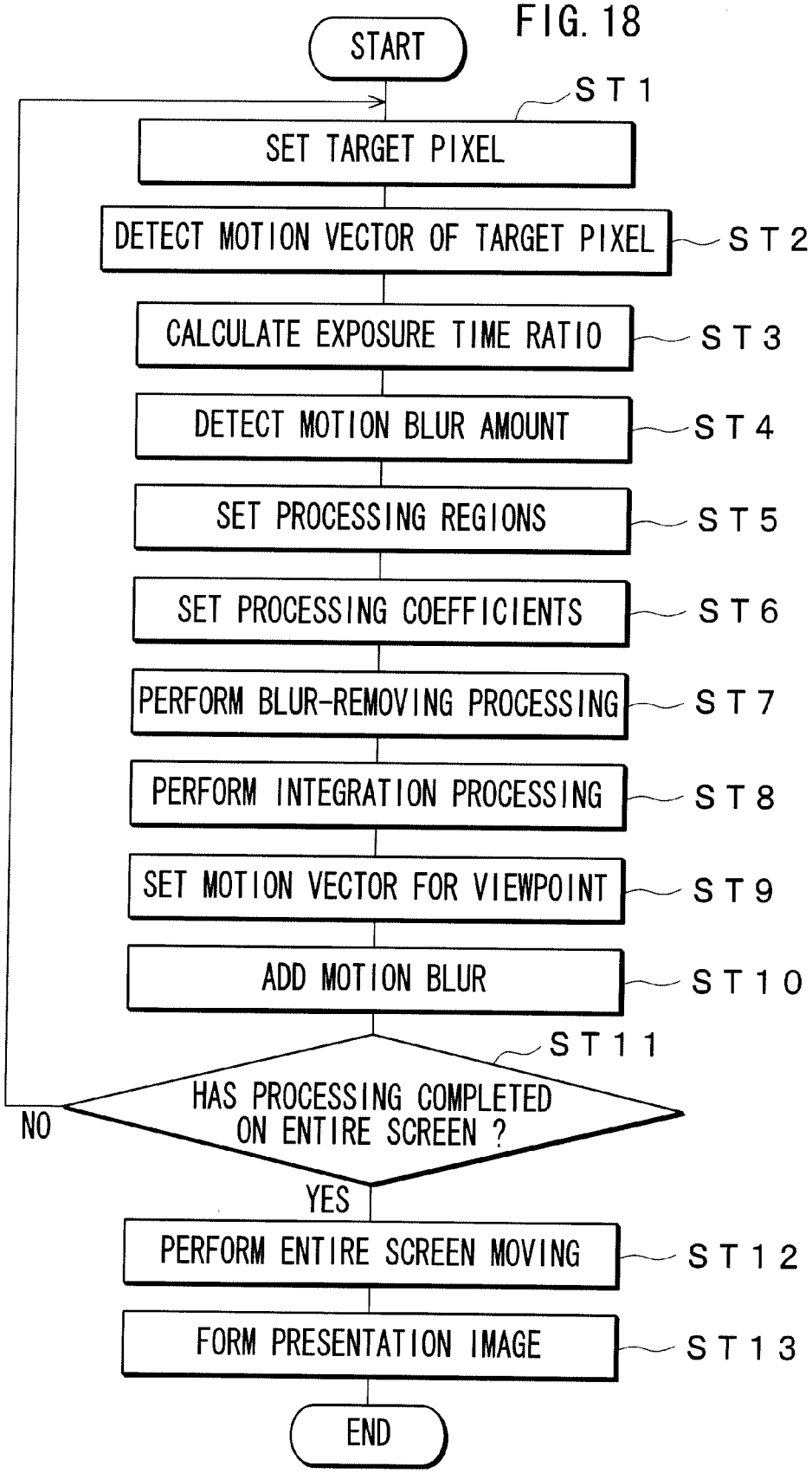

FIG. 21

IMAGE PROCESSING DEVICE, IMAGE PROCESSING METHOD, AND IMAGE PROCESSING PROGRAM

TECHNICAL FIELD

The present invention relates to an image-processing apparatus, an image-processing method, and an image-processing program. More specifically, it performs motion-blur-removing on a target image, adds any motion blurs to the motion-blur-removed image in units of pixel corresponding to a motion vector for a viewpoint, and moves a motion-blur-added target image, to which the motion blurs are added, corresponding to the motion vector for the viewpoint.

BACKGROUND ART

Conventionally, an event in a real world has been converted into data by using a sensor. The data acquired by using the sensor is information that is obtained by projecting information of the real world (e.g., light) onto a space and time having a lower number of dimensions than the real world. Accordingly, the information obtained by projection has distortion that occurs through projection. For example, in the case of imaging, by using a video camera, a moving object in front of a background at rest and converting it into data as an image signal, information of the real world is sampled and converted into data, so that an image which is displayed on the basis of the image signal encounters a motion blur that the moving object blurs as distortion that occurs through projection.

To solve this problem, as disclosed in Japanese Patent Application Publication No. 2001-250119 (Corresponding U.S. patent application Ser. No. 09/830,858, Corresponding EP Patent Application Publication No. EP1164545), for example, by detecting a profile of an image object that corresponds to an object in a foreground contained in an input image, the image object that corresponds to the object in the foreground is coarsely extracted to detect a motion vector of the image object corresponding to the object in the foreground that is coarsely extracted, so that the detected motion vector and its position information may be used to mitigate a motion blur.

Further, an arbitrary viewpoint image has been conventionally generated from any items of data obtained by using sensors. In this generation of arbitrary viewpoint image, a motion vector at a viewpoint position is detected and an entire screen is moved by a motion amount in a direction opposite to a motion direction of the motion vector, so that an image display is enabled with the viewpoint position being fixed. For example, if an image pickup operation is performed with a direction of an image pickup apparatus being fixed when a picked-up image is displayed based on an image signal obtained by the image pickup apparatus, an image in which a moving subject is moved on a screen occurs. Herein, if a viewpoint position is set on the moving subject to generate an image, a motion vector of the moving subject is detected and an entire screen is moved by a motion amount in a direction opposite to a motion direction of the motion vector, thereby enabling an image in which the moving subject is displayed at a fixed position on a screen to be obtained.

DISCLOSURE OF THE INVENTION

By the way, if an image display is performed with the viewpoint position being fixed as described above, an image in which the viewpoint position is fixed but a motion blur occurs is displayed because any motion blur amount occurred at the viewpoint position is not changed, so that it is impossible to display an image in which no motion blur occurs like the image that is picked up following the moving subject.

Further, in the case of using any motion-blur-removing processing to perform the motion blur removing on a moving subject, any motion blur does not occur at a still portion, for example, a background portion, so that it is impossible to generate an image in which the motion blur occurs at the background portion like the image that is picked up following the moving subject.

An image-processing apparatus according to the invention comprises a motion-vector-setting section that sets a first motion vector in units of pixel in a target image, an exposure-time-ratio-setting section that sets in units of image an exposure time ratio that is a ratio between a time interval of the target image and a period of exposure time, a motion-blur-amount-setting section that sets a motion blur amount in units of pixel based on the first motion vector set in units of pixel in the motion-vector-setting section and the exposure time ratio set in the exposure-time-ratio-setting section, a processing-region-setting section that sets a processing region corresponding to a target pixel in the target image based on the motion blur amount set in the motion-blur-amount-setting section and a motion direction corresponding to the first motion vector, a processing-coefficient-setting section that sets a specific processing coefficient based on the motion blur amount set in the motion-blur-amount-setting section or sets a processing coefficient that corresponds to the motion blur amount and the motion direction of the target pixel, a pixel-value-generating section that generates a pixel value that corresponds to the target pixel by linear combination of a new pixel value for processing generated corresponding to the motion direction from the pixel value corresponding to the pixel in the processing region and the specific processing coefficient set in the processing-coefficient-setting section or by linear combination of the pixel value corresponding to the pixel in the processing region and the processing coefficient set corresponding to the motion blur amount and the motion direction, a motion-blur-adding section that adds a motion blur in units of pixel to an image containing the pixel value generated by the pixel-value-generating section based on an input second motion vector and the first motion vector, and an image-moving section that moves the motion-blur-added target image, to which motion-blur-adding section adds a motion blur, along a counter vector of the second motion vector.

It also comprises a target-pixel-setting section that sets a target pixel in a target image to be predicted, a motion-vector-setting section that sets a motion vector corresponding to an image containing the input target pixel, a processing-region-setting section that sets a processing region containing a pixel in the peripheral images whose space positions roughly agree with that of the target pixel, a processing-coefficient-setting section that sets a specific processing coefficient based on the motion blur amount corresponding to the motion vector or sets a processing coefficient that corresponds to the motion blur amount and the motion direction that correspond to the motion vector, a pixel-value-generating section that generates a pixel value that corresponds to the target pixel by linear combination of a new pixel value for processing generated corresponding to the motion direction from the pixel value corresponding to the pixel in the processing region and the specific processing coefficient set in the processing-coefficient-setting section or by linear combination of the pixel value corresponding to the pixel in the processing region and the processing coefficient set corresponding to the motion blur amount and the motion direction, and an image-moving section that moves a processed image containing the pixel value generated in the pixel-value-generating section along a counter vector of the input motion vector.

An image-processing method according to the invention comprises a motion-vector-setting step of setting a first motion vector in units of pixel in a target image, an exposure-time-ratio-setting step of setting in units of image an exposure time ratio that is a ratio between a time interval of the target image and a period of exposure time, a motion-blur-amount-setting step of setting a motion blur amount in units of pixel based on the first motion vector set in units of pixel in the motion-vector-setting step and the exposure time ratio set in the exposure-time-ratio-setting step, a processing-region-setting step of setting a processing region corresponding to a target pixel in the target image based on the motion blur amount set in the motion-blur-amount-setting step and a motion direction corresponding to the first motion vector, a processing-coefficient-setting step of setting a specific processing coefficient based on the motion blur amount set in the motion-blur-amount-setting step or setting a processing coefficient that corresponds to the motion blur amount and the motion direction of the target pixel, a pixel-value-generating step of generating a pixel value that corresponds to the target pixel by linear combination of a new pixel value for processing generated corresponding to the motion direction from the pixel value corresponding to the pixel in the processing region and the specific processing coefficient set in the processing-coefficient-setting step or by linear combination of the pixel value corresponding to the pixel in the processing region and the processing coefficient set corresponding to the motion blur amount and the motion direction, a motion-blur-adding step of adding a motion blur in units of pixel to an image containing the pixel value generated by the pixel-value-generating step based on an input second motion vector and the first motion vector, and an image-moving step of moving the motion-blur-added target image, to which a motion blur is added in the motion-blur-adding step, along a counter vector of the second motion vector.

It also comprises a target-pixel-setting step of setting a target pixel in a target image to be predicted, a motion-vector-setting step of setting a motion vector corresponding to an image containing the input target pixel, a processing-region-setting step of setting a processing region containing a pixel in the peripheral images whose space positions roughly agree with that of the target pixel, a processing-coefficient-setting step of setting a specific processing coefficient based on the motion blur amount corresponding to the motion vector or setting a processing coefficient that corresponds to the motion blur amount and the motion direction that correspond to the motion vector, a pixel-value-generating step of generating a pixel value that corresponds to the target pixel by linear combination of a new pixel value for processing generated corresponding to the motion direction from the pixel value corresponding to the pixel in the processing region and the specific processing coefficient set in the processing-coefficient-setting step or by linear combination of the pixel value corresponding to the pixel in the processing region and the processing coefficient set corresponding to the motion blur amount and the motion direction, and an image-moving step of moving a processed image containing the pixel value generated in the pixel-value-generating step along a counter vector of the input motion vector.

An image-processing program according to the invention allows a computer to perform a motion-vector-setting step of setting a first motion vector in units of pixel in a target image, an exposure-time-ratio-setting step of setting in units of image an exposure time ratio that is a ratio between a time interval of the target image and a period of exposure time, a motion-blur-amount-setting step of setting a motion blur amount in units of pixel based on the first motion vector set in units of pixel in the motion-vector-setting step and the exposure time ratio set in the exposure-time-ratio-setting step, a processing-region-setting step of setting a processing region corresponding to a target pixel in the target image based on the motion blur amount set in the motion-blur-amount-setting step and a motion direction corresponding to the first motion vector, a processing-coefficient-setting step of setting a specific processing coefficient based on the motion blur amount set in the motion-blur-amount-setting step or setting a processing coefficient that corresponds to the motion blur amount and the motion direction of the target pixel, a pixel-value-generating step of generating a pixel value that corresponds to the target pixel by linear combination of a new pixel value for processing generated corresponding to the motion direction from the pixel value corresponding to the pixel in the processing region and the specific processing coefficient set in the processing-coefficient-setting step or by linear combination of the pixel value corresponding to the pixel in the processing region and the processing coefficient set corresponding to the motion blur amount and the motion direction, a motion-blur-adding step of adding a motion blur in units of pixel to an image containing the pixel value generated by the pixel-value-generating step based on an input second motion vector and the first motion vector, and an image-moving step of moving the motion-blur-added target image, to which a motion blur is added in the motion-blur-adding step, along a counter vector of the second motion vector.

It also allows a computer to perform a target-pixel-setting step of setting a target pixel in a target image to be predicted, a motion-vector-setting step of setting a motion vector corresponding to an image containing the input target pixel, a processing-region-setting step of setting a processing region containing a pixel in the peripheral images whose space positions roughly agree with that of the target pixel, a processing-coefficient-setting step of setting a specific processing coefficient based on the motion blur amount corresponding to the motion vector or setting a processing coefficient that corresponds to the motion blur amount and the motion direction that correspond to the motion vector, a pixel-value-generating step of generating a pixel value that corresponds to the target pixel by linear combination of a new pixel value for processing generated corresponding to the motion direction from the pixel value corresponding to the pixel in the processing region and the specific processing coefficient set in the processing-coefficient-setting step or by linear combination of the pixel value corresponding to the pixel in the processing region and the processing coefficient set corresponding to the motion blur amount and the motion direction, and an image-moving step of moving a processed image containing the pixel value generated in the pixel-value-generating step along a counter vector of the input motion vector.

In the present invention, the exposure time ratio that is a ratio between a time interval of the target image and a period of exposure time is set in units of pixel and then, the motion blur amount is set in units of pixel based on the exposure time ratio and the first motion vector set in units of pixel in the target image. The processing region corresponding to a target pixel in the target image is set based on the motion blur amount and the first motion vector. The processing coefficients corresponding to the motion blur amount or the motion blur amount and the motion direction are then set, so that pixel values that correspond to the target pixel are generated by the pixel values corresponding to the pixels in the processing region and the set processing coefficients. Further, a pixel value corresponding to the target pixel is generated for each image and the generated pixel values are integrated to obtain a single pixel value. To an image containing the single pixel value, a motion blur is added based on an input second motion vector and the first motion vector or the exposure time ratio, so that the motion-blur-added target image, to which a motion blur is added, is moved along a counter vector of the second motion vector.

By using motion-blur-added peripheral images, in which a motion blur is added to peripheral mages which are images before and after the target image in time, a fixed value or an image that stays out of an image frame by moving the motion-blur-added target image, a presentation image is formed by means of interpolation on a portion containing no pixel value when presenting the motion-blur-added target image. Additionally, a frame memory larger than the target image is provided, so that the motion-blur-added target image moved along the counter vector of the second motion vector is consecutively stored therein including pixel values that stay out of the image frame by the target image.

EFFECTS OF THE INVENTION

According to the present invention, the exposure time ratio that is a ratio between a time interval of the target image and a period of exposure time is set in units of pixel and then, the motion blur amount is set in units of pixel based on the exposure time ratio and the first motion vector set in units of pixel in the target image. The processing region corresponding to a target pixel in the target image is set based on the motion blur amount and the first motion vector. The processing coefficients corresponding to the motion blur amount or the motion blur amount and the motion direction are then set, so that the pixel values that correspond to the target pixel are generated by the pixel values corresponding to the pixels in the processing region and the set processing coefficients. Further, a motion blur is added based on an input second motion vector and the first motion vector, so that the motion-blur-added target image, to which a motion blur is added, is moved along a counter vector of the second motion vector.

Accordingly, it is possible to generate any real world information from which any distortion is removed, from a motion blur image that undergoes the distortion by the image sensor and to reconstruct an image that could be picked up again at a viewpoint based on the second motion vector to which this real world information is given from an outside. By setting a viewpoint so as to be the main item from the motion vectors in a screen, it is also possible to reconstruct an image as if it can be newly looked down, not the viewpoint of the camera.

The motion blur is added based on the exposure time ratio, so that if any shutter operations are performed, it is also possible to add the motion blur corresponding to the shutter operation. If the motion-blur-added target image is moved by the image-moving means to generate a portion, which contains no pixel value, a presentation image is formed by means of interpolation on this portion. For example, by storing motion-blur-added peripheral images, to which a motion blur is added to the peripheral images that are before and after the target image in time, and by acquiring pixel values for the portion containing no pixel value from the motion-blur-added peripheral images, any interpolation is executed on peripheries of the motion-blur-added target image. Alternatively, a pixel value of the portion containing no pixel value is set to a fixed value. A pixel value of pixel that stays out of an image frame by moving the motion-blur-added target image and the portion, which contains no pixel value are folded back, and it is allocated to the portion containing no pixel value. Such the execution of interpolation prevents any noise image or the like from being displayed on the portion containing no pixel value.

Further, a frame memory larger than the target image is provided, and a pixel value that stays out of an image frame by the target image in the motion-blur-added target image moved along a counter vector of the second motion vector is also consecutively stored in the frame memory, so that if an image stored in the frame memory is displayed in a reduced way corresponding to a size of the displayed image, the image that stays out of the image can be displayed.

Since the pixel value corresponding to the target pixel is generated for each image and the generated pixel values are integrated so that they can be output as the single pixel value by using, for example, plural images in a time direction, it is possible to perform the motion-blur-removing accurately, by utilizing any steady of the real world information in the time direction thereof.

Further, by setting a target pixel in a target image to be predicted, a motion vector corresponding to an image containing the input target pixel, a processing region containing pixels whose special positions of the peripheral images agree with that of the target pixel, and the processing coefficients based on the motion vector, the pixel value corresponding to the target pixel is generated by the pixel values corresponding to the pixels in the processing region and the processing coefficients, so that a processed image containing the generated pixel values is moved along a counter vector of the input motion vector. Thus, when no shutter operation is performed, an image signal indicative of the real world information, from which any distortion is removed, can be easily generated, a well as it is possible to reconstruct an image as if it could be picked up again at a viewpoint of the motion vector to which this real world information is given from an outside.

BRIEF DESCRIPTION OF THE DRAWINGS

FIGS. 14A through 14E are diagrams each for explaining operations of image-moving section;

FIGS. 17A through 17D are diagrams each for explaining other operations of the presentation-image-forming section;

FIG. 18 is a flowchart for showing image-processing;

FIG. 21 is an explanatory chart of operations for selecting a prediction tap discretely;

BEST MODE FOR CARRYING OUT THE INVENTION

Figure 1:
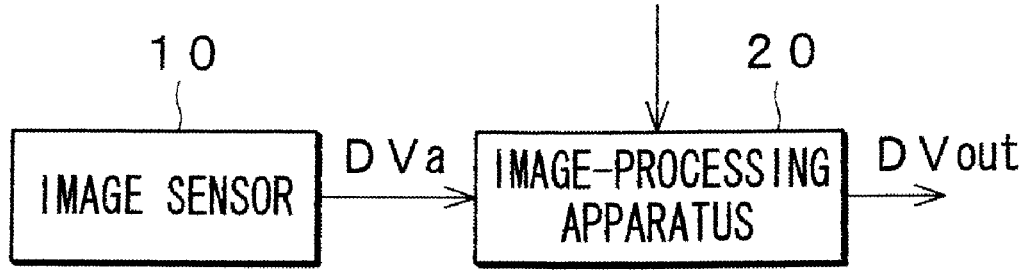
FIG. 1 is a diagram for showing a system configuration.

The following will describe embodiments of the present invention with reference to drawings. FIG. 1 is a block diagram for showing a configuration of a system to which the present invention is applied. An image sensor 10 generates an image signal DVa by picking up an image of a real society to supply it to an image-processing apparatus 20. The image-processing apparatus 20 extracts information embedded in the supplied image signal DVa of an input image to generate an image signal DVout from which the embedded information is extracted and outputs it. It is to be noted that the image-processing apparatus 20 is also configured so that it can extract the information embedded in the image signal DVa by using a variety of pieces of information ET supplied from an outside.

Figure 2:
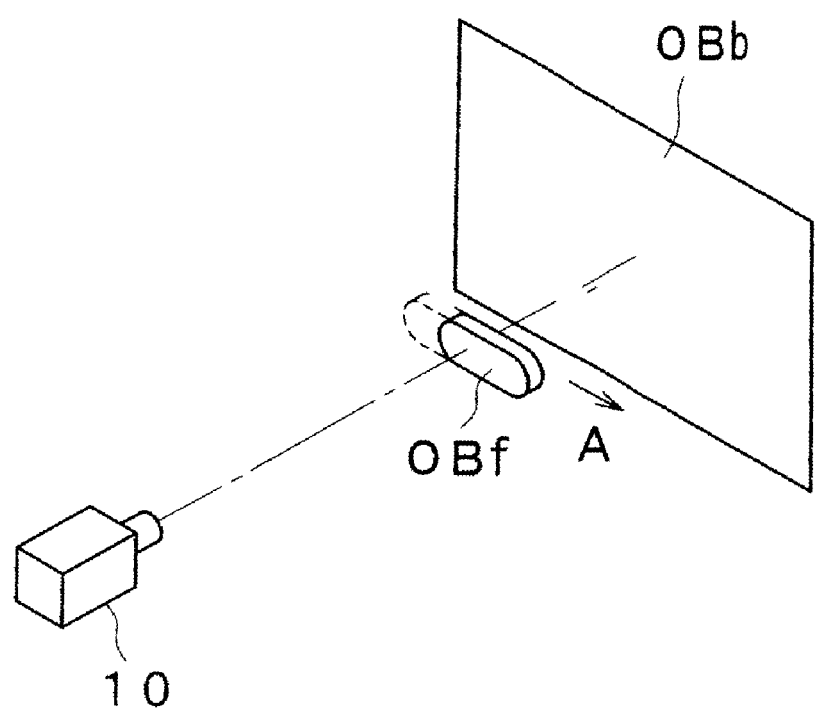
FIG. 2 is an illustration for explaining how an image sensor picks up an image.

The image sensor 10 is constituted of a video camera or the like that is equipped with a charge-coupled device (CCD) area sensor and an MOS area sensor, which are a solid-state image pick-up device, and picks up an image of a real society. For example, as shown in FIG. 2, when a moving object OBf that corresponds to a foreground is moving in a direction of an arrow A between the image sensor 10 and an object OBb that corresponds to a background, the image sensor 10 picks up an image of the moving object OBf that corresponds to the foreground together with an image of the object OBb that corresponds to the background.

A detection element in the image sensor 10 converts any input light into charges during a period of time corresponding to a period of exposure time and accumulates thus photo-electrically converted charges. A quantity of the charges is roughly proportional to an intensity of the input light and a period of time when the light is being input. During the period of time corresponding to the period of exposure time, the detection element adds charges converted from the input light to already accumulated charges. In other words, during the period of time corresponding to the period of exposure time, the detection element integrates the input light and accumulates a quantity of charges that corresponds to the integrated light. The detection element may be also said to have an integration effect on time. By, thus, performing photo-electric conversion by the image sensor, the input light is converted into charges for each pixel, which are accumulated for each unit of the period of exposure time. A pixel signal is generated in accordance with the quantity of thus accumulated charges and then, by using this pixel signal, an image signal having a desired frame rate is generated, which is supplied to the image-processing apparatus. It is to be noted that the period of exposure time for the image sensor is a period of time when, as described above, the image sensor converts the input light into charges and accumulates them in the detection element, which is equal to an image time interval (e.g., a period of time for one frame) in a case where the shutter is not operated. It is also equal to a period of shutter-open time in a case where the shutter is operated.

Figure 3:
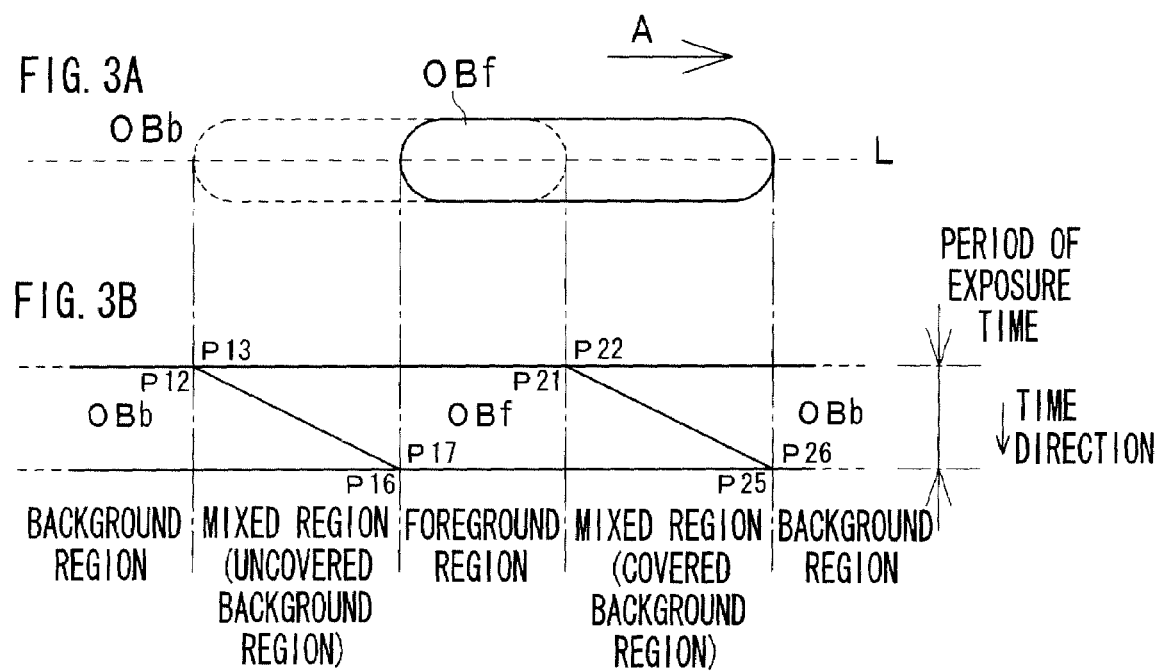
FIGS. 3A and 3B are diagrams each for explaining a picked-up image.

FIGS. 3A and 3B are diagrams each for explaining a picked-up image represented by an image signal. FIG. 3A shows an image obtained by picking up an image of a moving object OBf that corresponds to the moving foreground and an image of an object OBb that corresponds to the still background. It is to be noted that the moving object OBf that corresponds to the foreground is supposed to be moving horizontally in a direction of an arrow A.

FIG. 3B shows a relationship between the image and time at a position on line L, which is indicated by broken lines, extending in the direction of the arrow A as shown in FIG. 3A. If a length of the moving object OBf in its motion direction on the line L is, for example, nine pixels and the moving object OBf moves as much as five pixels in one period of exposure time, its front end and rear end that have stayed at pixel positions P21 and P13 at the beginning of a period of frame period move to pixel positions P25 and P17 at the end of the period of exposure time, respectively. Further, if the shutter is not operated, a period of exposure time for one frame is equal to one period of frame time, so that the front end and the rear end move to pixel positions P26 and P18, respectively, at the beginning of the next period of frame time.

Accordingly, in the period of frame time on the line L, a portion up to pixel position P12 and a portion from pixel position P26 each provide a background region that is constituted of a background component only. A portion between the pixels positions P17 and P21 provides a foreground region constituted of a foreground component only. A portion between the pixel positions P13 and P16 and a portion between the pixel positions P22 and P25 each provide a mixed region in which a foreground component and a background component are mixed. The mixed regions are classified into a covered background region in which a background component is covered by a foreground as time elapses and an uncovered background region in which a background component appears as time elapses. It is to be noted that in FIG. 3B, a mixed region positioned on the front end side of the foreground object OBf in its traveling direction provides a covered background region and a mixed region positioned on its rear end side in its traveling direction provides an uncovered background region. Thus, an image signal contains an image that includes a foreground region, background regions, or a covered background region or an uncovered background region.

Figure 4:
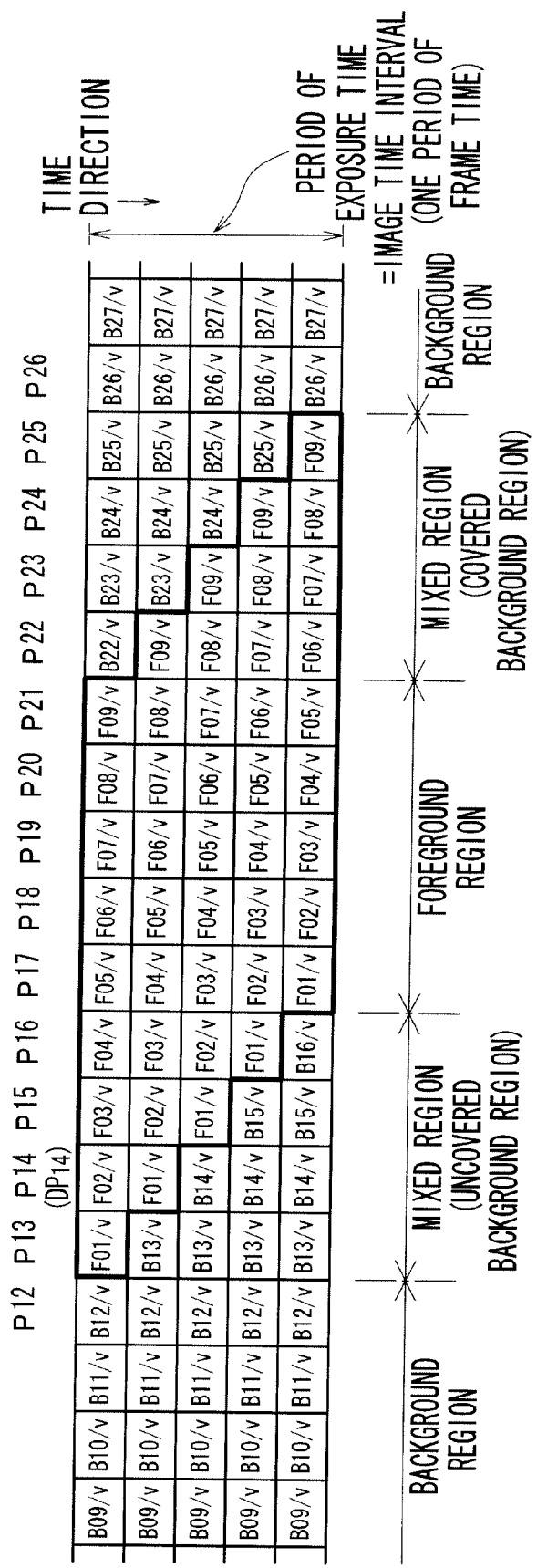
FIG. 4 is an explanatory chart of operations for dividing pixel values in a time direction.

Herein, on the assumption that an image time interval is short and that the moving object OBf that corresponds to the foreground is a rigid body and moves with uniform speed, operations for dividing pixel values on the line L time-directionally are performed as shown in FIG. 4. In these operations for time-directional division, a pixel value is developed in the time direction and divided by a virtual divisor into equal time intervals. It is to be noted that in FIG. 4, a vertical axis represents time, to indicate that time elapses downward in the figure.

The virtual divisor is set to one corresponding to a motion amount v or the like of a moving object in an image time interval. For example, if the motion amount v in one period of frame time corresponds to five pixels as described above, the virtual divisor is set to "5" corresponding to the motion amount v, to divide one period of frame time into five equal time intervals.

Further, pixel values, during one period of frame time, of pixel position Px obtained when the object OBb that corresponds to the background is picked up are supposed to be Bx and pixel values obtained at the pixels when the moving object OBf having a nine-pixel length on the line L, which corresponds to the foreground, is picked up with it being at rest are supposed to be F09 (on the front end side) through F01 (on the rear end side).

In this case, for example, pixel value $DP_{14}$ at pixel position P14 is given by Equation 1:

$$DP_{14}=B14/v+B14/v+B14/v+F01/v+F02/v \quad (1)$$

At this pixel position P14, three virtual time dividends (a period of frame time/v) of the background component and two virtual time dividends of the foreground component are contained and so, a mixture ratio α of the background component with respect to the pixel values is 3/5. Similarly, for example, at pixel position P22, one virtual time dividend of the background component and four virtual time dividends of the foreground component are contained and so, a mixture ratio α therewith is 1/5.

Figure 5:
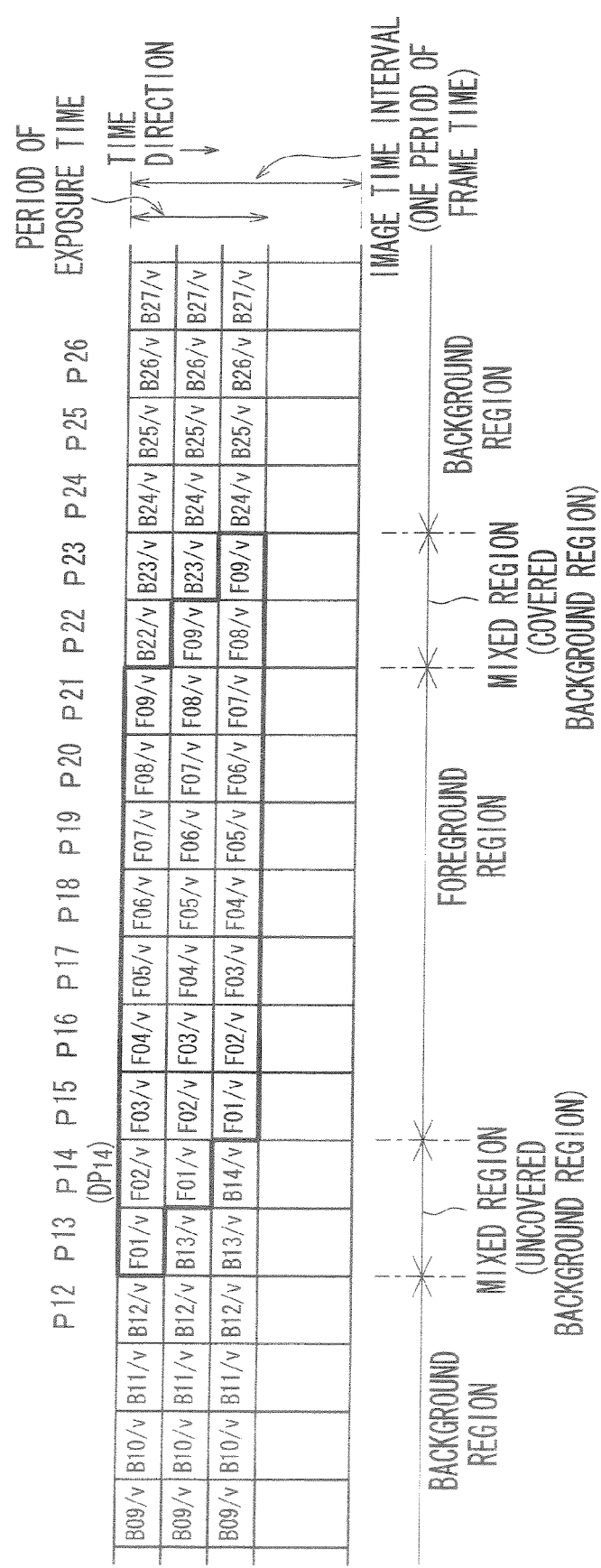
FIG. 5 is an explanatory chart of operations for dividing pixel values in a time direction when a shutter is operated.

Further, if the shutter is operated to change an exposure time ratio indicative of a ratio of a period of exposure time with respect to one period of frame time, for example, if the exposure time ratio is changed to 3/5, as shown in FIG. 5, operations to divide pixel values time-directionally in one period of frame time are performed, so that the pixel values can be divided by a virtual divisor in accordance with the exposure time ratio into equal time intervals.

The virtual divisor is set to one corresponding to a motion amount v or the like of a moving object in an image time interval. For example, if the motion amount v in one period of frame time is as long as five pixels as described above, the virtual divisor is set to "5" corresponding to the motion amount v, to divide one period of frame time into five equal time intervals.

In this case, for example, pixel value $DP_{14}$ at pixel position P14 is given by Equation 2:

$$DP_{14}=B14/v+F01/V+F02/v \quad (2)$$

At this pixel position P14, one virtual time dividend (a period of frame time/v) of the background component and two virtual time dividends of the foreground component are contained and so, a mixture ratio α is 1/3. Similarly, for example, at pixel position P22, one virtual time dividend of the background component and two virtual time dividends of the foreground component are contained and so, a mixture ratio α is 1/3.

If the shutter is operated, by multiplying an exposure time ratio with a motion amount v in one period of frame time, the motion amount in a period of exposure time can be calculated.

Thus, since foreground components move, different foreground components are added within one period of exposure time, so that a foreground region corresponding to a moving object contains a motion blur. Accordingly, the image-processing apparatus 20 extracts significant information that has been embedded in an image signal, to generate the image signal DVout in which the motion blur of the moving object OBf that corresponds to the foreground is mitigated.

Figure 6:
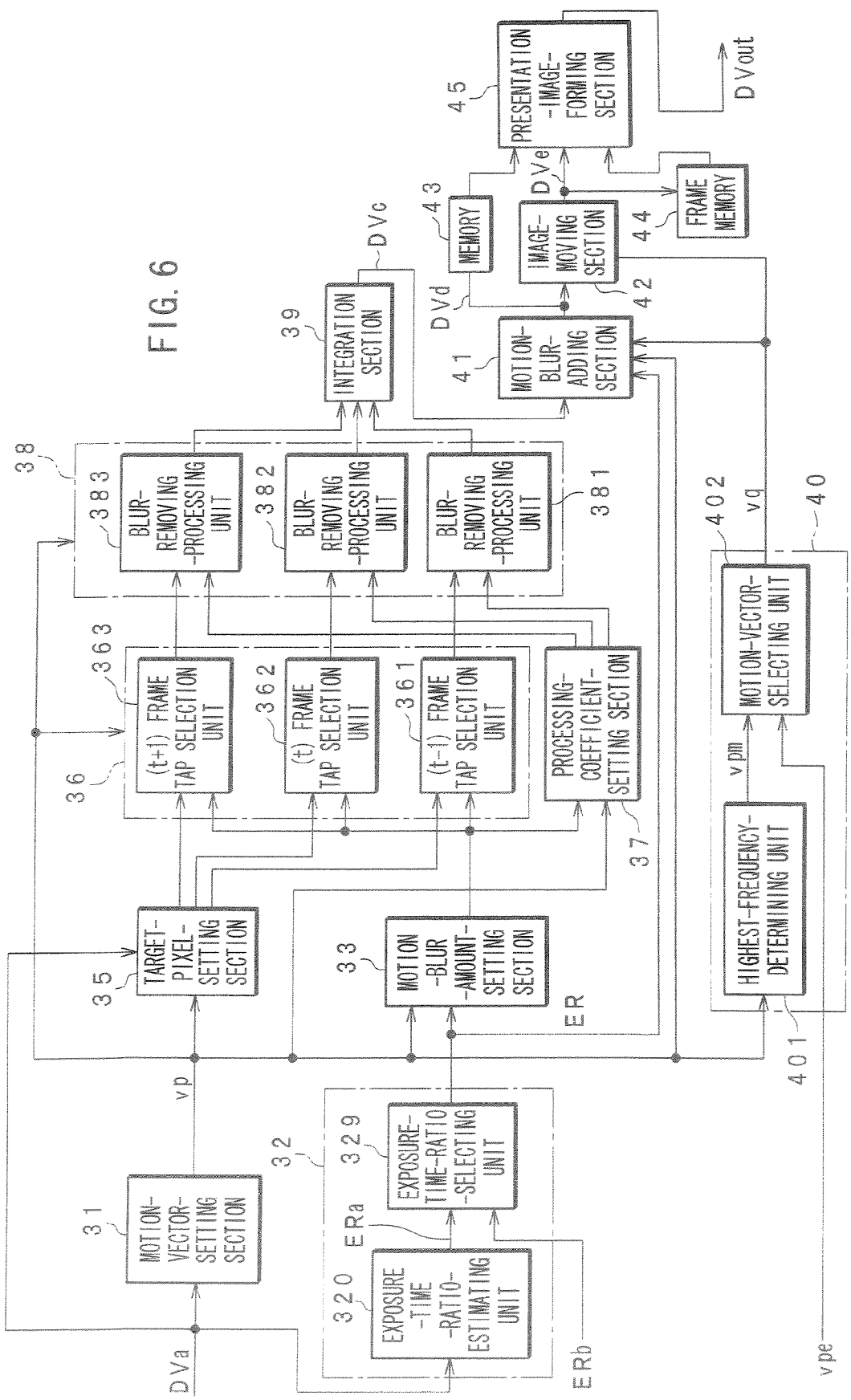
FIG. 6 is a functional block diagram of an image-processing apparatus.

FIG. 6 is a functional block diagram of the image-processing apparatus. It is to be noted that functions of the image-processing apparatus may be realized by hardware or software. In other words, the function blocks of FIG. 6 may be realized by either hardware or software.

Figure 7:
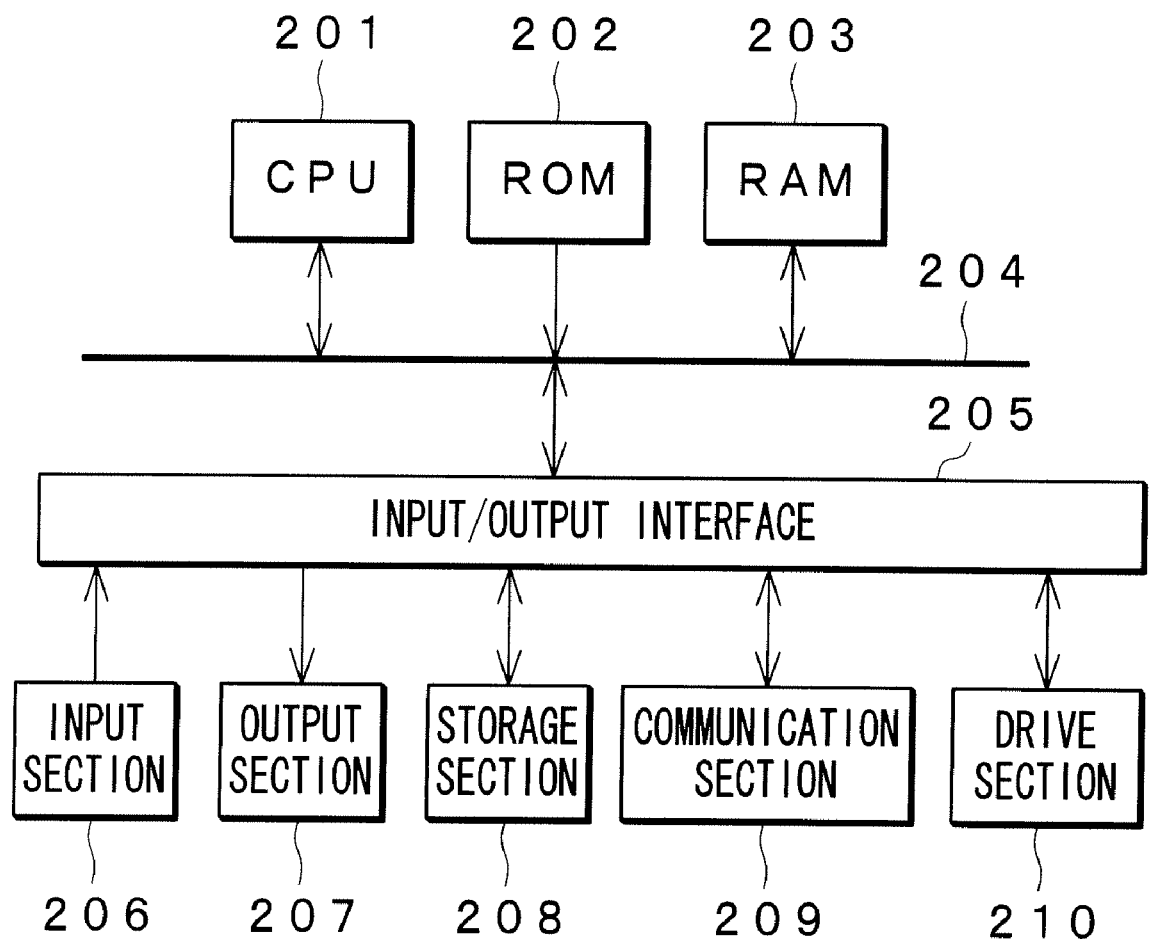
FIG. 7 is a diagram for showing a configuration of the image-processing apparatus in a case where software is used.

A configuration of the image-processing apparatus 20 in use of the software is shown in, for example, FIG. 7. A central processing unit (CPU) 201 performs various kinds of processing in accordance with programs stored in a read only memory (ROM) 202 or a storage section 208, and the programs to realize the functions of the image-processing apparatus are stored in the ROM 202 and the storage section 208. A random access memory (RAM) 203 appropriately stores a program or data which is executed by the CPU 201. The CPU 201, the ROM 202, and the RAM 203 are connected to each other via a bus 204.

To the CPU 201, an input/output interface 205 is further connected via the bus 204. An input section 206 constituted of a keyboard, a mouse, or a microphone and an output section 207 constituted of a display or a speaker are connected to the input/output interface 205. The CPU 201 performs various kinds of processing in accordance with commands input from the input section 206. Then, the CPU 201 provides the output section 207 with an image, an audio, etc. obtained as a result of the processing.

The storage section 208 connected to the input/output interface 205 is constituted of, for example, a hard disk, to store programs and various kinds of data to be run by the CPU 201. A communication section 209 communicates with an external apparatus via the Internet or any other network. In this example, the communication section 209 serves as an acquisition section that takes in an output of the sensor. It may also acquire programs via the communication section 209 and store them in the storage section 208.

A drive section 210 connected to the input/output interface 205, if mounted with a storage medium such as a magnetic disk, an optical disk, a magnetic optical disk, or a semiconductor memory, drives them to acquire program or data stored in the storage medium. The acquired programs and data are transferred to the storage section 208 and stored in it as necessary.

As shown in FIG. 6, an image signal DVa of input image, which is received by the image-processing apparatus 20, is supplied to a motion-vector-setting section 31, an exposuretime-ratio-estimating unit 320 of an exposure-time-ratio-setting section 32, and a target-pixel-setting section 35.

The motion-vector-setting section 31 detects motion vector for each pixel in the target image based on the image signal DVa and sets it as a first motion vector vp. It also supplies the target-pixel-setting section 35, the motion-blur-amount-setting section 33, the processing-region-setting section 36, the processing-coefficient-setting section 37, the pixel-value-generating section 38, and a viewpoint-setting section 40 with the set motion vector vp. In the motion-vector-setting section 31, a method such as a block-matching method or a gradient method is used to detect the motion vector for each pixel. Herein, the target image refers to as an image in which motion-blur removing processing is executed among input images supplied to the image-processing-apparatus 20, and the target pixel refers to as a pixel in which the motion-blur-removing processing is executed in the target image.

The exposure-time-ratio-estimating unit 320 of the exposure-time-ratio-setting section 32 estimates an exposure time ratio ER indicative of a ratio of a period of exposure time with respect to an image interval in a target image for each image. This exposure time ratio ER can be set by using, for example, a technology disclosed in Japanese Patent Application Publication No. 2003-6648.

Figure 8:
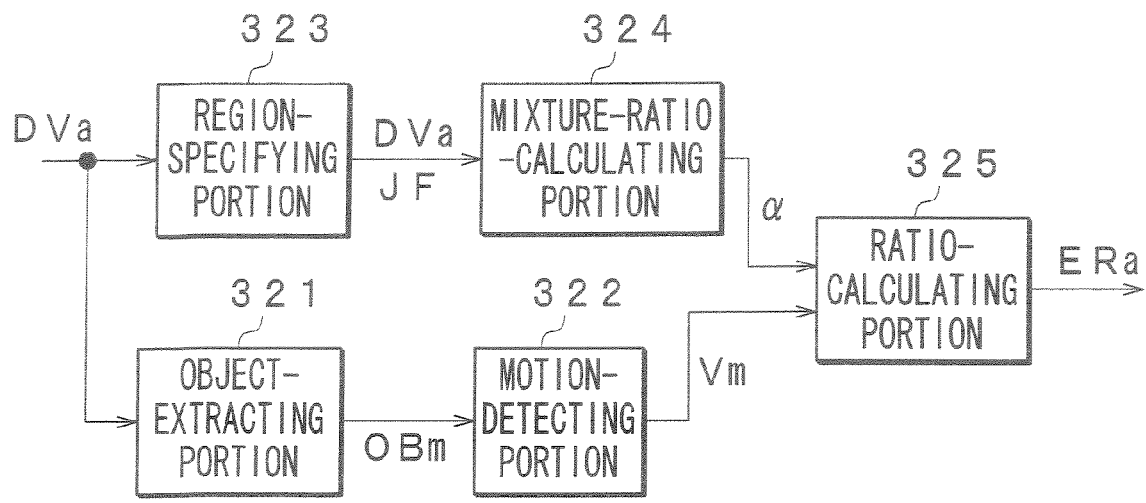
FIG. 8 is a functional block diagram of an exposure-time-ratio-estimating unit.

FIG. 8 is a functional block diagram of the exposure-time-ratio-estimating unit 320. An object-extracting portion 321 of the exposure-time-ratio-estimating unit 320 coarsely extracts an image object OBm corresponding to a moving object included in the target image based on the image signal DVa and supplies the extracted image object OBm to a motion-detecting portion 322. For example, by detecting a profile of an image object that corresponds to a moving object in a foreground as described above, the image object is coarsely extracted and supplied to the motion-detecting portion 322. It is to be noted that the image object OBm means an image corresponding to an object in the real world to be subject by imaging.

Further, the object-extracting portion 321 may coarsely extract the image object OBm corresponding to the moving object in the foreground from difference between a background image stored in a background memory installed inside and the target image, for example.

The motion-detecting portion 322 detects, by using the above-mentioned motion-vector-detection methods, a motion amount vm of an inter-frame motion vector of the coarsely extracted image object OBm and supplies it to a ratio-calculating portion 325. Further, when plural moving image objects are included, the motion-detecting portion 322 obtains the inter-frame motion vector for each image object and determines the motion amount vm of one inter-frame motion vector from the obtained plural inter-frame motion vectors by using any statistical methods. As the statistical methods, a simple averaging method, a weighted averaging method in which objects are weighted according to their display area or display position and then, averaged, and a median method, etc. can be employed.

A region-specifying portion 323 specifies a foreground region that is moving portion, a background region that is still portion, and a covered background region and uncovered background region that are mixed regions, in the target image and supplies a mixture-ratio-calculating portion 324 with region information JF indicative of a specified result thereof.

Figure 9:
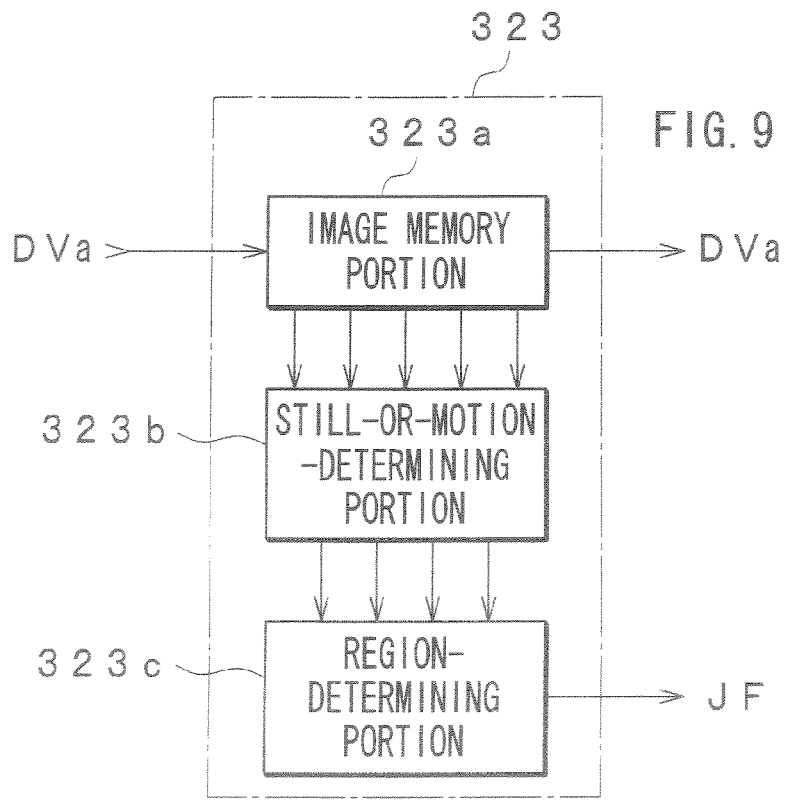
FIG. 9 is a functional block diagram of region-specifying unit.

FIG. 9 is a functional block diagram of the region-specifying portion 323. An image memory portion 323a stores the input image signal DVa in units of frame. The image memory portion 323a stores, if supposing an image of a (t) frame to be a target image, images of (t−2) frame that is a second previous frame before (t) frame, (t−1) frame that is a first previous frame before (t) frame, (t) frame, (t+1) frame that is a first following frame after (t) frame, and (t+2) frame that is a second following frame after (t) frame.

A still-or-motion-determining portion 323b obtains an absolute value of difference between frames for each two consecutive frames to determine whether the absolute value of difference between frames is more than a predetermined threshold value Th or not, and it determines to be motion one if the absolute value of difference between frames is more than a predetermined threshold value Th or to be still one if the absolute value of difference between frames is not more than a predetermined threshold value Th.

Figure 10:
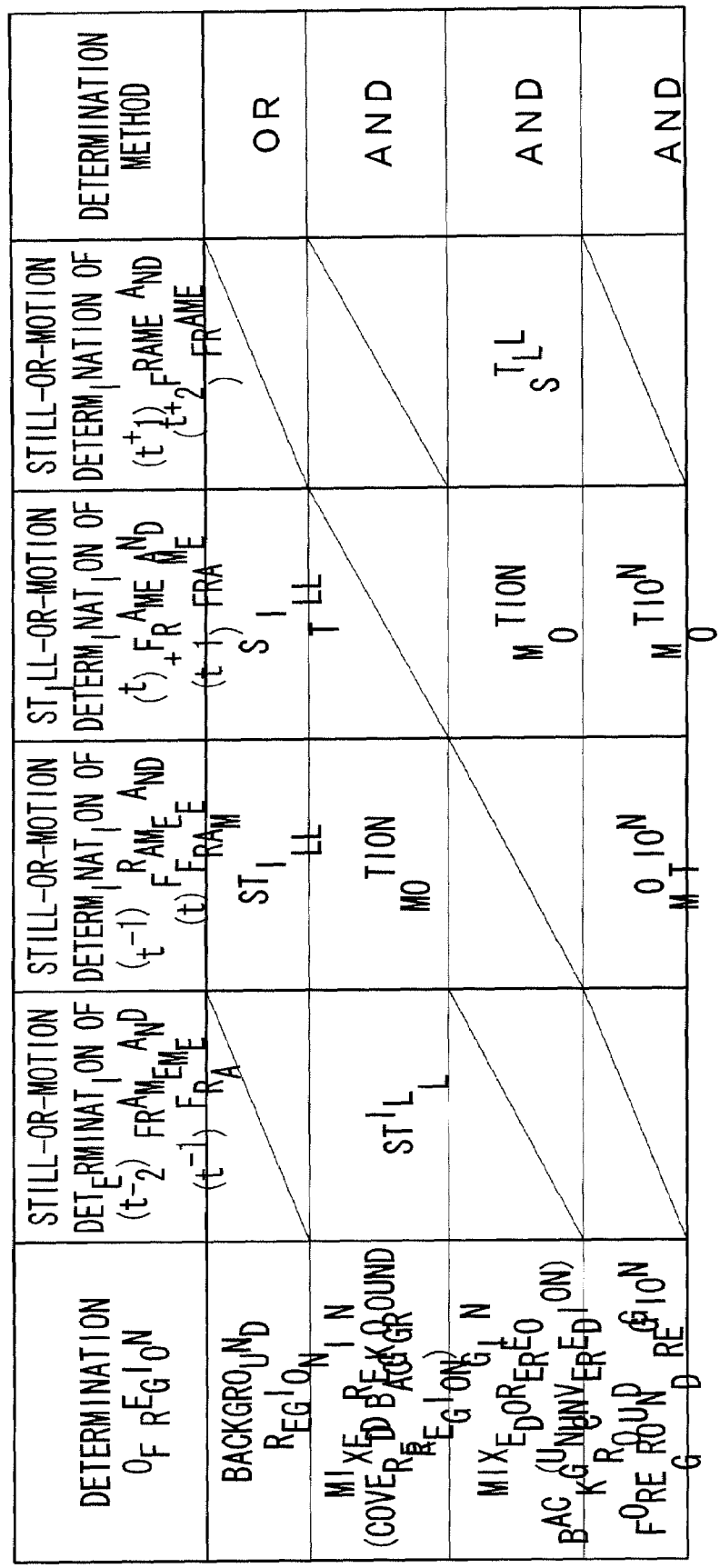
FIG. 10 is a diagram for explaining region-determining processing.

A region-determining portion 323c performs a region-determining processing as shown in FIG. 10 which of a foreground region, a background region, a covered background region that is mixed region or an uncovered background region that is mixed region, a pixel belongs to, by using a determined result obtained in the still-or-motion-determining portion 323b.

For example, first, a pixel that is a still one according to a still-or-motion-determining result of (t−1) frame and (t) frame is determined to be a pixel belonged to the background region. A pixel that is a still one according to a still-or-motion-determining result of (t) frame and (t+1) frame is also determined to be a pixel belonged to the background region. Next, a pixel that is a still one according to a still-or-motion-determining result of (t−2) frame and (t−1) frame and that is a motion one according to a still-or-motion-determining result of (t−1) frame and (t) frame is determined to be a pixel belonged to the covered background region. Further, a pixel that is a motion one according to a still-or-motion-determining result of (t) frame and (t+1) frame and that is a still one according to a still-or-motion-determining result of (t+1) frame and (t+2) frame is determined to be a pixel belonged to the uncovered background region. Thereafter, a pixel that is a motion one according to a still-or-motion-determining result of (t−1) frame and (t) frame and that is a motion one according to a still-or-motion-determining result of (t) frame and (t+1) frame is determined to be a pixel belonged to the foreground region.

The mixture-ratio-calculating portion 324 calculates a mixture ratio $\alpha$ based on the image signal DVa and the region information JF that is supplied from the region-specifying portion 323, and supplies the ratio-calculating portion 325 with the calculated mixture ratio $\alpha$. This mixture ratio $\alpha$ is a value indicative of a ratio of background components with respect to the pixel value, as described above.

Figure 11:
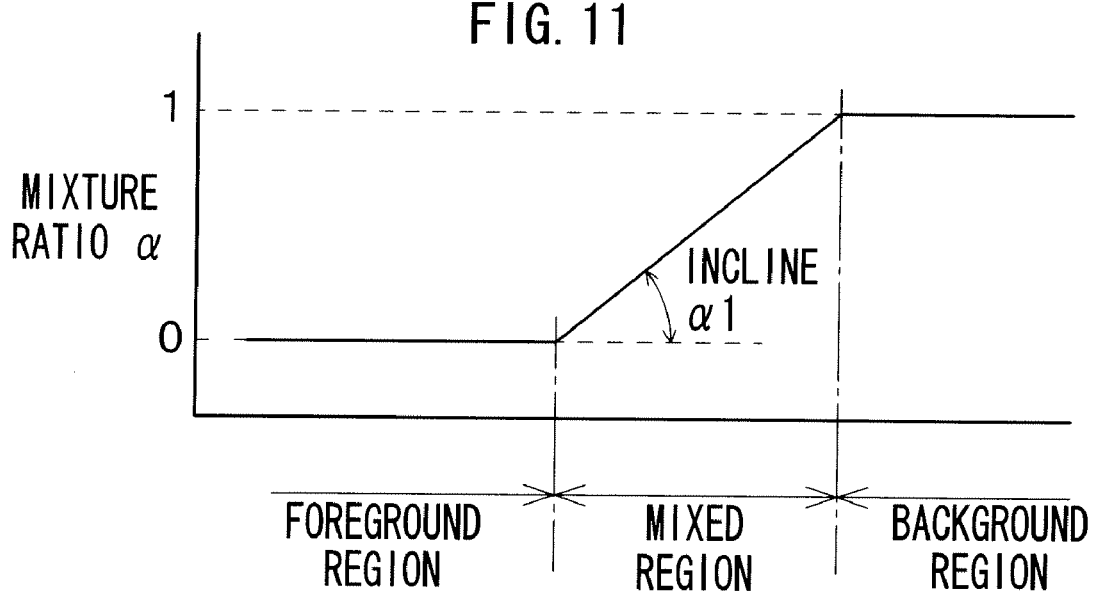
FIG. 11 is a diagram for showing a most suitable mixture ratio.

Herein, by supposing that an object corresponding to the foreground moves uniformly during a period of exposure time, the mixture ratio $\alpha$ of pixel belonged to the mixed region varies linearly, corresponding to a change in the pixel position. For example, in a case where the change in the pixel position is one-dimensional one, a variation of the mixture ratio $\alpha$ is represented by a straight line. Further, on the assumption that a period of time of one frame is short and thus, an object that corresponds to the foreground is a rigid body and moves with uniform speed, an incline of the mixture ratio $\alpha$ indicates to an inverse ratio of a motion amount of the foreground within a period of exposure time. It is to be noted that if mixture ratios $\alpha$ of plural mixed regions are calculated to calculate the plural mixture ratios $\alpha$, one mixture ratio $\alpha$ is determined by utilizing the above-mentioned statistical methods. It is to be noted that FIG. 11 indicates an ideal mixture ratio $\alpha$, in which mixture ratio $\alpha=0$ in the foreground while mixture ratio $\alpha=1$ in the background. An incline $\alpha 1$ of the mixture ratio α in the mixed region indicates an inverse of the motion amount vs in the period of exposure time.

The ratio-calculating portion 325 calculates an inverse of the incline α1 in the mixed region based on the mixture ratio α received from the mixture-ratio-calculating portion 324, to obtain the motion amount within a period of exposure time. Further, it divides the motion amount within a period of exposure time by a motion amount vm of inter-frame motion vector received from the motion-detecting portion 322 to estimate an exposure time ratio ERa indicative of a ratio of the period of exposure time with respect to the target image interval and supply it to an exposure-time-ratio-selecting unit 329.

The exposure-time-ratio-selecting unit 329 receives an exposure time ratio ERb from an outside and selects any one of the exposure time ratio Era supplied from the exposure-time-ratio-estimating unit 320 and the exposure time ratio ERb supplied from the outside to supply the motion-blur-amount-setting section 33 and the motion-blur-adding section 41 with it as an exposure-time ratio ER.

The motion-blur-amount-setting section 33 multiplies a motion amount of the motion vector vp received from the motion-vector-setting section 31 for each pixel by the exposure time ration ER supplied from the exposure-time-ratio-setting section 32 to calculate a motion blur amount MBp for each pixel and supplies it to the processing-region-setting section 36 and the processing-coefficient-setting section 37.

The target-pixel-setting section 35 sets a plurality of images to be processed, which include a target image, detects pixels on the images to be processed whose space positions correspond to a target pixel Pna in the target image based on the image motion vp set by the motion-vector-setting section 31, and sets the detected pixel as a target pixel in each of the images to be processed. It also supplies the processing-region-setting section 36 with the plurality of images to be processed in each of which the target pixel is set.

For example, if supposing an image of a (t) frame to be a target image, images of (t−1), (t), and (t+1) frames are set to images to be processed. In this case, based on the motion vector vp, pixels on images of the (t−1) frame and (t+1) frame corresponding to the target pixel Pna in the target image are set as target pixels. Moreover, an image to be processed in the (t) frame is supplied to a (t) frame tap selection unit 362 of the processing-region-setting section 36; an image to be processed in the (t−1) frame in which the target pixel is set is supplied to a (t−1) frame tap selection unit 361; and an image to be processed in the (t+1) frame in which the target pixel is set is supplied to a (t+1) frame tap selection unit 363, respectively.

It to be noted that if the target pixel Pna in the target image is moved by the motion vector vp in the (t+1) frame, by moving an image of the (t+1) frame back by the motion vector vp, a position of the target pixel in the target image agrees with that of target pixel in the post-movement (t+1) frame, thereby enabling processing regions to be easily set in the processing-region-setting section 36.

Further, a reference target image is not limited to an image of the (t) frame but may be an image of the (t−1) or (t+1) frame. Moreover, with reference to setting any pixel in the target image as a target pixel, the target pixel is specified from the outside or pixels in the target image are sequentially specified automatically as the target pixel. This enables motion-blur-removing processing to be performed only on a desired pixel or to be automatically performed on an entirety of the target image. Further, by specifying a range from an outside and sequentially specifying pixels in the range as the target pixel automatically, it is possible to perform motion-blur-removing processing on a desired range.

The (t−1) frame tap selection unit 361 of the processing-region-setting section 36 sets a processing region that corresponds to a target pixel in the image to be processed, which is supplied from the target-pixel-setting section 35, based on the motion blur amount MBp set in the blur-amount-setting section 33 and a motion direction corresponding to the motion vector vp supplied from the motion-vector-setting section 31. Further, it supplies a blur-removing-processing unit 381 of the pixel-value-generating section 38 with pixel values in the processing region.

Figure 12:
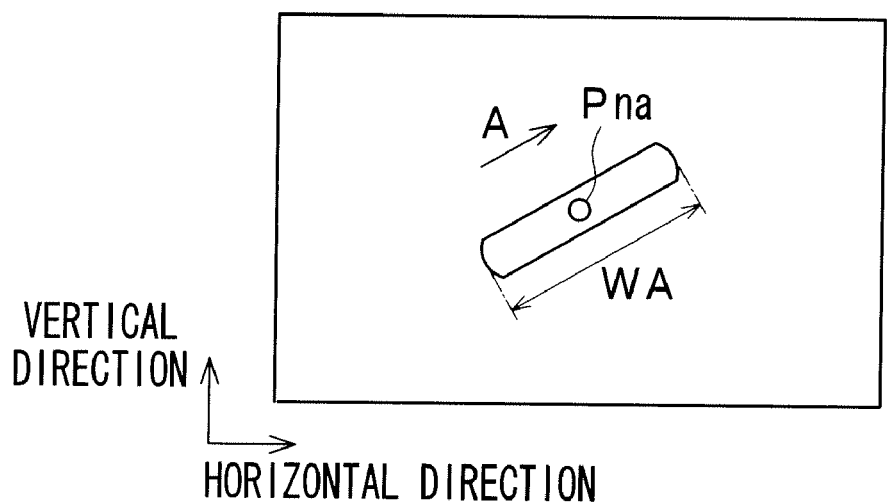
FIG. 12 is a diagram for explaining a processing region in a space direction.

FIG. 12 shows a processing region in a space direction, in which a processing region WA is set so that a width thereof can be increased in a motion direction, centering on the target pixel Pna if there is a large amount of motion blur along a direction shown as an arrow A that is the motion direction.

Figure 13:
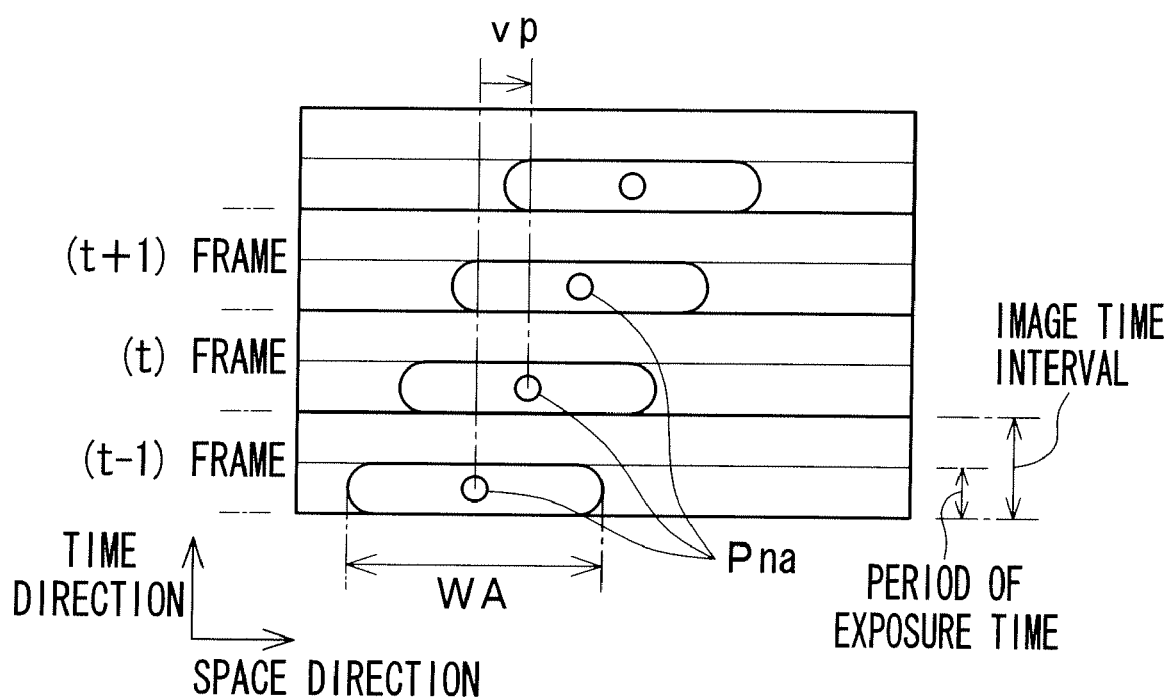
FIG. 13 is a diagram for showing processing regions in a time direction.

As in the case of the (t−1) frame tap selection unit 361, the (t) frame tap selection unit 362 and the (t+1) frame tap selection unit 363 also set processing regions, respectively, in accordance with the motion blur amount MBp set in the blur-amount-setting section 33 and the motion direction corresponding to the motion vector vp supplied from the motion-vector-setting section 31, on the basis of the target pixel in each of the images to be processed supplied from the target-pixel-setting section 35, respectively. It is to be noted that FIG. 13 shows processing regions in a time direction, in which processing regions of the time-wise shifted frames have widths each of which is identical to that of the processing region in a space direction determined by motion blur amount but the center positions thereof are respectively shifted by an amount of motion vector vp.

The (t) frame tap selection unit 362 supplies the pixel values in the processing region to a blur-removing-processing unit 382. The (t+1) frame tap selection unit 363 also supplies the pixel values in the processing region to a blur-removing-processing unit 383.

The processing-coefficient-setting section 37 is constituted of a memory, in which specific processing coefficients corresponding to motion blur amount MBp or processing coefficients corresponding to the motion blur amount MBp and the motion direction corresponding to the motion vector vp are stored beforehand. If setting the motion direction to a specific direction and storing the specific processing coefficients which are generated corresponding to the motion blur amount MBp, the processing-coefficient-setting section 37 reads out of the memory the specific processing coefficients that correspond to the motion blur amount MBp supplied from the blur-amount-setting section 33 and supplies them to the blur-removing-processing units 381, 382, and 383, thereby setting the processing coefficients. Alternatively, if storing the processing coefficients based on the motion blur amount MBp and the motion direction corresponding to the motion vector vp, it reads out of the memory the processing coefficients that correspond to the motion blur amount MBp supplied from the blur-amount-detecting section 33 and the motion direction based on the motion vector vp supplied from the motion-vector-setting section 31 and supplies them to the blur-removing-processing units 381, 382, and 383, thereby setting the processing coefficients.

The blur-removing-processing unit 381 in the pixel-value-generating section 38 performs any calculation processing by using the pixel values in the processing region supplied from the (t−1) frame tap selection unit 361 and the processing coefficients supplied from the processing-coefficient-setting section 37, to generate a blur-removed pixel value and supply it to an integration section 39. The blur-removing-processing unit 382 performs any calculation processing by using the pixel values in the processing region supplied from the (t) frame tap selection unit 362 and the processing coefficients supplied from the processing-coefficient-setting section 37, to generate a blur-removed pixel value and supply it to the integration section 39. The blur-removing-processing unit 383 performs any calculation processing by using the pixel values in the processing region supplied from the (t+1) frame tap selection unit 363 and the processing coefficients supplied from the processing-coefficient-setting section 37, to generate a blur-removed pixel value and supply it to the integration section 39. Herein, when reading the processing coefficients out of the processing-coefficient-setting section 37 corresponding to the motion blur amount MBp and the motion direction, the motion direction agrees with a direction of the processing region. Therefore, the blur-removed pixel values corresponding to the target pixel are generated by linear combination of the pixel values corresponding to the pixels in the processing regions and the set processing coefficients. Alternatively, when reading the specific processing coefficients corresponding to the motion blur amount MBp, pixel values of the pixel positions (hereinafter, referred to as "pixel values for processing) to be linear-combined with the processing coefficients are generated from the pixel values corresponding to the pixels in the processing regions by means of interpolation or the like, so that the blur-removed pixel values corresponding to the target pixel are generated by linear combination of the pixel values for processing and the read-out specific processing coefficients.

The integration section 39 integrates the pixel values supplied from the blur-removing-processing units 381 to 383 to output an image signal DVc of a motion-blur-removed target image as a pixel value of a target pixel in the motion-bur-removed target image. In the integration of the pixel values, any statistical processing is assumed to be used. For example, a simple averaging method, a weighted averaging method, and a median filter method, etc. can be employed. Herein, by the weighted averaging method, an average value is calculated by weighting, for example, 2:6:2 to pixel values of the (t−1) frame: pixel values of the (t) frame: pixel values of the (t+1) frame.

By using the motion vector vp for each pixel supplied from the motion-vector-setting section 31, a highest-frequency-determining unit 401 of a viewpoint-setting section 40 determines whether the motion vector vpm has the highest frequency of number of pixels having the same motion vector and supplies it to a motion-vector-selecting unit 402.

The motion-vector-selecting unit 402 receives the motion vector vpe for setting the viewpoint from an outside. The motion-vector-selecting unit 402 selects any one from the motion vector vpe supplied from the outside and the motion vector vpm supplied from the highest-frequency determining unit 401 to supply the motion-blur-adding section 41 and an image-moving section 42 with it as a motion vector vq for a viewpoint. Selection of the motion vector vq for the viewpoint is executed based on how arbitrary viewpoint image is to be generated. For example, if a viewpoint image is generated so that a moving object OBf corresponding to a foreground as described above stays in a fixed position on a displayed image, the motion vector vpm is selected and supplied to the motion-blur-adding section 41 and the image-moving section 42 as the motion vector vq for the viewpoint. If a user's desired viewpoint image is generated, the motion vector vpe supplied from the outside is supplied to the motion-blur-adding section 41 and the image-moving section 42 as the motion vector vq for the viewpoint. In this moment, by changing a motion direction and a motion amount of the motion vector vpe, it is possible to generate an arbitrary viewpoint image.

The motion-blur-adding section 41 obtains difference between the motion vector vp and the motion vector vq for the viewpoint for each pixel and calculates a relative motion vector corresponding to a new viewpoint. Moreover, it multiplies the relative motion vector with the exposure time ratio ER set in the exposure-time-ratio-setting section 32 to calculate blur amount MBs for each pixel. Further, it adds a motion blur corresponding to the calculated blur amount MBs to an image signal DVc supplied from the integration section 39 to generate an image signal DVd of a motion-blur-added target image and supplied it to the image-moving section 42 and a memory 43.

The image-moving section 42 entire-screen-moves the motion-blur-added target image along a counter vector of the motion vector vq for the viewpoint, namely, a vector having its motion direction opposite to a motion direction of the motion vector vq for the viewpoint and its motion amount identical to a motion amount of the motion vector vq for the viewpoint, based on the motion vector vq for the viewpoint supplied from the viewpoint-setting section 40, and supplies a frame memory 44 and a presentation-image-forming section 45 with an entire-screen-moved image signal DVe. Accordingly, when the viewpoint-setting section 40 selects, for example, the motion vector vpm to supply the image-moving section 42 with it as the motion vector vq for the viewpoint, an entire screen is moved so that a pixel position of the motion vector determined to be the highest frequency can be fixed. Alternatively, if a user inputs a motion vector vpe for setting a viewpoint into the image-processing apparatus 20 and supplies it to the motion-moving section 42 as the motion vector vq for the viewpoint, the entire screen can be moved so that a pixel position of the desired motion can be fixed.

The memory 43 stores the image signal DVd of the motion-blur-added target image. Alternatively, the frame memory 44 has a size for storage more than that of the target image, so that it can store the image signal DVe of the motion-blur-added target image that has been moved by the image-moving section 42, which includes a portion thereof that stays out of an image frame.

The presentation-image-forming section 45 forms and outputs an image signal DVout of presentation image by using the image signal DVe of the motion-blur-added target image that has been moved, and the image signals of the images stored in the memory 43 and the frame memory 44.

FIGS. 14A through 14E are diagrams each for explaining operations of the image-moving section. As shown in the above-described FIG. 2, when picking up the moving object OBf, the picked-up image as shown in FIG. 14A is obtained. Moreover, if the moving object OBf moves in a horizontal direction shown as an arrow A, a position of the moving object OBf on a line position L on a screen moves as shown in FIG. 14B as time elapses. It is to be noted that an image shown in FIG. 14A corresponds to a picked-up image at a point of time tg shown in FIG. 14B.

If images from a point of time ta to a point of time tb are presented over and over, as shown in FIG. 14C, the moving object OBf moves from a left end of the screen to a right end thereof. If the motion vector vpe for setting a viewpoint that has a motion amount identical to that of the motion vector vpm but has a motion direction opposite to that of the motion vector vpm is input and this motion vector vpe is set as the motion vector vq for the viewpoint, the motion-blur-adding section 41 performs motion-blur-adding processing that corresponds to the difference between the motion vector vp and the motion vector vq for the viewpoint. Therefore, on the moving object OBf, the difference therein is defined so as to be zero, so that any motion blur is not added thereto but a motion blur identical to that of a case where the object OBb corresponding to a background is moved based on a motion vector vpe is added to the object OBb. This object OBb to which the motion blur is added is indicated as an object OBb+g.

The image-moving section 42 moves an image based on the motion vector vq for the viewpoint supplied from the viewpoint-setting section 40. Accordingly, if a position of moving object OBf in the picked-up image at a point of time tg is set as a criterion, as shown in FIG. 14D, the moving object OBf is fixed at a middle portion of the screen so that it can be displayed as a still object OBf-g from which any motion blurs are removed. Background portions are also done as objects OBb+g moving in a direction opposite to that of a motion of the moving object OBf, in which any motion blur occurs, based on the motion vector vq for the viewpoint. If thus presenting processed results of a desired time extent over and over when a user can set a start frame to start the presentation, a period of presentation time, any image position is set as a middle portion thereof and the like, it is possible to perform any user's desired presentation image. It is to be noted that in FIGS. 14A through 14E, FIGS. 15A through 15D as well as FIGS. 16A through 16E, which will be described later, slant line portions indicate portions in which no pixel value is presented.

A motion amount of the motion vector vpe for setting the viewpoint is set to a half of a motion amount of the motion vector vpm and its motion direction is set to a contrary direction thereof, as shown in FIG. 14E, a moving object OBf moves from left in a screen to right therein and an object OBb corresponding to a background moves from right in a screen to left therein, so that a moving object OBf-g' and objects OBb+g', to which any motion blurs are added according to their motions, can be displayed. Thus, by inputting the motion vector vpe for setting the viewpoint, it is possible to display images in which viewpoints are changed in a more realistic manner.

Figure 15A:
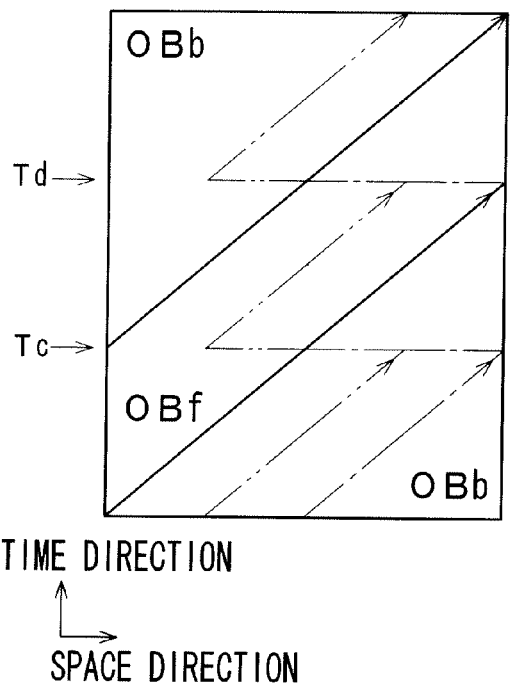
FIGS. 15A through 15D are diagrams each for explaining other operations of the image-moving section.
Figure 15B:
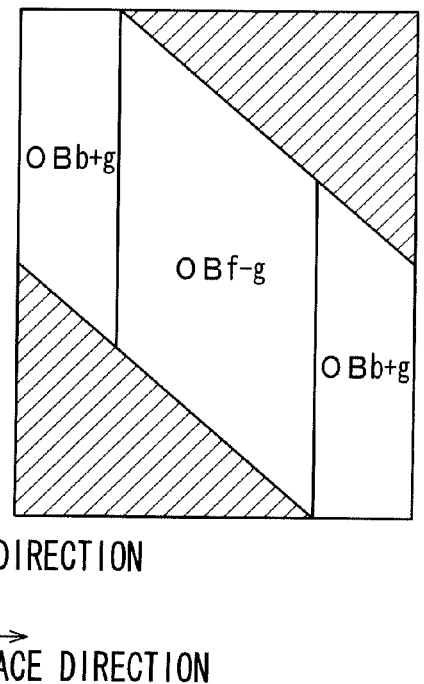
Figure 15C:
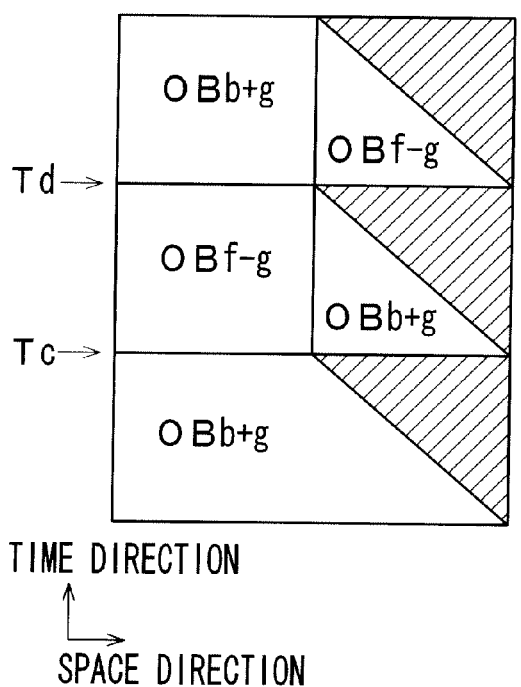
Figure 15D:
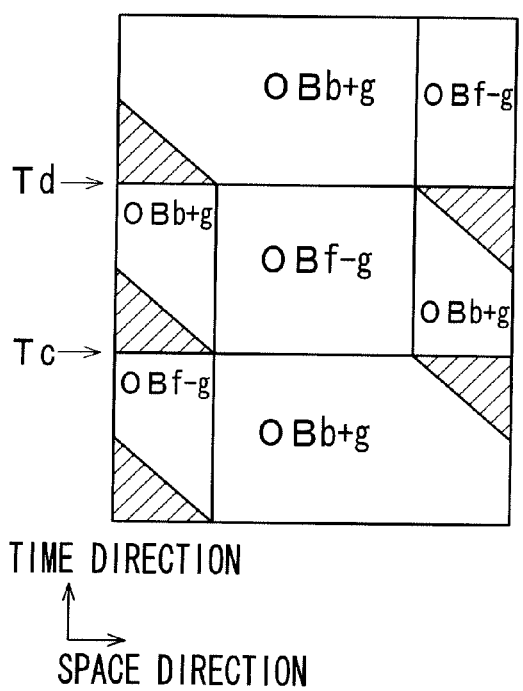

By the way, if a period of time on the presentation image is not limited to that period of time from a point of time ta to a point of time tb when a viewpoint is changed in the picked-up image as shown in FIG. 15A so that the moving object OBf, from which any motion blurs are removed, can be fixed at a middle portion of the screen, regions of images to be displayed on a screen are decreased when moving objects OBf-g stay at right and left ends in a screen, as shown in FIG. 15B. Accordingly, as shown by alternate long and short dash lines in FIG. 15A, processing proceeds up to a case where reference position of the viewpoint stays out of an image frame and the reference position of the viewpoint is switched at a point of time tc or td when the reference position of the viewpoint becomes out of an image frame. If the reference position of the viewpoint is thus switched, as shown in FIG. 15C, regions of image to be displayed on a screen are prevented from being decreased even when moving objects OBf-g stay at right and left ends in a screen. Moreover, as shown by chain double-dashed line in FIG. 15A, if the reference position of the viewpoint is switched before the reference position of the viewpoint becomes out of an image frame, as shown in FIG. 15D, regions of image to be displayed on a screen are further prevented from being decreased even when moving objects OBf-g stay at right and left ends in a screen.

Figure 16A:
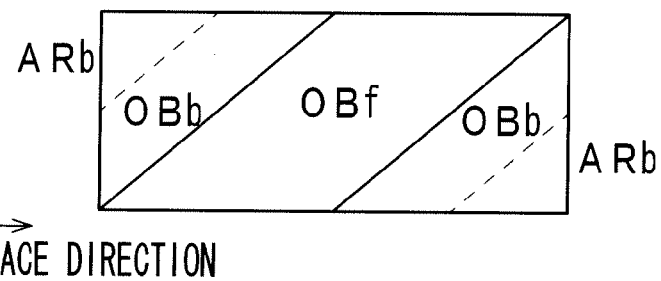
FIGS. 16A through 16E are diagrams each for explaining operations of presentation-image-forming section.
Figure 16B:
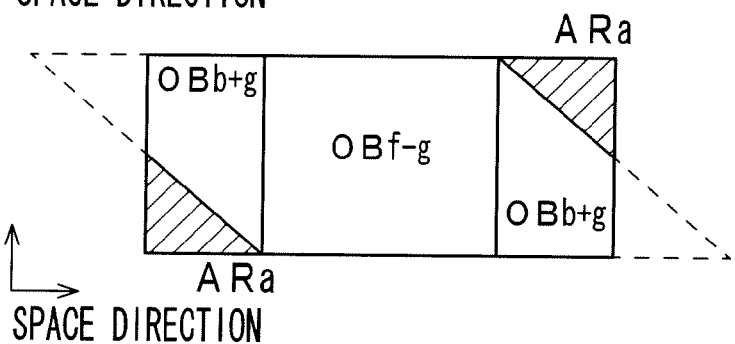
Figure 16C:
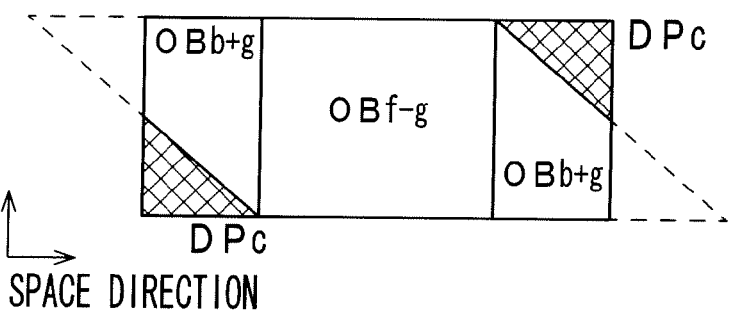

FIGS. 16A through 16E are diagrams each for explaining operations of the presentation-image-forming section 45. If a viewpoint is switched on an picked-up image in which a moving object OBf moves as shown in FIG. 16A so that the moving object OBf, from which any motion blur is removed, can be fixed at a middle portion of the screen, regions ARa in which no pixel value is presented occur as shown in FIG. 16B. In these regions ARa, as shown in FIG. 16C, their pixel values are set to a fixed value DPc. For example, portions in which no picked-up image is presented are displayed over by black color or white color. Thus, setting the pixel values to the fixed value DPc in the portions in which no picked-up image is presented enables the portions in which no picked-up image is presented to be prevented from being displayed by any unnecessary images such as a noise image.

Figure 16D:
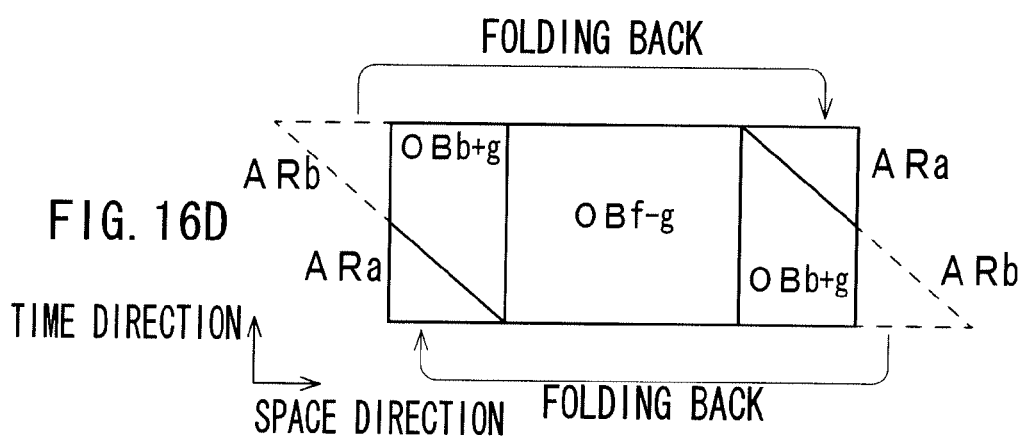

Any image may be also allocated to the portions in which no picked-up image is presented. Herein, if a viewpoint is switched as described above, regions ARb of FIG. 16A stay out of the image frame and thus, they are not shown. Therefore, as shown in FIG. 16D, any pixel values in the regions ARb stayed out of the image frame are folded back so that they can be allocated to the regions ARa in which no pixel value is presented. Such the allocation of pixel values enables the folded background image to be displayed.

Figure 16E:
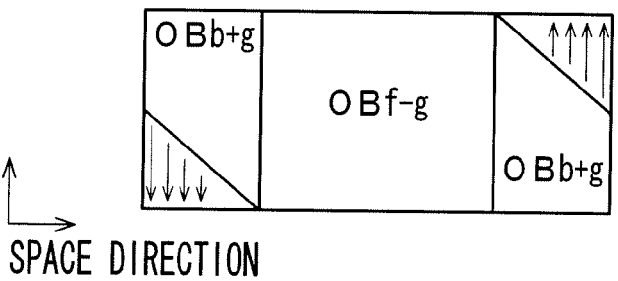

If any motion blur removing is performed on the image signal DVa on a non-real-time basis, the memory 43 may store the pixel values of the image shifted in time and allocate these stored pixel values. For example, as shown in FIG. 16E, the pixel values before or after in time are used to be allocated to the regions ARa in which no pixel value is presented.

If an image size of the image stored in the frame memory 44 that has a size for storage more than that of the target image is decreased and displayed, it is possible to display any portion that has stayed out of the image frame to disable to be displayed on a screen. For example, if a viewpoint is switched on an picked-up image in which a moving object OBf moves as shown in FIG. 17A so that the moving object OBf, from which any motion blur is removed, is fixed at a middle portion of the screen, regions ARb that have stayed out of the image frame to disable to be displayed on a screen occur as shown in FIG. 17B. When an image stored in the frame memory 44 is reduced as shown in FIG. 17C and displayed, the regions ARb may be displayed on the screen on their positions in the image frame. It is to be noted that FIG. 17D shows a displayed image at a point of time te.

FIG. 18 shows a flowchart in the case of performing image-processing by using software. At step ST1, the CPU 201 sets a target pixel, from which motion blur is to be removed, in a target image and proceeds to step ST2. At the step ST2, the CPU 201 detects a motion vector of the target pixel and proceeds to step ST3. At the step ST3, the CPU 201 calculates exposure time ratio. At step ST4, the CPU 201 detects a motion blur amount of the target pixel. In other words, it multiplies the motion vector detected at the step ST2 with the exposure time ratio calculated at the step ST3 to detect the motion blur amount of the target pixel in a period of exposure time.

At step ST5, the CPU 201 sets processing regions. In other words, the CPU 201 sets images to be processed based on the target pixel in the target image and sets target pixels in the images to be processed. Moreover, by using as a reference the target pixels in the images to be processed, it sets processing regions that correspond to the motion directions and the motion amounts, and then proceeds to step ST6.

At the step ST6, the CPU 201 sets processing coefficients. In this processing coefficient setting, it sets specific motion-blur-removing processing coefficients based on the motion amount or the motion-blur-removing processing coefficients based on the motion amount and the motion direction detected at the step ST2.

At the step ST7, the CPU 201 performs blur-removing processing on images of frames, which are the images to be processed. In other words, the CPU 201 generates the pixel values corresponding to the target pixels based on the pixel values in the processing regions set at the step ST5 and the processing coefficients set at the step ST6 corresponding to the motion amount and the motion direction. Alternatively, it generates new pixel values for processing from the pixel values in the processing regions and calculates the pixel values corresponding to the target pixels based on the pixel values for processing and the specific processing coefficients set at the step ST6 corresponding to the motion amount. Thus, it calculates the blur-removed pixel values for each target pixel in each image to be processed and proceeds to step ST8. At the step ST8, the CPU 201 performs integration processing on the pixel values calculated at the step ST7 for each image to be processed to generate one pixel value and then, proceeds to step ST9.

At the step ST9, the CPU 201 sets a motion vector for a viewpoint. In setting of the motion vector for the viewpoint, the motion vector vpe for setting a viewpoint that has been supplied from an outside is set as the motion vector for the viewpoint. At step ST10, the CPU 201 adds any motion blurs. In other words, the CPU 201 calculates an arbitrary-viewpoint-changed motion vector based on the motion vector of the target pixel detected at the step ST2 and the motion vector for the viewpoint set at the step ST9 and calculates a motion blur amount of the target pixel from the arbitrary-viewpoint-changed motion vector to add it into the pixel value of the target pixel, thereby generating a motion-blur-added target image.

At the step ST11, the CPU 201 decides whether blur-removing processing has completed on entire screen and, if any one of the pixels is not undergone yet the blur-removing processing, it returns to the step ST1 while if the processing has completed on the entire screen, it proceeds to step ST12.

At the step ST12, the CPU 201 entire-screen-moves the motion-blur-added target image based on the motion vector for the viewpoint to generate the arbitrary viewpoint image and proceeds to step ST13. At the step ST13, the CPU 201 forms a presentation image. For example, when any portion in which no pixel value is presented occurs, any interpolation is performed on this portion to form the presentation image and the processing ends.

By, thus, generating the motion-blur-removed image, adding motion blur corresponding to an arbitrary viewpoint given from an outside, performing the entire-screen-moving corresponding to the arbitrary viewpoint, it is possible to reconstruct an image as if it is picked up again from this viewpoint.

The following will describe cases of obtaining through learning processing coefficients to be stored beforehand in the processing-coefficient-setting section 37 to perform blur-removing processing and obtaining the processing coefficients from model equations to perform the blur-removing processing.

Figure 19:
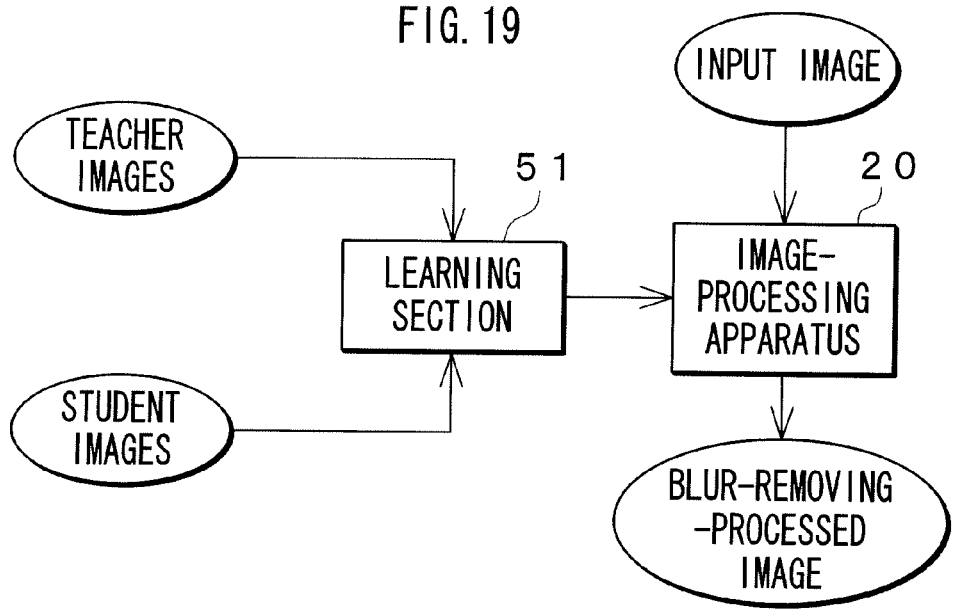
FIG. 19 is a diagram for showing a configuration in a case where blur-removing processing is performed by obtaining processing coefficients through learning.

FIG. 19 shows a configuration in a case where the blur-removing processing is performed by obtaining the processing coefficients through learning. A learning section 51 performs learning processing by using still images serving as teacher images and student images obtained by adding any motion blurs to each of the still image and stores processing coefficients obtained by this learning into the processing-coefficient-setting section 37 in the image-processing apparatus 20. The image-processing apparatus 20 sets processing regions corresponding to target pixels from an image containing a motion blur as an input image and performs multiply and accumulation calculation, for example, indicated by Equation 3 by using pixel values in the processing regions and processing coefficients corresponding to the motion blur amount, which are stored in the processing-coefficient-setting section 37, thereby generating blur-removed pixel values. It is to be noted that the setting of the processing regions will be described later.

$$q' = \sum_{i=0}^{n} di \times ci \qquad (3)$$

In the Equation 3, q' indicates a pixel value of a pixel from which blur is removed. ci ("i" is an integer of 1 through n) represents pixel values in the processing region. Further, di indicates processing coefficients.

Figure 20:
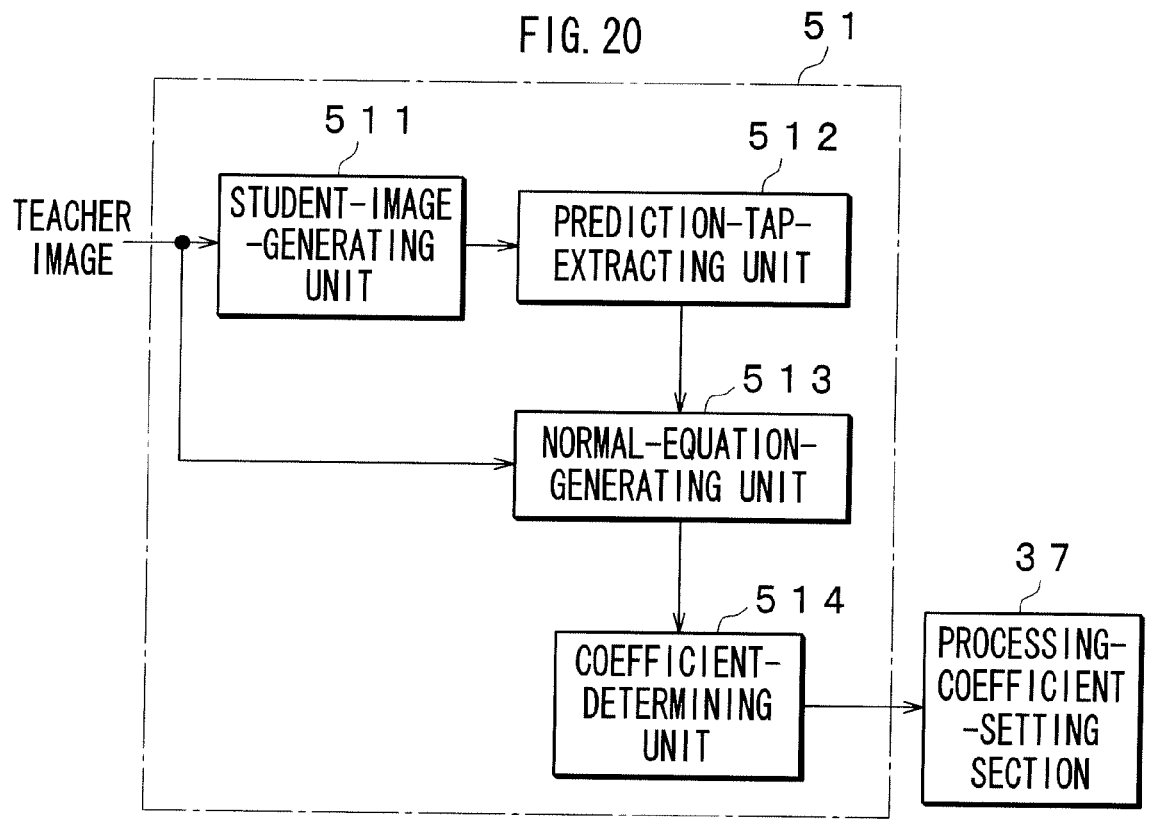
FIG. 20 is a functional block diagram of a learning section.

FIG. 20 is a functional block diagram of the learning section 51. A student-image-generating unit 511 in the learning section 51 generates the student images by adding any motion blurs corresponding to a motion direction and a motion amount to each of the teacher images serving as input images and supplies them to a prediction-tap-extracting unit 512.

The prediction-tap-extracting unit 512 sets as a prediction tap a plurality of pixels for a target pixel whose blurs are to be removed, extracts pixel values of the prediction tap from each of the student images, and outputs them to a normal-equation-generating unit 513. It is to be noted that the prediction taps, if the coefficients corresponding to the motion direction and the motion amount, correspond to the above-mentioned processing regions.

The normal-equation-generating unit 513 generates a normal equation from pixel values of the prediction taps supplied from the prediction-tap-extracting unit 512 and pixel values of the teacher images and supplies it to a coefficient-determining unit 514. The coefficient-determining unit 514 calculates processing coefficients based on the normal equation supplied from the normal-equation-generating unit 513 and stores them in the processing-coefficient-setting section 37. The normal-equation-generating unit 513 and the coefficient-determining unit 514 will be described further.

In the above-described Equation 3, before learning, the processing coefficients $d_i$ are respectively undetermined ones. Learning is performed by inputting pixels of a plurality of teacher images (still images). In a case where there are m number of pixels of the teacher images and pixel values of the m number of pixels are described as "$q_k$ (k is an integer of 1 through m)", following Equation 4 is derived from the Equation 3.

$$qk \approx \sum_{i=0}^{n} di \times cik = qk' \qquad (4)$$

In other words, by calculating a right side of the Equation 4, it is possible to obtain blur-removed pixel values $q_k'$, which are approximately equal to actual pixel values $q_k$ containing no motion blur. It is to be noted that an approximately equal symbol, not an equality symbol, is used in the Equation 4 because an error contains therein. In other words, this is because the blur removed pixel values obtained as a result of calculation of the right side do not strictly agree with pixel values on target pixels in an actual image having no motion blur and contain a predetermined error.

In the Equation 4, a processing coefficient $d_i$ that minimizes a sum of squares of the error, if obtained through learning, is considered to be an optimal coefficient to bring the blur removed pixel values $q_k$ close to the pixel values having no motion blur. Therefore, for example, by using m (which is an integer larger than n) number of pixel values $q_k$ gathered through the learning, such an optimal processing coefficient $d_i$ is determined according to the least-squares method.

A normal equation to obtain the processing coefficient $d_i$ in the right side of the Equation 4 according to the least-squares method can be given as Equation 5.

$$\begin{bmatrix} \sum_{k=1}^{m} c_{1k} \times c_{1k} & \sum_{k=1}^{m} c_{1k} \times c_{2k} & \cdots & \sum_{k=1}^{m} c_{1k} \times c_{nk} \\ \sum_{k=1}^{m} c_{2k} \times c_{1k} & \sum_{k=1}^{m} c_{2k} \times c_{2k} & \cdots & \sum_{k=1}^{m} c_{2k} \times c_{nk} \\ \vdots & \vdots & & \vdots \\ \sum_{k=1}^{m} c_{nk} \times c_{1k} & \sum_{k=1}^{m} c_{nk} \times c_{2k} & \cdots & \sum_{k=1}^{m} c_{nk} \times c_{nk} \end{bmatrix} \begin{bmatrix} d_1 \\ d_2 \\ \vdots \\ d_n \end{bmatrix} = \begin{bmatrix} \sum_{k=1}^{m} c_{1k} \times q_k \\ \sum_{k=1}^{m} c_{2k} \times q_k \\ \vdots \\ \sum_{k=1}^{m} c_{nk} \times q_k \end{bmatrix} \quad (5)$$

Therefore, by solving the normal equation indicated in the Equation 5, the processing coefficient $d_i$ can be determined. Specifically, if matrixes of the normal equation indicated in the Equation are defined as the following Equations 6 to 8, the normal equation is given as following Equation 9.

$$C_{MAT} = \begin{bmatrix} \sum_{k=1}^{m} c_{1k} \times c_{1k} & \sum_{k=1}^{m} c_{1k} \times c_{2k} & \cdots & \sum_{k=1}^{m} c_{1k} \times c_{nk} \\ \sum_{k=1}^{m} c_{2k} \times c_{1k} & \sum_{k=1}^{m} c_{2k} \times c_{2k} & \cdots & \sum_{k=1}^{m} c_{2k} \times c_{nk} \\ \vdots & \vdots & & \vdots \\ \sum_{k=1}^{m} c_{nk} \times c_{1k} & \sum_{k=1}^{m} c_{nk} \times c_{2k} & \cdots & \sum_{k=1}^{m} c_{nk} \times c_{nk} \end{bmatrix} \quad (6)$$

$$D_{MAT} = \begin{bmatrix} d1 \\ d2 \\ M \\ M \\ dn \end{bmatrix} \quad (7)$$

$$Q_{MAT} = \begin{bmatrix} \sum_{k=1}^{m} c_{1k} \times q_k \\ \sum_{k=1}^{m} c_{2k} \times q_k \\ \vdots \\ \sum_{k=1}^{m} c_{nk} \times q_k \end{bmatrix} \quad (8)$$

$$C_{MAT} D_{MAT} = Q_{MAT} \quad (9)$$

As indicated in the Equation 7, elements of the matrix $D_{MAT}$ are processing coefficients di to be obtained. Therefore, in the Equation 9, once the matrix $C_{MAT}$ on the left side and the matrix $Q_{MAT}$ on the right side are determined, it is possible to calculate the matrix DT (i.e., processing coefficients $d_i$) by any matrix solving methods. Specifically, as indicated in the Equation 6, elements of the matrix $C_{MAT}$ can be calculated if prediction taps $c_{ik}$ are already known. Since the prediction taps $c_{ik}$ are extracted by the prediction-tap-extracting unit 512, the normal-equation-generating unit 513 can calculate the elements of matrix $C_{MAT}$ by utilizing the respective prediction taps $c_{ik}$ supplied from the prediction-tap-extracting unit 512.

Also, as indicated in the Equation 8, elements of the matrix $Q_{MAT}$ can be calculated if the prediction taps $c_{ik}$ and the pixel values $q_k$ of the still images are already known. The prediction taps $c_{ik}$ are the same as those included in the elements of matrix $C_{MAT}$ and the pixel values $q_k$ correspond to pixels of the teacher images with respect to target pixels (pixels of the student images) contained in each of the prediction taps $c_{ik}$. Therefore, the normal-equation-generating unit 513 can calculate the elements of matrix $Q_{MAT}$ by utilizing the prediction taps $c_{ik}$ supplied from the prediction-tap-extracting unit 512 and the teacher images.

Thus, the normal-equation-generating unit 513 calculates the elements of matrixes $C_{MAT}$ and $Q_{MAT}$ and supplies results of the calculations to the coefficient-determining unit 514.

The coefficient-determining unit 514 calculates the processing coefficients $d_i$, which are the elements of matrix $D_{MAT}$ of the above-described Equation 7. Specifically, the normal equation of the above-described Equation 9 can be changed into following Equation 10.

$$D_{MAT} = C_{MAT}^{-1} Q_{MAT} \quad (10)$$

In the Equation 10, the elements of matrix $D_{MAT}$ of the left side are the processing coefficients $d_i$ to be obtained. Further, the elements of matrixes $C_{MAT}$ and $Q_{MAT}$ are supplied from the normal-equation-generating unit 513. Therefore, when having been supplied with the elements matrixes $C_{MAT}$ and $Q_{MAT}$ from the normal-equation-generating unit 513, the coefficient-determining unit 514 calculates a matrix of the right side of the Equation 10 to calculate the matrix $D_{MAT}$ and stores results of the calculation (processing coefficients $d_i$) in the processing-coefficient-setting section 37. In this case, by performing the above-described learning with the motion direction being set to a fixed direction and the motion amount being changed, it is possible to store specific processing coefficients that correspond to the motion blur amounts. By performing the above-described learning with the motion direction being also changed, it is possible to store processing coefficients corresponding to the motion blur amount and the motion direction.

In selection of prediction taps, a prediction tap is selected by using a length that is proportional to a motion amount. For example, pixels that fall in a range of "3×motion amount+9 pixels" in a motion direction are defined as a prediction tap, on the basis of a target pixel. Further, if pixels that fall in a range of "2×motion amount+3 pixels" are defined as a prediction tap, the number in the tap can be decreased to simplify the configuration thereof. Moreover, on the selection of the prediction tap, the prediction taps can be discretely selected according to a motion amount v.

Figure 21:
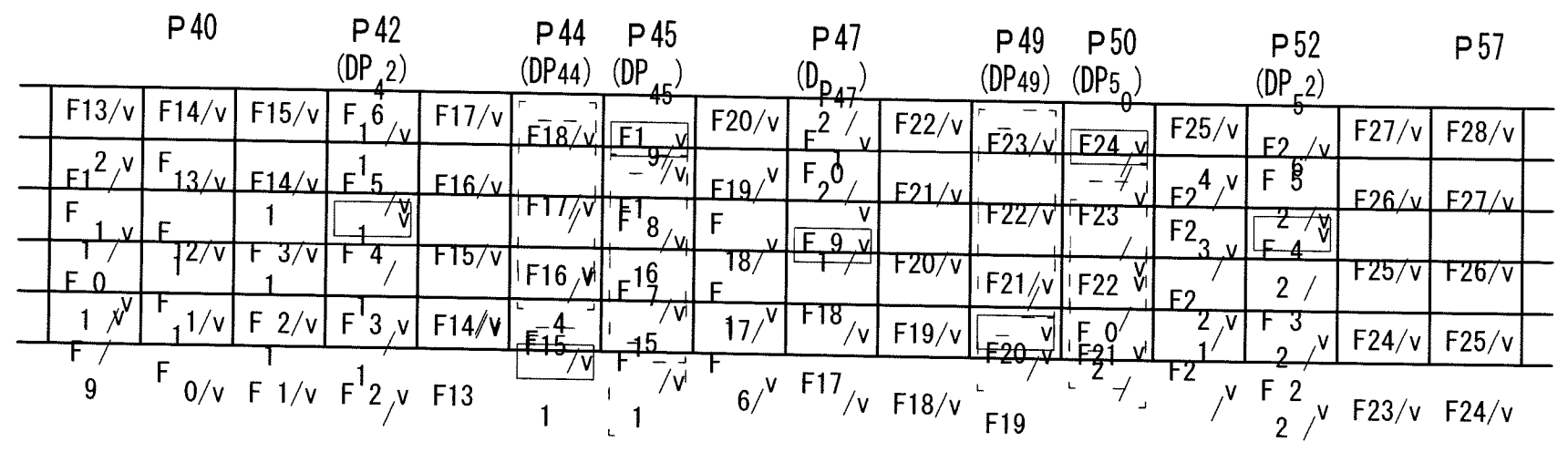

The following will describe the case of discretely selecting the prediction taps in accordance with the motion amount v, with reference to FIG. 21. For example, in the case of defining a pixel position P47 shown in FIG. 21 as a target pixel position and obtaining a pixel value F19 of a target pixel, Equation 11 holds true with taking into consideration a pixel position P45 where an element F19/v of the target pixel appears first and a pixel position P44 which is adjacent to the pixel position P45 and does not have the element F19/v of the target pixel as indicated by broken lines. It is to be noted that the pixel positions P44 and P45 are supposed to have pixel values $DP_{44}$ and $DP_{45}$.

$$F19 - F14 = (DP_{45} - DP_{44}) \times v \quad (11)$$

Similarly, Equation 12 holds true with taking into consideration a pixel position P49 where an element F19/v of the target pixel appears last and a pixel position P50 which is adjacent to the pixel position P49 and does not have the element F19/v of the target pixel as indicated by broken lines.

$$F24 - F19 = (DP_{50} - DP_{49}) \times v \tag{12}$$

In this case, a level of pixel value F14 is obtained approximately utilizing a space correlation. For example, if a pixel position P42 has a high space correlation with its peripheral pixels, such an approximation as indicated in Equation 13 is established.

$$F14 \approx DP_{42} \tag{13}$$

Figures 22, 23:
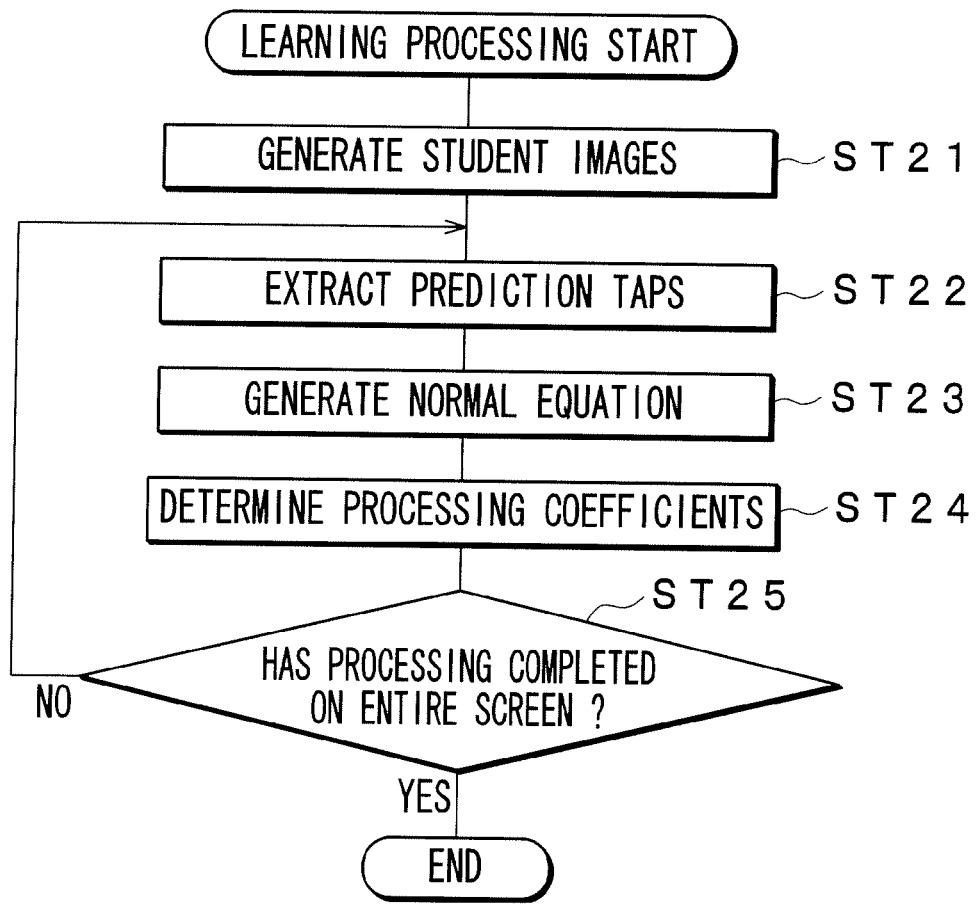
FIG. 22 is a diagram for explaining calculation of an activity.
FIG. 23 is a flowchart for showing processing to learn processing coefficients.

The space correlation, as referred to here, means a relationship represented by a magnitude of an activity of pixels. In other words, the activity refers to as a sum of differences among pixels adjacent to a reference pixel, for example. FIG. 22 is a diagram for explaining calculation of the activity. For example, activity AC (P42) of pixel position P42, which is given by following Equation 14, is differences between pixels in a total of nine pixels (3×3 pixels) around the pixel position P42. It is to be noted that in FIG. 22, the pixel position P42-U indicates a pixel one line above the pixel position P42, and the pixel position P42-L indicates a pixel one line below the pixel position P42, and so on.

$$\begin{aligned}AC(P42) = &|DP_{41-U} - DP_{42-U}| + |DP_{42-U} - DP_{43-U}| + \\ &|DP_{41} - DP_{42}| + |DP_{42} - Dp_{43}| + \\ &|DP_{41-L} - DP_{42-L}| + |DP_{42-L} - DP_{43-L}| + \\ &|DP_{41-U} - DP_{41}| + |DP_{41} - DP_{41-L}| + \\ &|DP_{42-U} - DP_{42}| + |DP_{42} - DP_{42-L}| + \\ &|DP_{43-U} - DP_{43}| + |DP_{43} - DP_{43-L}|\end{aligned} \tag{14}$$

Activity AC (P42) of a pixel represented by the pixel position P42 given by the Equation 14 is such that the smaller its value is, the higher a space correlation between the pixel of pixel position P42 and each of the peripheral pixels thereof is and hence a pixel value of the pixel position P42 is approximate to those of the peripheral pixels. Conversely, the larger an activity is, the lower a space correlation between the pixel of pixel position P42 and each of the peripheral pixels thereof is and hence the pixel values of the pixel position P42 could be different from those of the peripheral pixels. In other words, it supposes that a higher space correlation means a smaller change in pixel values among pixels, so that it is considered that such a relationship as given by Equation 15 holds true.

$$F12/v = F13/v = F14/v = F15/v = F16/v \tag{15}$$

Therefore, if the activity AC (P42) is small, following Equation 16 is derived, so that the Equation 13 is considered to be established.

$$DP_{42}/v = (F12/v + F13/v + F14/v + F15/v + F16/v) = F14/v. \tag{16}$$

Based on the results above, by changing the Equation 11 and substituting a relationship of the Equation 13 into it, F19 is obtained as a level of light made incident upon a pixel of an image having no motion blur as indicated by following Equation 17.

$$F19 = (DP_{45} - DP_{44}) \times v + DP_{42} \tag{17}$$

In a similar manner, Equation 18 is also established.

$$F19 = DP_{52} + (DP_{49} - DP_{50}) \times v \tag{18}$$

Through the above consideration, to obtain the pixel value F19 of the target pixel, pixel positions P42, P44, P45, P49, P50, and P52 can be obtained, so that by using pixel position P47 of the target pixel as reference, pixels of pixel positions P42, P44, P45, P49, P50, and P52 can be also used as a prediction tap.

FIG. 23 is a flowchart for showing the learning processing of processing coefficients. At step ST21, the student images are generated from the teacher images. In other words, by adding a motion blur to each of the teacher images, the student images are generated to each of which the motion blur is added.

At step ST22, prediction taps are extracted from the student images. At step ST23, a normal equation is generated from the prediction taps and pixels of the teacher images. At step ST24, the normal equation generated at step ST23 is solved to thereby determine the processing coefficients and they are stored in the processing-coefficient-setting section 37.

At step ST25, it is determined whether the processing is performed on all pixels and, if the processing is not performed yet on any of the pixels, processing starting from step ST22 repeats on new pixels while if the processing is completed on all pixels, the learning processing ends.

By performing the above processing to generate processing coefficients for removing a motion blur through learning and storing them in the processing-coefficient-setting section 37, the motion-blur-removing processing can be performed.

Further, to detect a magnitude of an activity as described above, that is, to detect whether there is a space correlation or not, classes are categorized in accordance with the magnitude of the activity to change processing regions corresponding to a class code, which is a result of the class categorization, thereby enabling accuracy for blur-removing to be improved.

In this case, the processing-region-setting section 36 extracts class taps that corresponds to a target pixel, determines a class code from the extracted class taps, sets processing regions that correspond to the target pixels according to the class code, and supplies pixel values in the processing regions to the pixel-value-generating section 38. Further, the determined class code is supplied from the processing-region-setting section 36 to the processing-coefficient-setting section 37 so that processing coefficients that correspond to the motion blur amount MBp and the class code may be read out of the memory and supplied to the pixel-value-generating section 38.

In this case, in a case where class categorization is performed based on the magnitude of an activity, pixels used in calculation of the activity are extracted as the class tap as described with reference to FIGS. 21 and 22. The extracted class taps are used to obtain the activity as described above, and then, based on the activity thus obtained, the class code is detected. For example, if activities AC (P42) and AC (P52) are obtained when the activity AC (P42) is found to be smaller than the activity AC (P52), the class code is set to "1" and, when the activity AC (P52) is smaller than the activity AC (P42), the class code is set to "2" so that the class code may subsequently be supplied to the processing-coefficient-setting section 37.

Moreover, the processing-region-setting section 36 sets processing regions that correspond to the target pixels in accordance with the class code. For example, if the class code is "1", pixel values of pixel positions P42, P44, and P45 are supplied as pixel values in the processing region to the pixel-value-generating section 38 because the pixel position P42 has a higher space correlation than that of the pixel position P52. Alternatively, if the class code is "2", pixel values of pixel positions P49, P50, and P52 are supplied as pixel values in the processing region to the pixel-value-generating section 38 because the pixel position P52 has a higher space correlation than that of the pixel position P42.

The processing-coefficient-setting section 37 stores beforehand processing coefficients that are obtained through learning by a learning apparatus, which will be described later, corresponding to the class codes and supplies the processing coefficients corresponding to the class code and the motion amount to the pixel-value-generating section 38.

The blur-removing-processing units 381 to 383 in the pixel-value-generating section 38 perform calculation processing by using the pixel values in the processing regions and the processing coefficients supplied from the processing-coefficient-setting section 37 to generate the blur-removed pixel values and supply them to the integration section 39. The integration section 39 integrates the pixel values supplied from the blur-removing-processing units 381 to 383 and outputs a pixel value of the target pixel in the target image, from which any motion blurs are removed.

Figure 24:
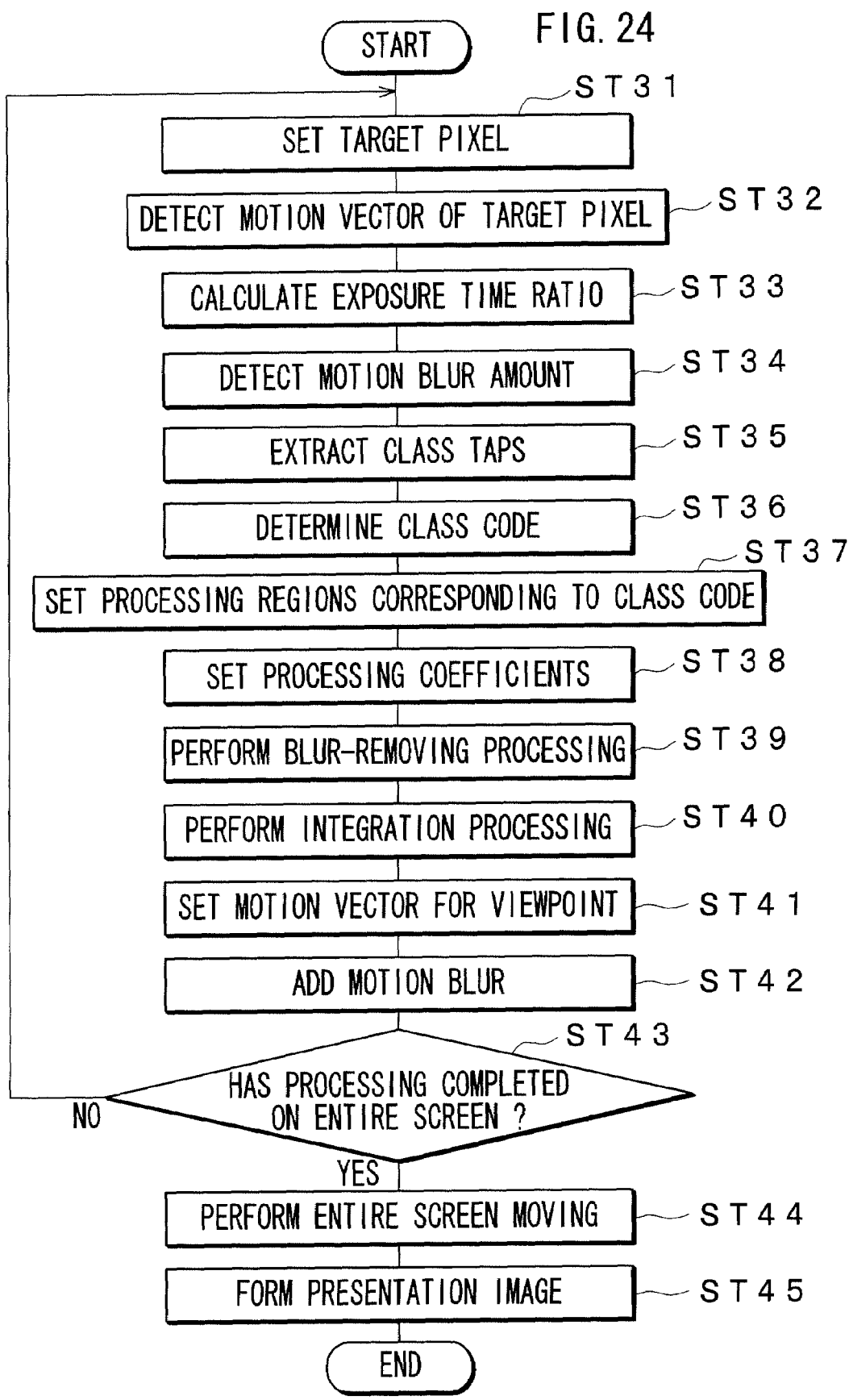
FIG. 24 is a flowchart of image processing by use of class categorization.

FIG. 24 shows a flowchart of image processing by use of the class categorization. At step ST31, the CPU 201 sets a target pixel whose motion blurs are to be removed in the target image and then, proceeds to step ST32. At the step ST32, the CPU 201 detects a motion vector of the target pixel and proceeds to step ST33. At the step ST33, the CPU 201 calculates exposure time ratio. At step ST34, the CPU 201 detects a motion blur amount of the target pixel. In other words, it performs multiplication of the motion vector detected at the step ST32 with the exposure time ratio calculated at the step ST33, thereby detecting the motion blur amount of the target pixel in a period of exposure time.

At step ST35, the CPU 201 extracts class taps corresponding to the motion blur amounts obtained at the step ST34 and proceeds to step ST36. At the step ST36, the CPU 201 categorizes classes and determines a class code from the extracted class taps.

At step ST37, the CPU 201 sets processing regions corresponding to the class code. In other words, the CPU 201 sets images to be processed based on the target pixel in the target image to set target pixels in the images to be processed. Further, it sets the processing regions corresponding to the class code and the motion blur amount and the motion direction of the target pixel with reference to the target pixels in the images to be processed, and then, proceeds to step ST38.

At the step ST38, the CPU 201 sets the processing coefficients corresponding to the motion blur amount of the target pixel and the class code or sets the processing coefficients the motion direction corresponding to the motion vector detected at the step ST32, the motion blur amount of the target pixel, and the class code, and then, proceeds to step ST39.

At the step ST39, the CPU 201 performs blur-removing processing on each of the images to be processed. In other words, the CPU 201 performs calculation processing on the pixel values in the processing regions set at the step ST37 and the processing coefficients corresponding to the motion amount and the motion direction set at the step ST38, thereby generating the pixel values corresponding to the target pixels. Alternatively, it generates new pixel values for processing from the pixel values in the processing regions and performs calculation processing on these pixel values for processing and the specific processing coefficients set at the step ST38 corresponding the motion amount, thereby calculating blur-removed pixel values for each target pixel in the images to be processed, and then, it proceeds to step ST40.

At the step ST40, the CPU 201 integrates the pixel values calculated for each image to be processed at the step ST39 to generate one pixel value and then, proceeds to step ST41.

At the step ST41, the CPU 201 sets a motion vector for a viewpoint. In setting of the motion vector for the viewpoint, the motion vector vpe for setting a viewpoint that has been supplied from an outside is set as the motion vector for the viewpoint. At step ST42, the CPU 201 adds any motion blurs. In other words, the CPU 201 calculates an arbitrary-viewpoint-changed motion vector based on the motion vector of the target pixel detected at the step ST32 and the motion vector for the viewpoint set at the step ST41 and calculates a motion blur amount of the target pixel from the arbitrary-viewpoint-changed motion vector to add it into the pixel value of the target pixel, thereby generating a motion-blur-added target image.

At the step ST43, the CPU 201 decides whether blur-removing processing has completed on entire screen and, if any one of the pixels is not undergone yet the blur-removing processing, it returns to the step ST31 while if the processing has completed on the entire screen, it proceeds to step ST44.

At the step ST44, the CPU 201 entire-screen-moves the motion-blur-added target image based on the motion vector for the viewpoint to generate the arbitrary viewpoint image and proceeds to step ST45. At the step ST45, the CPU 201 forms a presentation image. For example, any interpolation is performed on a portion in which no pixel value is presented, thereby forming the presentation image, and the processing ends.

Figure 25:
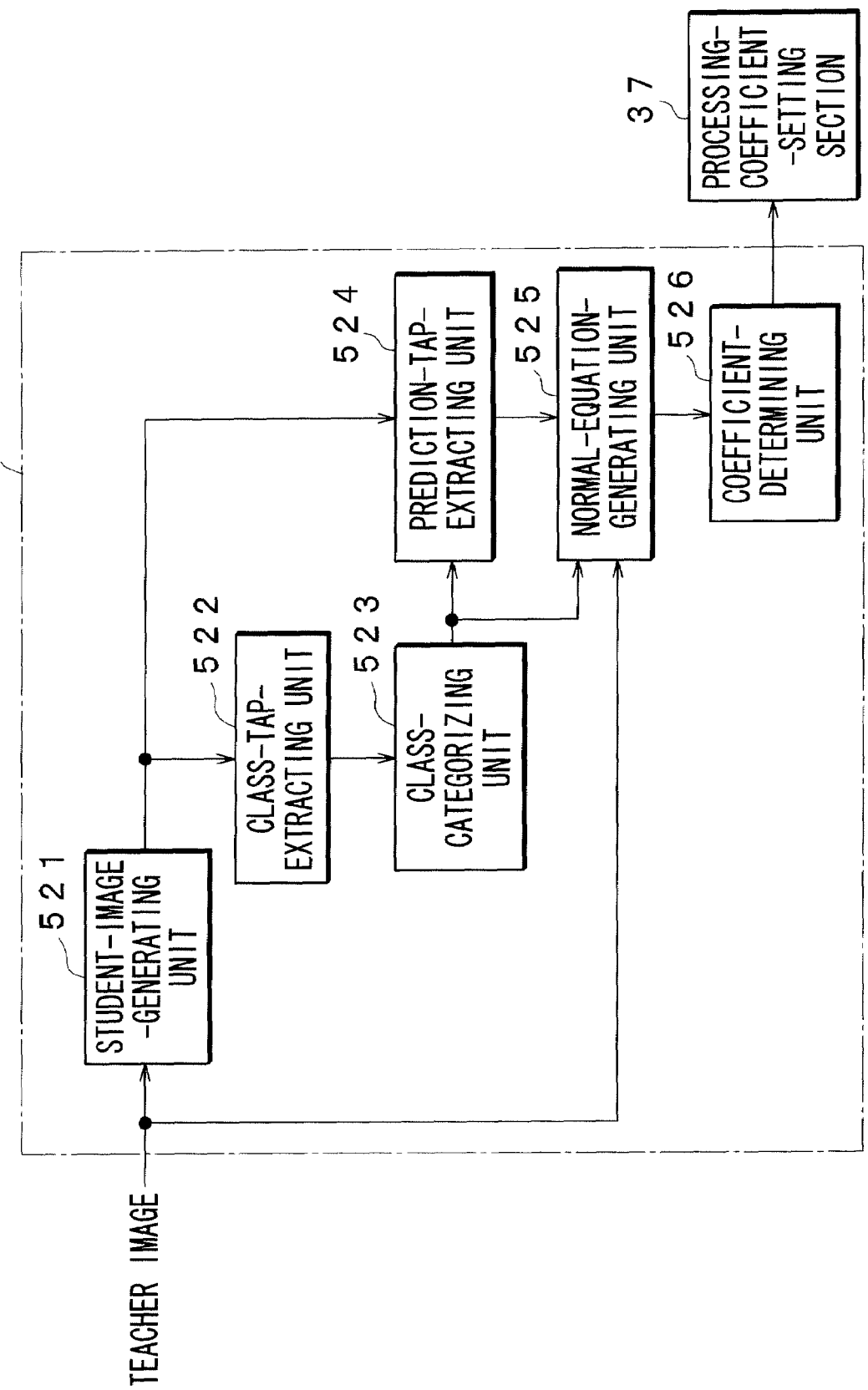
FIG. 25 is a functional block diagram of a learning section in the case of executing class categorization.

The following will describe learning of processing coefficients in the case of performing class categorization. FIG. 25 is a functional block diagram of the learning apparatus 52 in the case of categorizing classes. A student-image-generating unit 521 of the learning apparatus 52 adds motion blur corresponding to the motion amount v to each of the teacher images, which are input images, to generate the student images and supplies them to a class-tap-extracting unit 522 and a prediction-tap-extracting unit 524.

The class-tap-extracting unit 522 selects a class tap from the student images as described above, and supplies the selected class tap to a class-categorizing unit 523. The class-categorizing unit 523 categorizes classes, as described above, to determine a class code and supplies it to the prediction-tap-extracting unit 524 and a normal-equation-generating unit 525.

The prediction-tap-extracting unit 524 switches prediction taps in accordance with the class code to extract it from the student images and supplies it to the normal-equation-generating unit 525.

Being the same as the normal-equation-generating unit 513 of FIG. 20 basically, the normal-equation-generating unit 525 generates a normal equation for each class code supplied from the class-categorizing unit 523 and outputs it to a coefficient-determining unit 526. Therefore, the coefficient-determining unit 526 determines coefficients for each class code and stores the coefficients determined for each class code in the processing-coefficient-setting section 37. Herein, if student images are generated by specifying a motion direction and switching only the motion amounts, the specific processing coefficients that correspond to the motion amounts and the class code are stored in the processing-coefficient-setting section 37. Further, if student images are generated by switching the motion amounts and the motion directions, the processing coefficients that correspond to the motion amounts, the motion directions, and the class codes are stored in the processing-coefficient-setting section 37.

Figure 26:
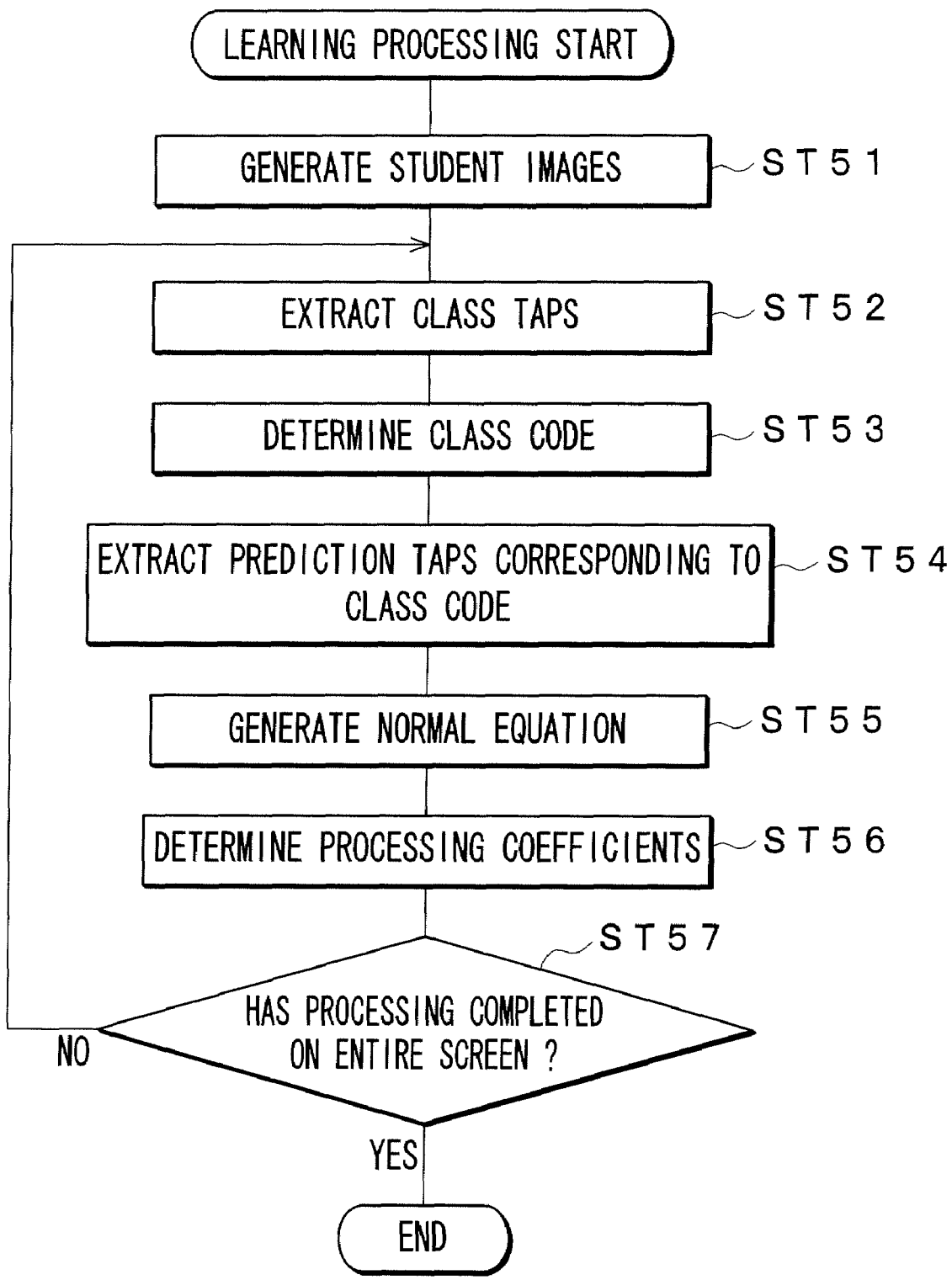
FIG. 26 is a flowchart for showing processing to learn processing coefficients by use of class categorization.

FIG. 26 is a flowchart for showing the learning processing of processing coefficients by employing class categorization. At step ST51, student images are generated from teacher images. In other words, by adding a motion blur to each of the teacher images, the student images are generated, to each of which a motion blur is added.

At step ST52, a class tap is extracted from each of the student images. The class tap is extracted in the same manner as at the above-described step ST35.

At step ST53, class categorization is performed from the extracted class tap, to determine a class code. At step ST54, prediction taps are extracted from the student images corresponding to the class code determined at the step ST53.

At step ST55, a normal equation is generated from the prediction taps and pixels of the teacher images for each class code.

At step ST56, the normal equation generated at the step ST55 is solved to determine processing coefficients and stores them in the processing-coefficient-setting section 37.

At step ST57, it is determined whether the processing is performed on all pixels and, if the processing is not performed yet on any of the pixels, processing starting from step ST52 repeats on new pixels while, if the processing is performed on all pixels, the learning processing ends. Thus, it is possible to generate the motion-blur-removing processing coefficients corresponding to the motion amount, the motion direction, and the class. Moreover, if the motion direction is fixed to one direction, it is also possible to generate the specific processing coefficients corresponding to the motion amount and the class.

The following will describe a case of performing any blur-removing processing in which processing coefficients to be stored in the processing-coefficient-setting section 37 are obtained by using model equations.

Figure 27:
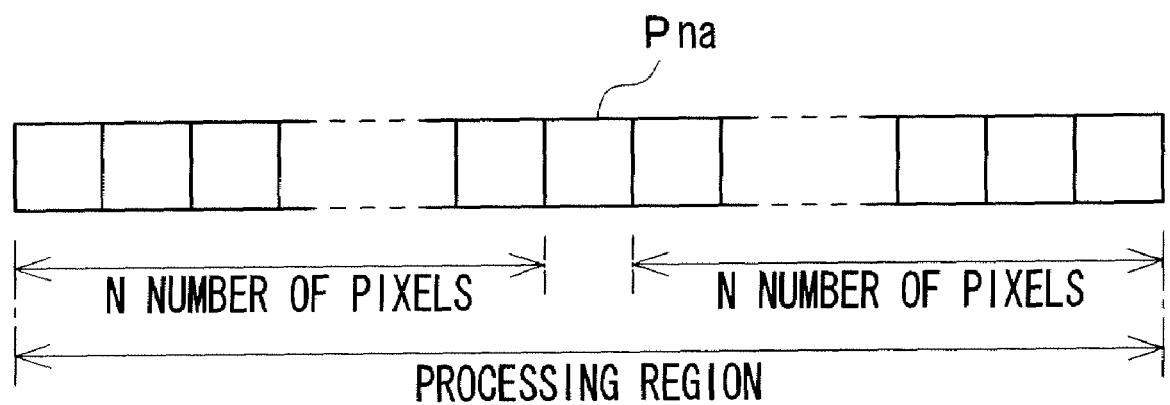
FIG. 27 is a diagram for explaining a processing region.
Figure 28A:
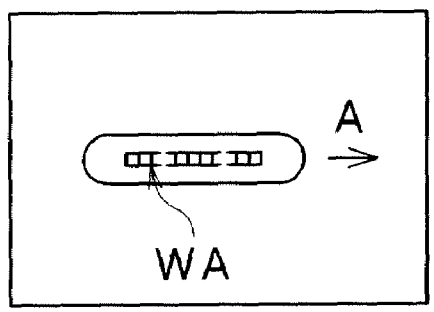
FIGS. 28A and 28B are illustrations each for illustrating an example of setting a processing region.
Figure 28B:
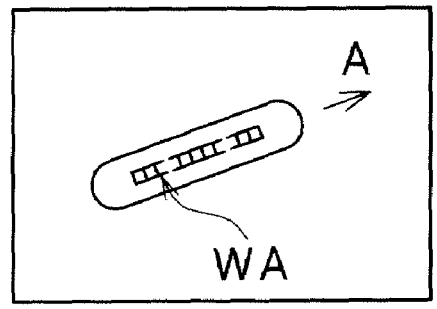

FIG. 27 shows a processing region, in which the processing region is set in a motion direction as much as, for example, (2N+1) number of pixels as a center of a target pixel. FIGS. 28A and 28B show setting examples of processing regions, in which a processing region WA is set horizontally as shown in FIG. 28A when a direction of a motion vector is, for example, horizontal as indicated by an arrow A with respect to a pixel of a moving object OBf whose motion blurs are to be mitigated. When a direction of a motion vector is oblique, as shown in FIG. 28B, a processing region WA is set in a corresponding angle. However, when setting the processing region obliquely, a pixel value that corresponds to a pixel position in the processing region is obtained by interpolation etc.

Figure 29:
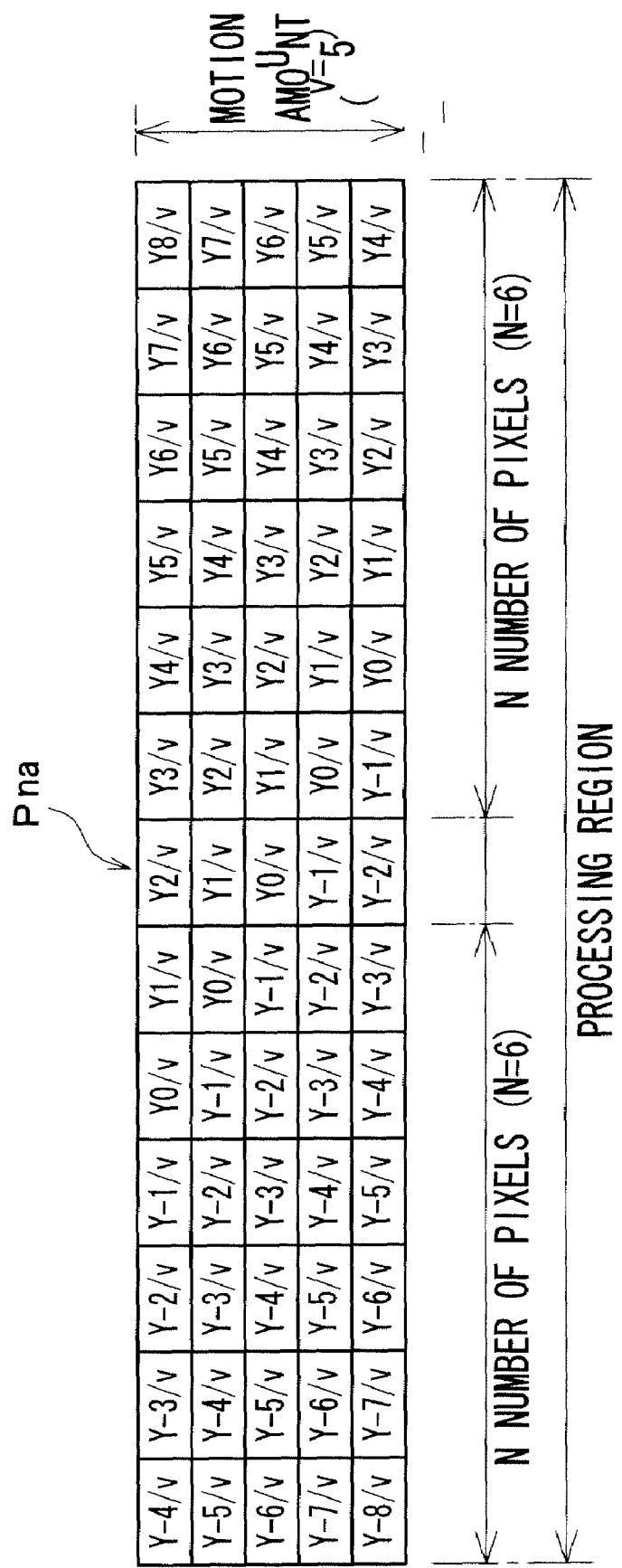
FIG. 29 is an explanatory chart of time-wise mixture of real world variables in a processing region.

Herein, in the processing region, as shown in FIG. 29, real world variables $(Y_{-8}, \ldots, Y_0, \ldots, Y_8)$ are mixed time-wise. It is to be noted that FIG. 29 shows a case where a motion amount v is set to "v=5" and the processing region is made up of 13 pixels (N=6, where N is the number of pixels in a width of processing for the target pixel).

In blur-removing processing, a real world is estimated on the processing region, to output only a central pixel variable $Y_0$ of the estimated real world as a pixel value of a target pixel whose motion blurs have been removed.

If the pixel values of the pixels constituting the processing region are represented by $X_{-N}, X_{-N+1}, \ldots, X_0, \ldots, X_{N-1}, X_N$, (2N+1) number of mixture equations such as ones indicated in Equation 19 are established. It is to be noted that constant h indicates a value of an integral portion of the motion amount v multiplied by ½, that is, a value obtained by discarding its decimal places.

$$\sum_{i=t-h}^{t+h} (Yi/v) = Xt \tag{19}$$

(where $t = -N, \ldots, 0, \ldots, N$)

However, there are (2N+v) number of real world variables $(Y_{-N-h}, \ldots Y_0, \ldots, Y_{N+h})$ to be obtained. In other words, the equations are outnumbered by the variables, so that it is impossible to obtain the real world variables $(Y_{-N-h}, \ldots, Y_0, \ldots, Y_{N+h})$ based on the Equation 19.

Therefore, by using Equation 20, which is a constraint equation employing a space correlation, the number of the equations is increased than the real world variables, to obtain values of the real world variables by the least-squares method.

$$Yt - Yt+1 = 0 \text{ (where } t=-N-h, \ldots, 0, \ldots, N+h-1) \tag{20}$$

In other words, by using (4N+v) number of equations including the (2N+1) number of mixture equations represented by the Equation 19 and the (2N+v−1) number of constraint equations represented by the Equation 20, the (2N+v) number of unknown real world variables $(Y_{-N-h}, \ldots, Y_0, \ldots, Y_{N+h})$ are obtained.

Herein, by performing such estimation as to minimize a sum of squares of errors that occur in the equations, it is possible to suppress fluctuations in the pixel values in the real world with performing processing to generate an image in which motion blur is mitigated.

Equation 21 indicates a case where the processing region is set as shown in FIG. 29, in which errors that occur in the respective Equations 19 and 20 are added to them.

$$
\begin{bmatrix}
1/v & 1/v & 1/v & 1/v & 1/v & 0 & 0 & 0 & 0 & 0 & 0 & 0 & 0 & 0 & 0 & 0 & 0 \\
0 & 1/v & 1/v & 1/v & 1/v & 1/v & 0 & 0 & 0 & 0 & 0 & 0 & 0 & 0 & 0 & 0 & 0 \\
0 & 0 & 1/v & 1/v & 1/v & 1/v & 1/v & 0 & 0 & 0 & 0 & 0 & 0 & 0 & 0 & 0 & 0 \\
0 & 0 & 0 & 1/v & 1/v & 1/v & 1/v & 1/v & 0 & 0 & 0 & 0 & 0 & 0 & 0 & 0 & 0 \\
0 & 0 & 0 & 0 & 1/v & 1/v & 1/v & 1/v & 1/v & 0 & 0 & 0 & 0 & 0 & 0 & 0 & 0 \\
0 & 0 & 0 & 0 & 0 & 1/v & 1/v & 1/v & 1/v & 1/v & 0 & 0 & 0 & 0 & 0 & 0 & 0 \\
0 & 0 & 0 & 0 & 0 & 0 & 1/v & 1/v & 1/v & 1/v & 1/v & 0 & 0 & 0 & 0 & 0 & 0 \\
0 & 0 & 0 & 0 & 0 & 0 & 0 & 1/v & 1/v & 1/v & 1/v & 1/v & 0 & 0 & 0 & 0 & 0 \\
0 & 0 & 0 & 0 & 0 & 0 & 0 & 0 & 1/v & 1/v & 1/v & 1/v & 1/v & 0 & 0 & 0 & 0 \\
0 & 0 & 0 & 0 & 0 & 0 & 0 & 0 & 0 & 1/v & 1/v & 1/v & 1/v & 1/v & 0 & 0 & 0 \\
0 & 0 & 0 & 0 & 0 & 0 & 0 & 0 & 0 & 0 & 1/v & 1/v & 1/v & 1/v & 1/v & 0 & 0 \\
0 & 0 & 0 & 0 & 0 & 0 & 0 & 0 & 0 & 0 & 0 & 1/v & 1/v & 1/v & 1/v & 1/v & 0 \\
0 & 0 & 0 & 0 & 0 & 0 & 0 & 0 & 0 & 0 & 0 & 0 & 1/v & 1/v & 1/v & 1/v & 1/v \\
\hline
1 & -1 & 0 & 0 & 0 & 0 & 0 & 0 & 0 & 0 & 0 & 0 & 0 & 0 & 0 & 0 & 0 \\
0 & 1 & -1 & 0 & 0 & 0 & 0 & 0 & 0 & 0 & 0 & 0 & 0 & 0 & 0 & 0 & 0 \\
\vdots & & & & & & & & & & & & & & & & \\
0 & 0 & 0 & 0 & 0 & 0 & 0 & 0 & 0 & 0 & 0 & 0 & 0 & 0 & 0 & 1 & -1
\end{bmatrix}
\begin{bmatrix} X_{-6} \\ X_{-5} \\ X_{-4} \\ X_{-3} \\ X_{-2} \\ X_{-1} \\ X_0 \\ X_1 \\ X_2 \\ X_3 \\ X_4 \\ X_5 \\ X_6 \end{bmatrix}
=
\begin{bmatrix} Y_{-8} \\ Y_{-7} \\ Y_{-6} \\ Y_{-5} \\ Y_{-4} \\ Y_{-3} \\ Y_{-2} \\ Y_{-1} \\ Y_0 \\ Y_1 \\ Y_2 \\ Y_3 \\ Y_4 \\ Y_5 \\ Y_6 \\ Y_7 \\ Y_8 \end{bmatrix}
+
\begin{bmatrix} e_{m_{-6}} \\ e_{m_{-5}} \\ \vdots \\ e_{m_6} \\ \hline e_{b_0} \\ e_{b_1} \\ \vdots \\ e_{b_{15}} \end{bmatrix}
$$

This Equation 21 can be expressed as Equation 22 and such Y (=$Y_i$) as to minimize a sum of squares E of errors indicated in Equation 23 is obtained as Equation 24. It is to be noted that T in the Equation 24 stands for a transposed matrix.

$$AY = X + e \quad (22)$$

$$E = |e|^2 \sum emi^2 + \sum ebi^2 \quad (23)$$

$$Y = (A^T A)^{-1} A^T X \quad (24)$$

Herein, a sum of squares of errors is indicated by Equation 25, so that by partially differentiating the sum of squares of the errors in order to provide a partial differential value of 0 as indicated by Equation 26, the Equation 24 that minimizes the sum of squares of the errors can be obtained.

$$E = (AY - X)^T (AY - X) = Y^T A^T A Y - 2 Y^T A^T X + X^T X \quad (25)$$

$$\partial E / \partial Y = 2(A^T A Y - A^T X) = 0 \quad (26)$$

By performing linear combination on this Equation 24, the real world variables ($Y_{-N-h}, \ldots, Y_0, \ldots, Y_{N+h}$) can be respectively obtained so that a pixel value of the central pixel variable $Y_0$ can be output as a pixel value of the target pixel. In other words, by obtaining a coefficient for the central pixel variable $Y_0$ for each motion amount, storing them as processing coefficients beforehand in the processing-coefficient-setting section 37, using processing coefficients that correspond to motion amounts stored in the processing-coefficient-setting section 37 to calculate multiply and accumulation of them and pixel values, a motion-blur-removed pixel value is output. By performing such processing on all of the pixels in the processing region, it is possible to obtain motion-blur-mitigated real world variables in the processing region.

Although the above example has obtained the real world variables ($Y_{-N-h}, Y_0, \ldots, Y_{N+h}$) by the least-squares method so that a sum of squares E of errors in AY=X+e may be minimized, it is also possible to make the equations in such a manner that the number of the equations may be equal to the number of the variables. By assuming this equation to be AY=X and modifying it into Y=$A^{-1}$X, the real world variables ($Y_{-N-h}, \ldots, Y_0, \ldots, Y_{N+h}$) can be obtained.

By the way, in a case where no shutter operation is executed, the exposure time ratio is always one and be unchanged to constitute an image in which a moving object OBf is successively moved. Since the moving object OBf is a successively moving image, by using a time-directional main term, it is possible to perform any robust blur-removing processing even if there is any shift in detection of the motion vector, thereby simplifying the configuration of the image-processing apparatus.

Figure 30:
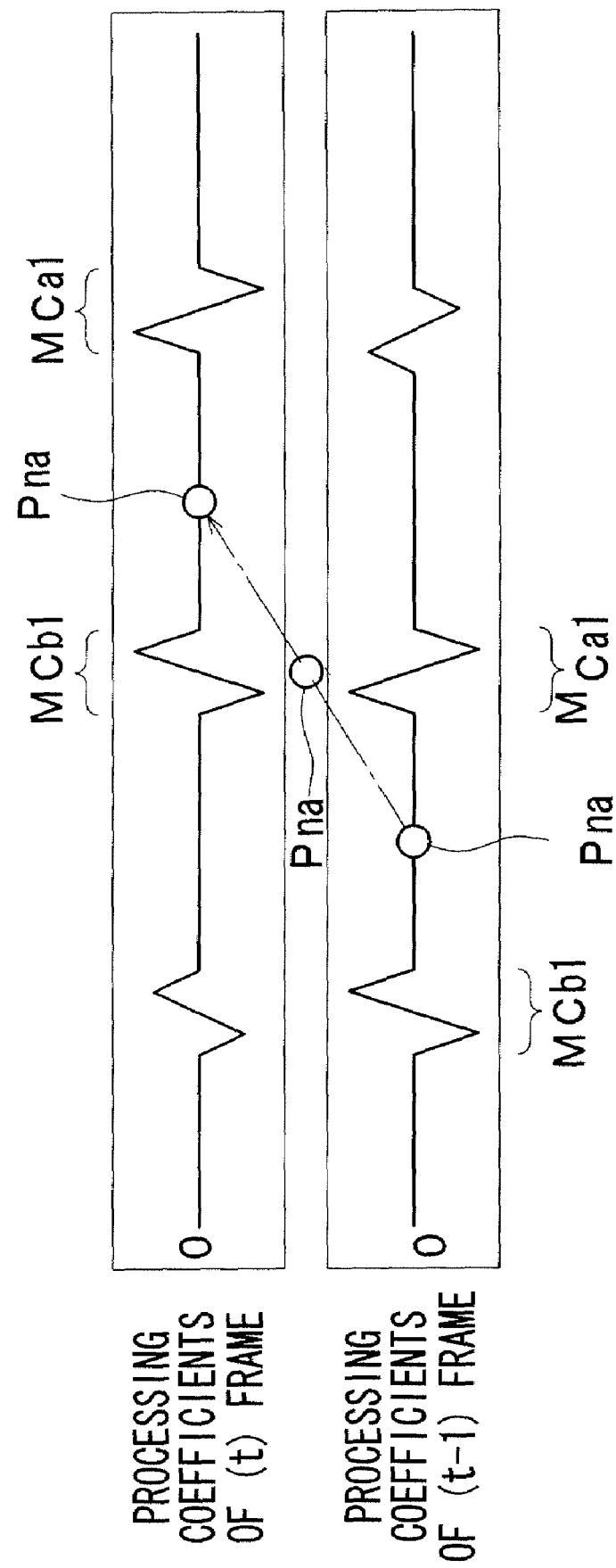
FIG. 30 is a diagram for showing main terms and the processing coefficients.

Next, the main terms will be described. If processing coefficients which are used for each pixel are obtained by the above-described model equations etc., the processing coefficients get such a shape as shown in FIG. 30, thus having portions where their own absolute value increases. Such portions of the processing coefficients as to have an increased absolute value provide the main terms. Locations of the main terms become pixel positions that correspond to a motion direction and a motion amount with reference to the target pixel Pna. It is to be noted that in FIG. 30, a main term MCa1 is closest to the target pixel Pna in the moving direction and a main term MCb1 is closest to it in a direction opposite to the motion direction. The main terms MCa1 and MCb1 occur at positions that are distant from the target pixel Pna by a half of the motion amount in the motion direction and the direction opposite to the motion direction, respectively. Further, the adjacent main terms occur at positions that are distant from each other by the motion amount in the motion direction or the direction opposite to the motion direction.

If the main terms are used in the time direction, the positions of the main terms are indicated at the same pixel position. In other words, with paying attention to the above-described main terms MCa1 and MCb1, the position of the main term MCa1 in an image of the (t−1) frame agrees with that of the main term MCb1 in an image of the (t) frame. Therefore, a pixel position which has a phase at the center of the (t−1) and (t) frames and at which both the main terms MCa1 and MCb1 are located corresponds to the target pixel Pna. Accordingly, by calculating a pixel value by using main terms of, for example, two frames and outputting the pixel value at a phase at the center of the two frames, it is possible to properly output a pixel value of the target pixel from which motion blur has been removed.

Figure 31:
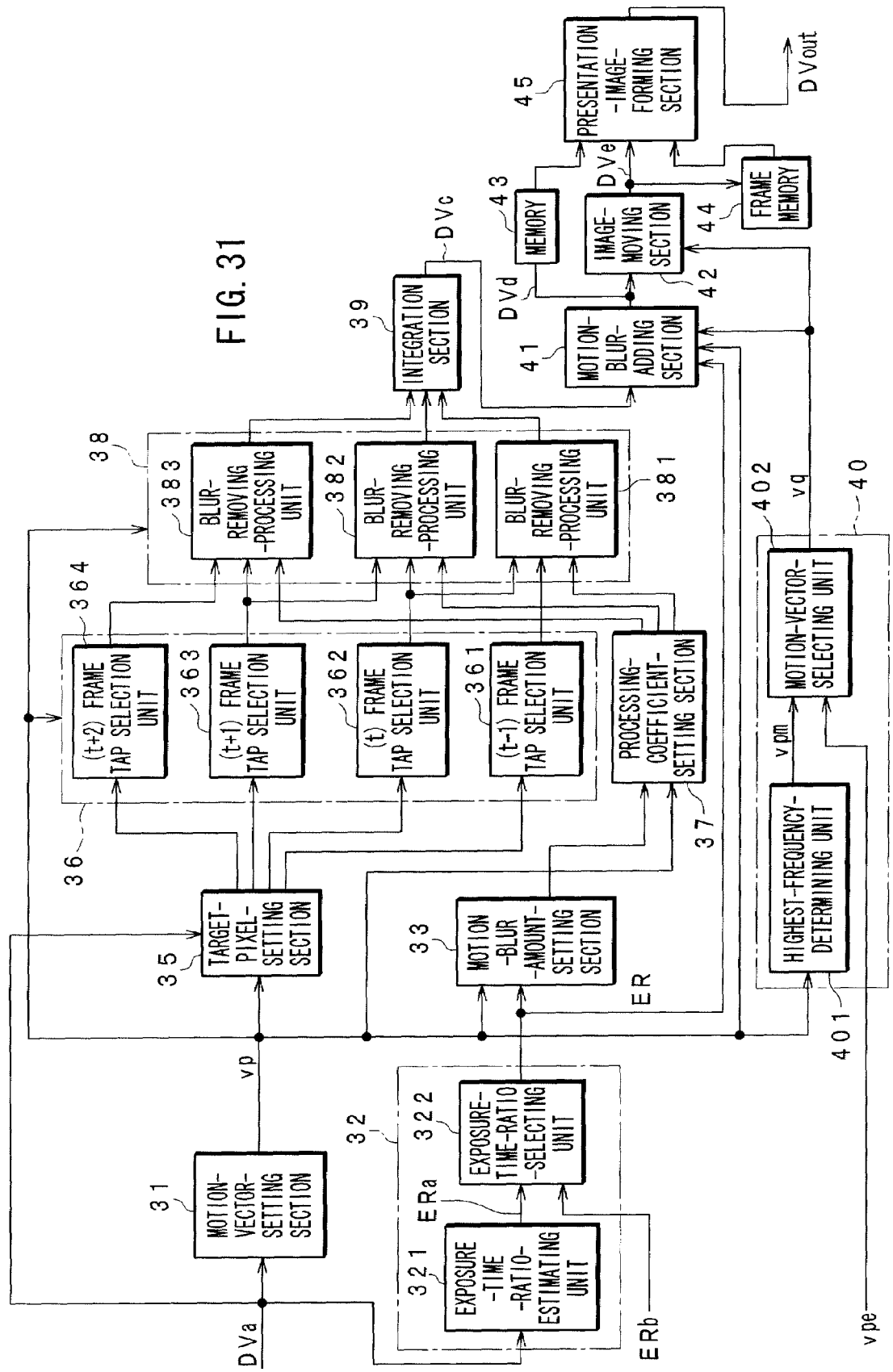
FIG. 31 is another functional block diagram of the image-processing apparatus.

FIG. 31 is a functional block diagram of the image-processing apparatus that removes any motion blurs by using main terms in space and time directions to employ the center of frames as a phase at which the motion-blur-removed target pixel Pna is to be output. It is to be noted that functions of the image-processing apparatus may be realized by hardware or software. In other words, the function blocks of FIG. 31 may be realized by either hardware or software using the configuration of the above-mentioned figure.

If employing the center of frames as a phase at which the motion-blur-removed target pixel Pna is to be output, in order to obtain an image of three frames, images of four frames must be used. Accordingly, the processing-region-setting section 36 in the image-processing apparatus shown in FIG. 31 is provided with a (t+2) frame tap selection unit 364 in addition to a (t−1) frame tap selection unit 361, a (t) frame tap selection unit 362, and a (t+1) frame tap selection unit 363. Each blur-removing-processing unit in the pixel-value-generating section uses the taps extracted from two consecutive frames and the processing coefficients supplied from the processing-coefficient-setting section 37, to generate a pixel value of the target pixel Pna whose motion blur has been removed with the center of the two frames being provided as a phase at which the pixel value is to be output.

The target-pixel-setting section 35 sets a plurality of images to be processed, which include a target image, detects pixels on the images to be processed whose space positions correspond to a target pixel Pna in the target image based on the image motion vp set by the motion-vector-setting section 31, and sets the detected pixel as a target pixel in each of the images to be processed. It also supplies the processing-region-setting section 36 with the plurality of images to be processed in each of which the target pixel is set.

For example, if supposing an image of a (t) frame to be a target image, images of (t−1), (t), (t+1), and (t+2) frames are set to images to be processed. In this case, based on the motion vector vp, pixels on images of the (t−1) frame and (t+1) frame corresponding to the target pixel Pna in the target image are set as target pixels. Moreover, an image to be processed in the (t) frame is supplied to a (t) frame tap selection unit 362 of the processing-region-setting section 36; an image to be processed in the (t−1) frame in which the target pixel is set is supplied to a (t−1) frame tap selection unit 361; an image to be processed in the (t+1) frame in which the target pixel is set is supplied to a (t+1) frame tap selection unit 363; and an image to be processed in the (t+2) frame in which the target pixel is set is supplied to a (t+2) frame tap selection unit 364, respectively.

Further, a reference target image is not limited to an image of the (t) frame but may be an image of the (t−1), (t+1) or (t+2) frame. Moreover, with reference to setting any pixel in the target image as a target pixel, the target pixel is specified from an outside or pixels in the target image are sequentially specified automatically as the target pixel.

The (t−1) frame tap selection unit 361 of the processing-region-setting section 36 sets a processing region in a motion direction corresponding to the motion vector vp, based on the space position of the target pixel in the image to be processed, which is supplied from the target-pixel-setting section 35, in order to extract the main term mainly including components of the target pixel, extracts at least pixels roughly corresponding to the space position of the target pixel from the processing region, and supplies the blur-removing-processing unit 381 of the pixel-value-generating section 38 with the extracted pixel values of the pixels.

The (t) frame tap selection unit 362, the (t+1) frame tap selection unit 363, and the (t+2) frame tap selection unit 364 extract pixel values similar to that of the (t−1) frame tap selection unit 361, and supply blur-removing-processing units 381 through 383 with the extracted pixel values of their pixels, respectively.

A processing-coefficient-setting section 37 stores beforehand processing coefficients for blur-removing processing and supplies the pixel-value-generating section 38 with the stored processing coefficients. Further, when receiving any adjustment information for allowing the motion blur to be adjusted from an outside, which is not shown, the processing-coefficient-setting section 37 switches the processing coefficients to be supplied to the pixel-value-generating section 38 based on this adjustment information to adjust any motion-blur-removing effects. For example, even if motion blur cannot be optimally removed by first supplied processing coefficients, it is possible to remove the motion blur optimally by switching the processing coefficients. Moreover, by switching the processing coefficients, any motion blur may be remained intentionally.

When the specific processing coefficients based on the motion blur amount MBp are stored in the processing-coefficient-setting section 37, the blur-removing-processing unit 381 of the pixel-value-generating section 38 newly generates pixel values for processing corresponding to the pixel values extracted from the (t−1) frame tap selection unit 361 in the processing-region-setting section 36 and the motion direction corresponding to the motion vector vp, and performs multiply and accumulation calculation of thus generated pixel values for processing and the specific processing coefficients, to generate a pixel value. It also newly generates pixel values for processing corresponding to the pixel values extracted from the (t) frame tap selection unit 362 and the motion direction corresponding to the motion vector vp and performs multiply and accumulation calculation of thus generated pixel values for processing and the specific processing coefficients, to generate a pixel value. The two pixel values thus generated are integrated and supplied to the integration section 39 with a center in time of the (t−1) and (t) frames being employed as an output phase.

Figure 32:
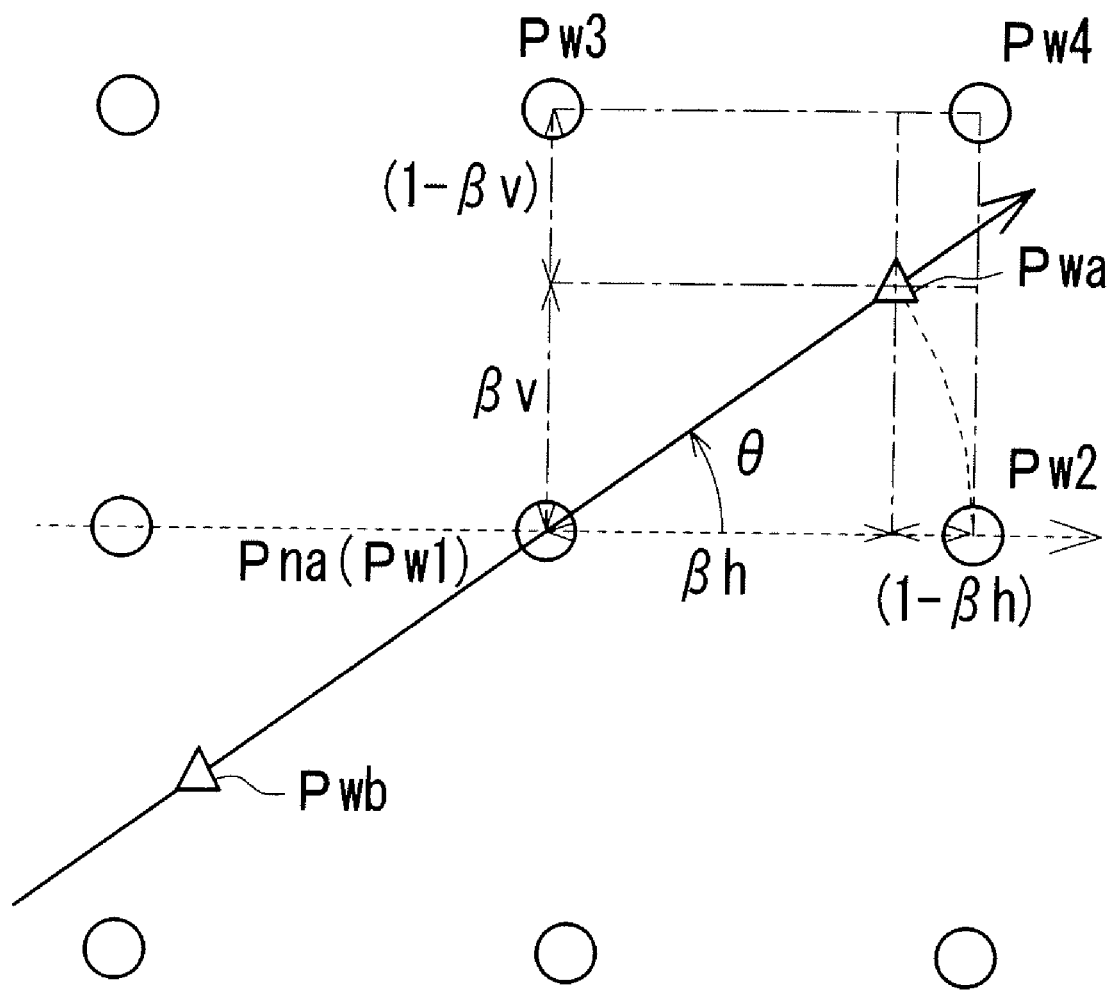
FIG. 32 is a drawing for illustrating how to calculate the processing coefficients.

Herein, generation of the processing coefficients for processing will be described as follows. In other words, if generating the processing coefficients used for blur-removing processing, processing coefficients obtained when setting a motion direction to a specific direction are set as the specific processing coefficients, which are stored in the processing-coefficient-setting section 37 for each motion blur amount (each motion amount). In the pixel-value-generating section 38, if a motion direction corresponding to the motion vector vp has an angle difference of θ with respect to the specific direction when the processing coefficients are generated, for example, if the motion direction set when the processing coefficients are generated is a horizontal direction and a motion direction has an angle difference of θ with respect thereto, as shown in FIG. 32, a pixel position corresponding to the processing coefficients in the motion direction from the target pixel Pna are positions Pwa, Pwb indicated by triangle symbols. Thus, the pixel value DPwa of the position Pwa is calculated by Equation 27 using the pixel values of peripheral pixel positions Pw1, Pw2, Pw3, and Pw4. Similarly, the pixel value DPwb of the position Pwb that is positioned in a direction opposite to the position Pwa is also calculated.

$$DPwa = (1 - \beta h) \times (1 - \beta v) \times DPw1 + \qquad (27)$$
$$\beta h \times (1 - \beta v) \times DPw2 +$$
$$(1 - \beta h) \times \beta v \times DPw3 +$$
$$\beta h \times \beta v \times DPw4$$

where $\beta h = \cos \theta$, $\beta v = \sin \theta$, DPw1 is a pixel value of pixel position Pw1, and DPw2 to DPw4 are pixel values of pixel positions Pw2 to Pw4, respectively.

The processing-coefficient-setting section 37 may store the processing coefficients based on the motion blur amount and the motion direction. In this case, the coefficients multiplied with the pixel values, DPw1, DPw2, DPw3, and DPw4 in the above Equation 27 and the specific processing coefficients for each motion blur amount are respectively multiplied for each angle difference of θ and, in the processing-coefficient-setting section 37, each of the multiplied results is stored as the processing coefficients corresponding to the motion blur amount and the motion direction. The processing-coefficient-setting section 37 supplies the pixel-value-generating section 38 with the processing coefficients based on the motion blur amount from the motion-blur-amount-setting section 33 and the motion direction corresponding to the motion vector vp. The blur-removing-processing unit 381 performs multiply and accumulation calculation of the processing coefficients based on the motion blur amount and the motion direction and the pixel values of the peripheral pixel positions, to generate a pixel value, from which any motion blur is removed.

The blur-removing-processing unit 382, similar to the blur-removing-processing unit 381, generates the pixel value of the target pixel by using the pixel values supplied from the (t) frame tap selection unit 362 and the (t+1) frame tap selection unit 363 and the processing coefficients supplied from the processing-coefficient-setting section 37 and outputs it with a center in time of the (t) and (t+1) frames being employed as an output phase. The blur-removing-processing unit 383, similar to the blur-removing-processing unit 381, also generates the pixel value of the target pixel by using the pixel values supplied from the (t+1) frame tap selection unit 363 and the (t+2) frame tap selection unit 364 and the processing coefficients supplied from the processing-coefficient-setting section 37 and outputs it with a center in time of the (t+1) and (t+2) frames being employed as an output phase.

The integration section 39 integrates the pixel values supplied from the blur-removing-processing units 381 to 383 to output an image signal DVc of a motion-blur-removed target image as a pixel value of a target pixel in the motion-bur-removed target image.

The processing coefficients to be stored in the processing-coefficient-setting section can be obtained by using the above model equations. In other words, by introducing the constraint of "inter-adjacent pixel difference=0" as indicated by the Equation 20 and utilizing accumulation properties as indicated by the Equation 21, any matrix calculation of the pixels in a first region (corresponding to $Y_8$ through $Y_{-8}$ indicated in the Equation 21), which includes a target pixel in a still image corresponding to real world variables and the pixels in a second region (corresponding to $Y_6$ through $Y_{-6}$ indicated in the Equation 21), which includes pixel in the images, in which any motion blur occurs, whose space positions agree with that of the target pixel is performed, and the coefficients used for calculation of a central pixel variable $Y_0$ corresponding to the target pixel are stored in the processing-coefficient-setting section 37 as the processing coefficient. Accordingly, using the coefficients used for calculation of a central pixel variable $Y_0$ as the processing coefficients enables the motion-blur-removed pixel values to be calculated by using the pixel values of peripheral images.

Figure 33:
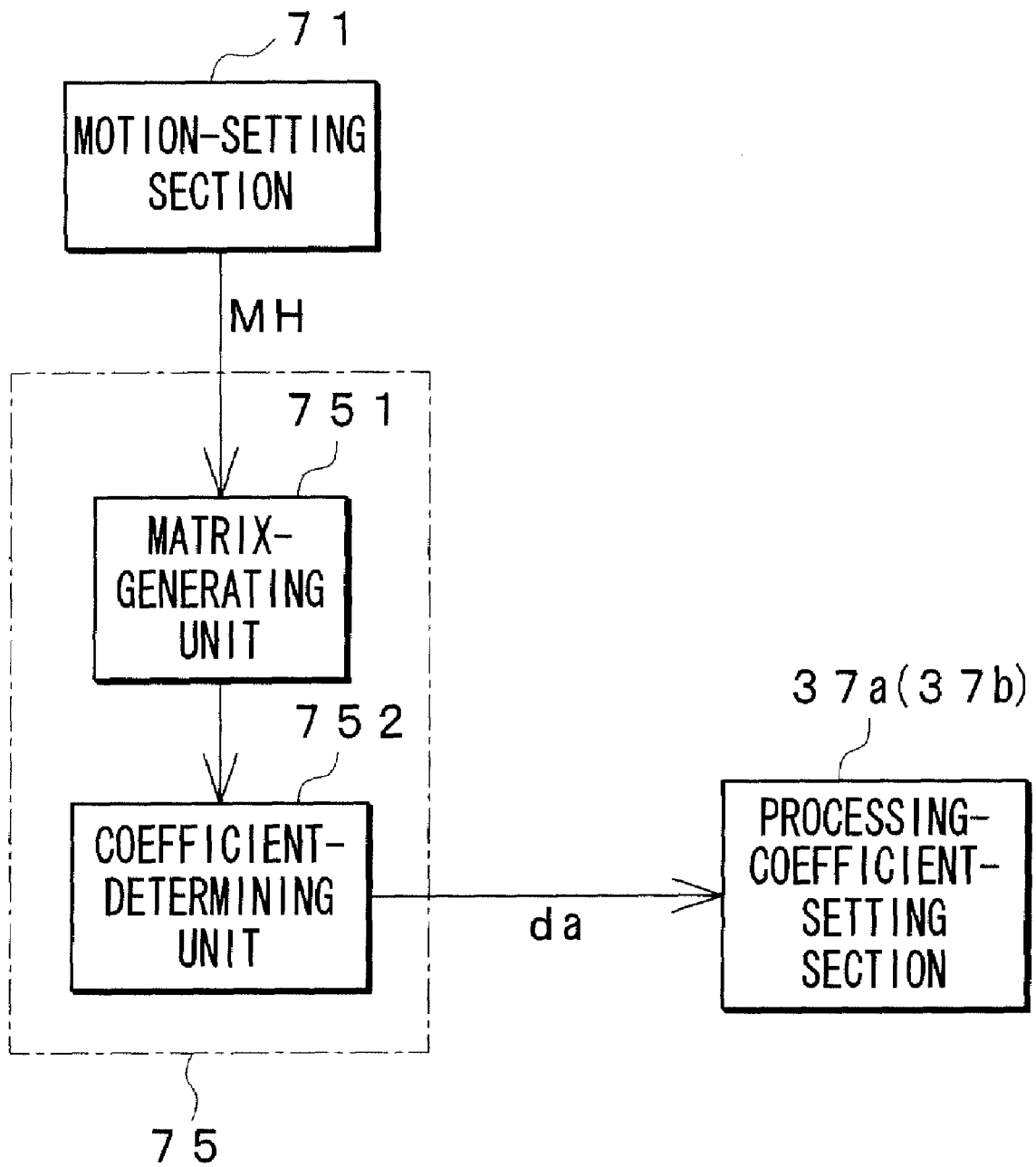
FIG. 33 is a functional block diagram of a coefficient-generating apparatus.

FIG. 33 is a functional block diagram of a coefficient generation apparatus that generates processing coefficients by using model equations. A motion-setting section 71 sets a motion direction and a motion amount and supplies a matrix-generating unit 751 with motion information MH indicative of the set motion direction and motion amount.

The matrix-generating unit 751 in a processing-coefficient-generating section 75, based on the motion information MH, constructs a mode constituted of at least two images to each of which a motion blur is added, to generate a matrix based on accumulation properties of pixel values of peripheral pixels in two images that have roughly the same space position as that of a target pixel located between two images, for example, images of a (t−1) frame image and a (t) frame and a constraint of "inter-adjacent pixel difference=0".

The following will describe a method for generating processing coefficients in a case of, for example, a motion amount v=5. In this case, such a model as shown in FIG. 27 is constructed, to generate a matrix. Since main terms correspond to pixels having pixel values $X_{-3}$, $X_{-2}$, $X_2$, and $X_3$, the matrix can be expressed as Equation 28.

$$\begin{bmatrix} 0 & 0 & 0 & 1/v & 1/v & 1/v & 1/v & 1/v & 0 & 0 & 0 & 0 & 0 & 0 & 0 & 0 \\ 0 & 0 & 0 & 0 & 1/v & 1/v & 1/v & 1/v & 1/v & 0 & 0 & 0 & 0 & 0 & 0 & 0 \\ 0 & 0 & 0 & 0 & 0 & 0 & 0 & 0 & 1/v & 1/v & 1/v & 1/v & 1/v & 0 & 0 & 0 \\ 0 & 0 & 0 & 0 & 0 & 0 & 0 & 0 & 0 & 1/v & 1/v & 1/v & 1/v & 1/v & 0 & 0 \\ 1 & -1 & 0 & 0 & 0 & 0 & 0 & 0 & 0 & 0 & 0 & 0 & 0 & 0 & 0 & 0 \\ 0 & 1 & -1 & 0 & 0 & 0 & 0 & 0 & 0 & 0 & 0 & 0 & 0 & 0 & 0 & 0 \\ 0 & 0 & 1 & -1 & 0 & 0 & 0 & 0 & 0 & 0 & 0 & 0 & 0 & 0 & 0 & 0 \\ 0 & 0 & 0 & 1 & -1 & 0 & 0 & 0 & 0 & 0 & 0 & 0 & 0 & 0 & 0 & 0 \\ 0 & 0 & 0 & 0 & 1 & -1 & 0 & 0 & 0 & 0 & 0 & 0 & 0 & 0 & 0 & 0 \\ 0 & 0 & 0 & 0 & 0 & 1 & -1 & 0 & 0 & 0 & 0 & 0 & 0 & 0 & 0 & 0 \\ 0 & 0 & 0 & 0 & 0 & 0 & 1 & -1 & 0 & 0 & 0 & 0 & 0 & 0 & 0 & 0 \\ 0 & 0 & 0 & 0 & 0 & 0 & 0 & 1 & -1 & 0 & 0 & 0 & 0 & 0 & 0 & 0 \\ 0 & 0 & 0 & 0 & 0 & 0 & 0 & 0 & 1 & -1 & 0 & 0 & 0 & 0 & 0 & 0 \\ 0 & 0 & 0 & 0 & 0 & 0 & 0 & 0 & 0 & 1 & -1 & 0 & 0 & 0 & 0 & 0 \\ 0 & 0 & 0 & 0 & 0 & 0 & 0 & 0 & 0 & 0 & 1 & -1 & 0 & 0 & 0 & 0 \\ 0 & 0 & 0 & 0 & 0 & 0 & 0 & 0 & 0 & 0 & 0 & 1 & -1 & 0 & 0 & 0 \end{bmatrix} \begin{bmatrix} Y_{-8} \\ Y_{-7} \\ Y_{-6} \\ Y_{-5} \\ Y_{-4} \\ Y_{-3} \\ Y_{-2} \\ Y_{-1} \\ Y_0 \\ Y_1 \\ Y_2 \\ Y_3 \\ Y_4 \\ Y_5 \\ Y_6 \\ Y_7 \\ Y_8 \end{bmatrix} = \begin{bmatrix} X_{-3} \\ X_{-2} \\ X_2 \\ X_3 \\ 0 \\ 0 \\ 0 \\ 0 \\ 0 \\ 0 \\ 0 \\ 0 \\ 0 \\ 0 \\ 0 \\ 0 \end{bmatrix} \quad (28)$$

It is thus possible to uniquely obtain a matrix to obtain $Y_0$ as indicated in the Equation 24. In other words, it is possible to obtain processing coefficients (matrix) to be linearly combined with the pixel values $X_{-3}$, $X_{-2}$, $X_2$, and $X_3$ of the main terms in a case of the motion amount v=5. Although the above equation has added constraint equations so that unknown numbers Y may agree with the number of the equations, further constraint equation (s) may be added to establish a relationship of "unknown numbers Y<number of equations", as indicated in the Equation 21, thereby obtaining processing coefficients by the least-squares method using the least-squares method. Thus, the matrix-generating unit 751 can generate a matrix for each motion amount as describe above so that a coefficient-determining unit 752 can obtain a processing coefficient for each motion amount. Further, in a case of the motion amount v=4, pixel values of the main terms are of $X_{-3}$, $X_{-2}$, $X_{-1}$, $X_1$, $X_2$, and $X_3$, thereby obtaining a matrix as that indicated in Equation 29.

$$\begin{bmatrix} X_{-3} & X_{-2} & X_{-1} & X_1 & X_2 & X_3 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \end{bmatrix} =$$

$$\begin{bmatrix} Y_{-7b} & Y_{-7a} & Y_{-6b} & Y_{-6a} & Y_{-5b} & Y_{-5a} & Y_{-4b} & Y_{-4a} & Y_{-3b} & Y_{-3a} & Y_{-2b} & Y_{-2a} & Y_{-1b} & Y_{-1a} & Y_{0b} & Y_{0a} & Y_{1b} & Y_{1a} & Y_{2b} & Y_{2a} & Y_{3b} & Y_{3a} & Y_{4b} & Y_{4a} & Y_{5b} & Y_{5a} & Y_{6b} & Y_{6a} & Y_{7b} & Y_{7a} & Y_{8b} & Y_{8a} \end{bmatrix}$$

[Matrix of coefficients as shown in figure]

Figure 34A:
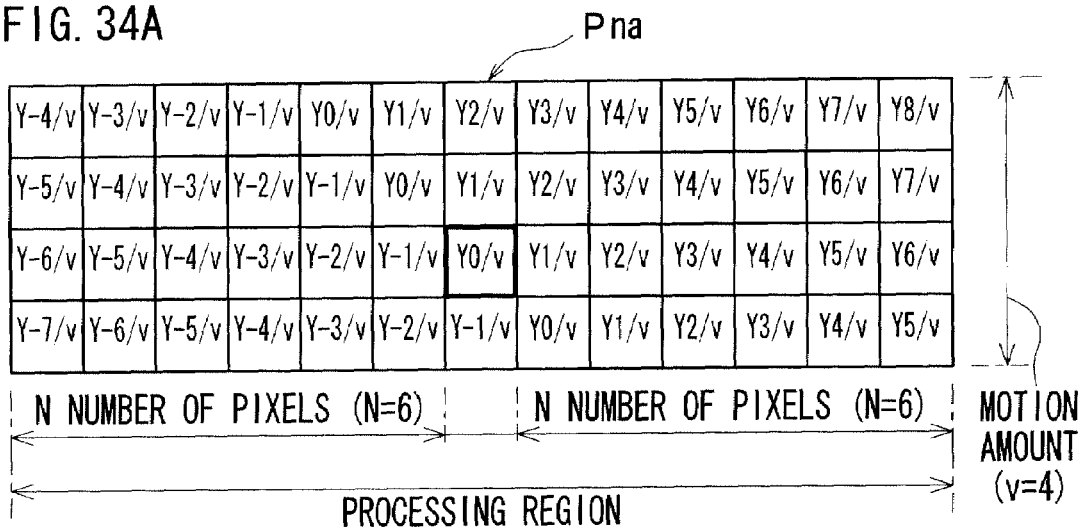
FIGS. 34A and 34B are explanatory charts of time-wise mixture of real world variables in a processing region (in a case where a moving distance v=4)
Figure 34B:
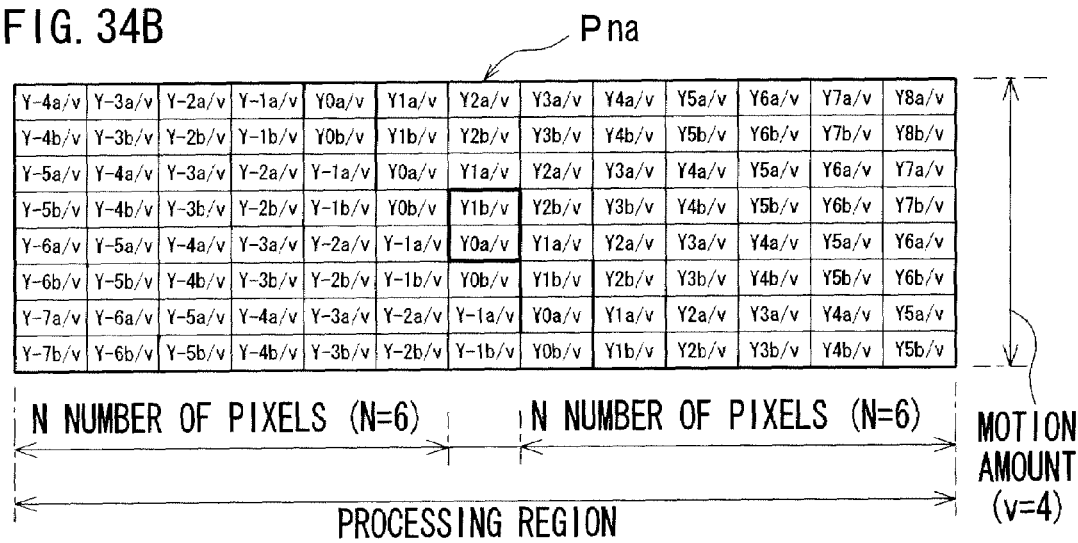

If the motion amount v is as much as an odd number of pixels, the central pixel variable $Y_0$ has its phase centered time-wise as shown in FIG. 29. However, if the motion amount v is as much as an even number of pixels, the central pixel variable $Y_0$ has its phase not centered time-wise as shown in FIG. 34A, thus encountering a difference in phase. Therefore, the virtual divisor is increased by two, to divide one period of frame time into eight with equal time intervals as shown in FIG. 34B. Moreover, by adding up $Y_{0a}$ and $Y_{1b}$, it is possible to obtain a value whose phase is centered time-wise as in the case of the central pixel variable $Y_0$ where the motion amount v is as much as an odd number of pixels.

Further, with taking a space phase into consideration, a main term in a case where the motion amount is as much as an odd number of pixels has its coefficient greatly fluctuating in units of two consecutive pixels. Accordingly, if obtaining a target pixel Pna by using main terms, the phase of the target pixel Pna is located at the center of the two pixels. In other words, a motion-blur-removed image has its phase shifted by a half of pixel with respect to an image relative to each of the (t−1) and (t) frames.

Figure 35:
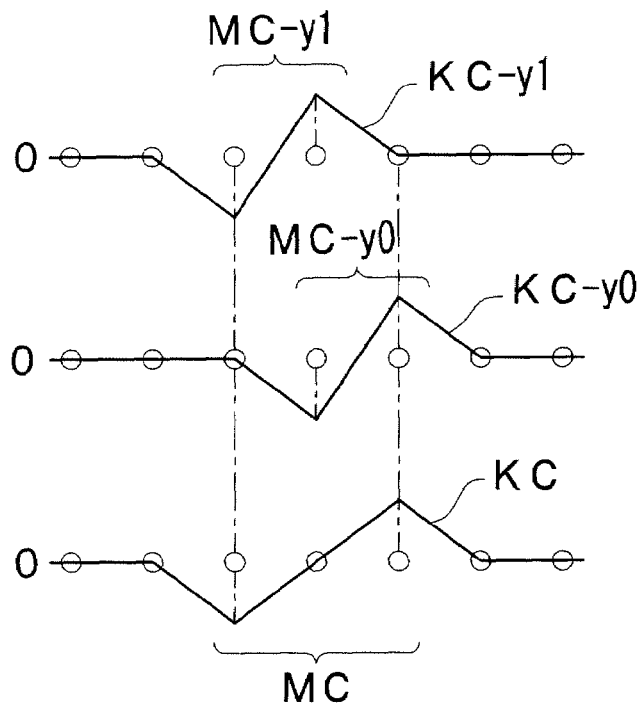
FIG. 35 is an explanatory diagram of main terms and processing coefficients in the case of matching space-directional phases with each other.

Further, to prevent occurrence of a half-pixel shift in phase, processing coefficient KC-y0 corresponding to the central pixel variable $Y_0$ and processing coefficient KC-y1 corresponding to a variable $Y_1$ (alternatively, $Y_{-1}$), as shown in FIG. 35, can be added up to use a halved processing coefficient KC. It is to be noted that in FIG. 35, circles indicate pixel positions. If such a processing coefficient KC is generated, main terms MC are provided in units of three pixels, so that by using the processing coefficients KC, phase of the target pixel Pna is the same as those of pixels of the images of the (t−1) frame and (t) frame, thereby enabling to be obtained an image from which the motion blur has been removed and which has the same phase as those of images of the (t−1) frame and (t) frame. When the motion amount v is as much as an even number of pixels as shown in FIG. 34B, since the virtual divisor is increased by two, the variable $Y_{0a}$ is half the variable $Y_0$ and the variable $Y_{1b}$ is half the variable $Y_1$, so that a sum of the variables $Y_{0a}$ and $Y_{1b}$ is equal to half a sum of the processing coefficient KC-y0 corresponding to the central pixel variable $Y_0$ and processing coefficient KC-y1 corresponding to a variable $Y_1$, thereby providing, in units of three pixels, main terms in a case where the motion amount v is as much as an even number of pixels.

Therefore, in a case where the motion amount v is as much as an even number of pixels or the motion amount v is as much as an odd number of pixels, as described above, by converting main terms in units of three pixels and setting processing coefficients so as to be stored, a pixel value of the target pixel from which the motion blur has been removed can be output at the same pixel position as pixels of two frames.

Figure 36:
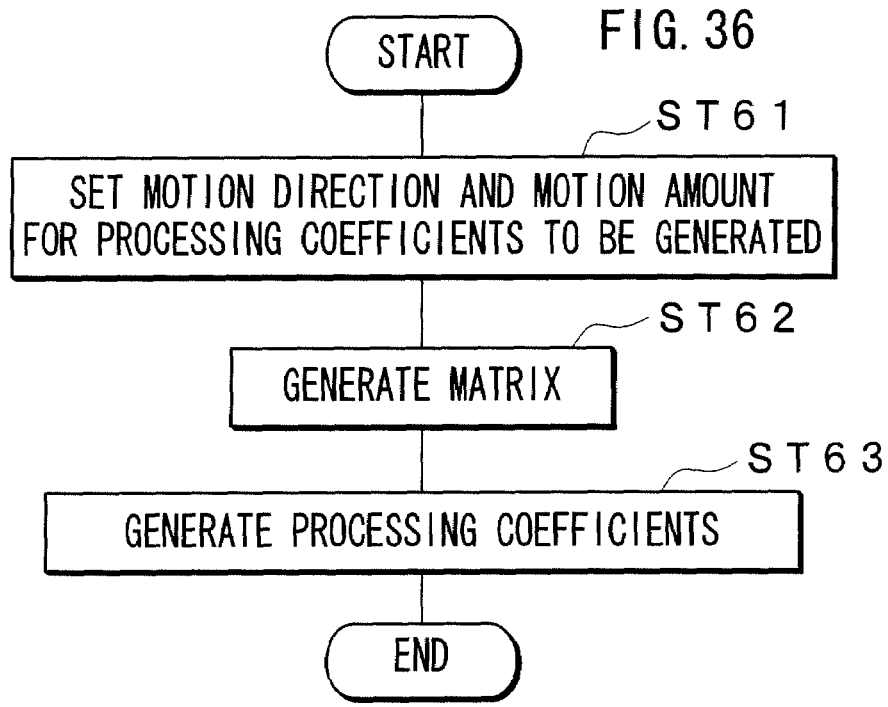
FIG. 36 is a flowchart for showing coefficient-generating processing.

FIG. 36 is a flowchart for showing coefficient-generating processing by using model equations. At step ST61, a motion direction and a motion amount for processing coefficients to be generated are set.

At step ST62, a matrix is generated. As for the generation of the matrix, as described above, the model in which a motion blur is added to the images is constructed, so that the matrix indicating accumulation properties can be generated by introducing a constraint of inter-adjacent pixel difference=0. At step ST63, the coefficients to be used for calculation of the target pixel are generated based on the matrix generated at the step ST62 and the motion direction, and then, they are set as the processing coefficients.

Figure 37:
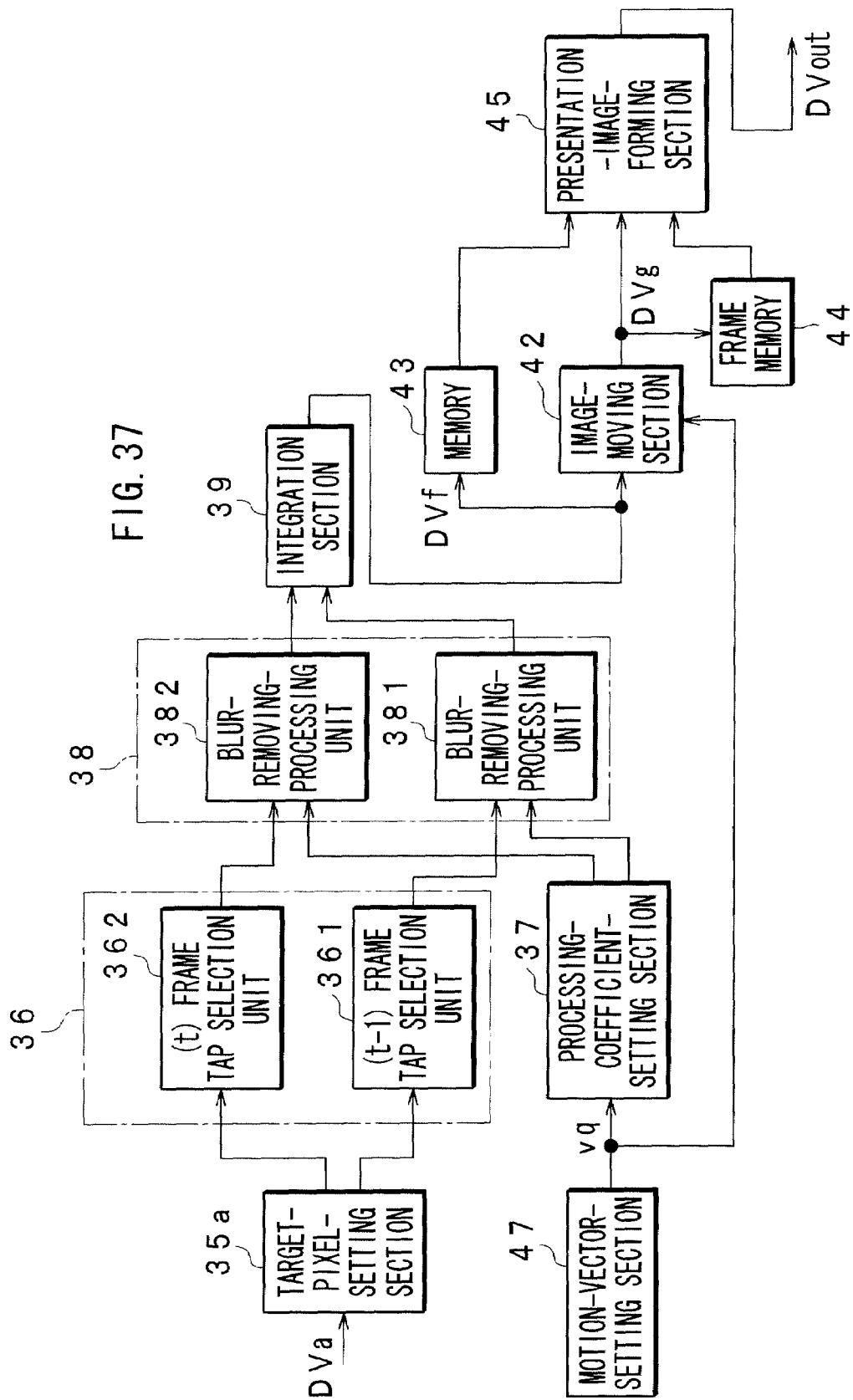
FIG. 37 is another functional block diagram of the image-processing apparatus.

FIG. 37 is another functional block diagram of an image-processing apparatus in a case where no shutter operation is performed. It is to be noted that components of FIG. 37 that correspond to those of FIG. 6 are indicated by the same symbols, detailed description of which will be omitted. The target-pixel-setting section 35a sets a target pixel on a central phase of two frames and sets pixel of positions corresponding to this target pixel as the target pixel as the target pixels of the images to be processed of two frames. For example, if there is a target image on a central phase of (t−1) frame and (t) frame, images of (t−1) and (t) frames are set to images to be processed. Moreover, pixels of positions on the images to be processed corresponding to the set target pixel are set as the target pixels of the images to be processed.

The (t−1) frame tap selection unit 361 of the processing-region-setting section 36 sets processing regions with reference to the target pixel in the image to be processed, which is supplied from the target-pixel-setting section 35a, namely, the main term. It also supplies the blur-removing-processing unit 381 of the pixel-value-generating section 38 with the pixel value in the processing regions. The (t) frame tap selection unit 362 sets the processing regions with reference to the main term, similar to that of the (t−1) frame tap selection unit 361. It also supplies a blur-removing-processing unit 382 with pixel value in the processing region.

A motion-vector-setting section 47 sets a motion vector of a viewpoint and supplies it to a processing-coefficient-setting section 37. This motion-vector-setting section 47 supplies the processing-coefficient-setting section 37 with a motion vector for setting a viewpoint, which is supplied from an outside by a user or the like, as the motion vector vq for the viewpoint.

The processing-coefficient-setting section 37 reads the processing coefficients corresponding to the motion vector vq for the viewpoint and supplies them to the blur-removing-processing units 381, 382. The blur-removing-processing units 381, 382 of the pixel-value-generating section 38 performs calculation processing using the pixel values in the processing regions and the processing coefficients to generate the blur-removed pixel values and supply them to an integration section 39. The integration section 39 integrates the pixel values supplied from the blur-removing-processing units 381, 382 as described above, to generate a pixel value of an image with a central phase of the (t−1) and (t) frames and supplies it to an image-moving section 42 and a memory 43 as an image signal DVf.

Herein, when a motion amount of the motion vector vq for the viewpoint is equal to the motion amount of the moving object and a motion direction of the motion vector vq for the viewpoint is opposite to the motion direction of the moving object, any motion blurs are removed from an image of the moving object and output from the integration section 39. Alternatively, when the motion amount of the motion vector vq for the viewpoint is different from the motion amount of the moving object or the motion direction of the motion vector vq for the viewpoint is not opposite to the motion direction of the moving object, an image in which any motion blur remains based on differences of the motion amounts and the motion directions is output from the integration section 39.

The image-moving section 42 entire-screen-moves an image based on the image signal DVf output from the integration section 39 by a motion amount of the motion vector vq for the viewpoint in a direction opposite to the motion direction of motion vector vq for the viewpoint, based on the motion vector vq of the viewpoint vq supplied from the motion-vector-setting section 47. It also supplies an entire-screen-moved image signal DVg to a frame memory 44 and a presentation-image-forming section 45. The presentation-image-forming section 45 forms an image signal DVout for a presentation image by using the entire-screen-moved image signal DVg or an image signal for images stored in the memory 43 and/or the frame memory 44 and outputs it.

Figure 38:
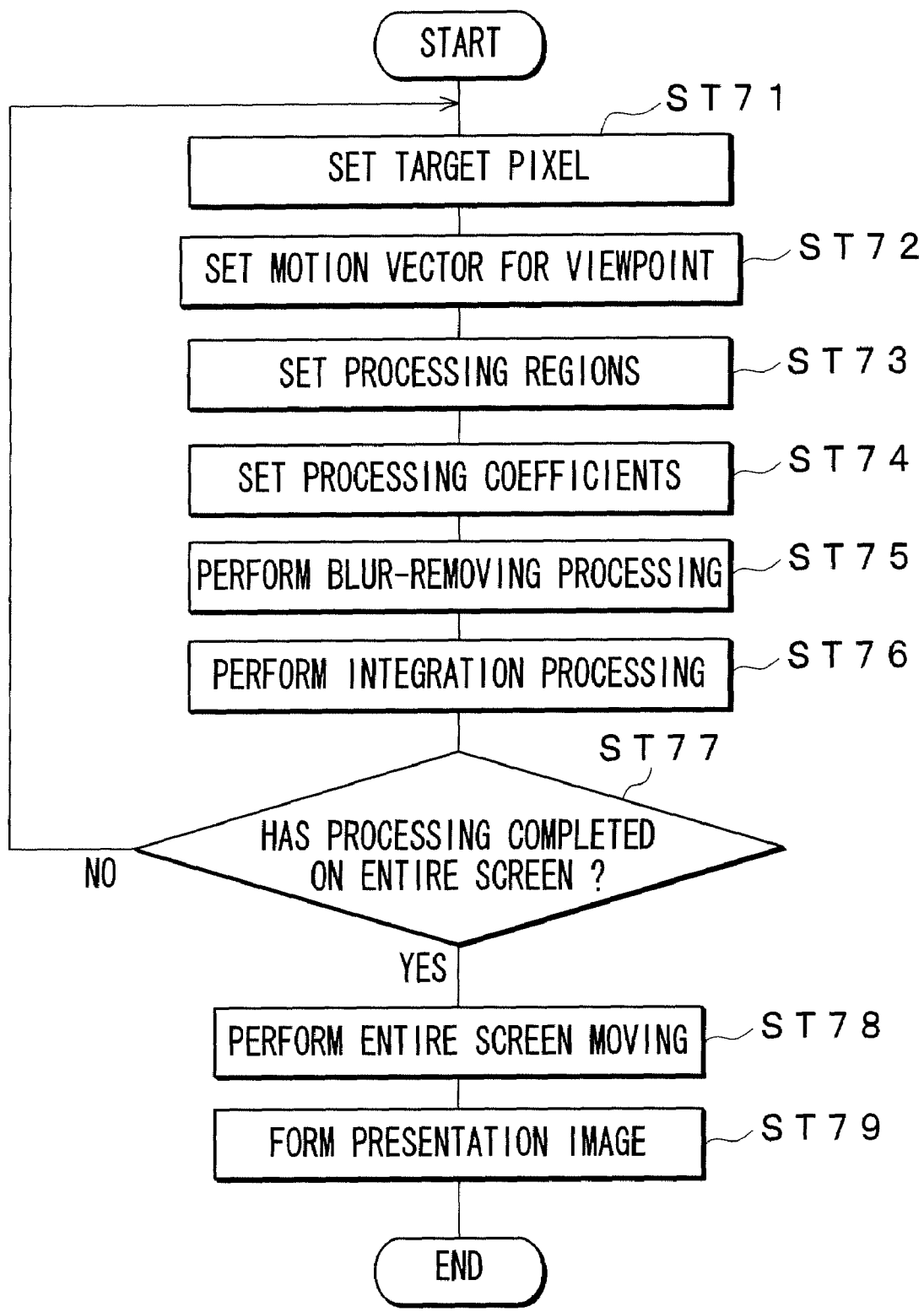
FIG. 38 is a flowchart for showing image processing when no shutter operation is performed.

FIG. 38 shows a flowchart in the case of performing image processing by using software when no shutter operation is performed. At step ST71, the CPU 201 sets a target pixel and proceeds to step ST72. At the step ST72, the CPU 201 sets the motion vector for viewpoint and proceeds to step ST73. At the step ST73, the CPU 201 sets the processing regions as the center of each of the target pixels on the images to be processed. At step ST74, the CPU 201 sets the processing coefficients corresponding to the motion vector for viewpoint set in the step ST72 and proceeds to step ST75.

At the step ST75, the CPU 201 performs blur-removing processing on each of the images to be processed. In other words, it performs any calculation processing on each of the images to be processed using the pixel values in the processing regions set at the step ST73 and the processing coefficients set at the step ST74, to calculate the blur-removed pixel value for each target pixel in each of the images to be processed, and proceeds to step ST76. At the step ST76, the CPU 201 performs integration processing on the pixel values calculated at the step ST75 for each image to be processed to generate one pixel value and set it as a pixel value of an image with a central phase of the images to be processed, and then, proceeds to step ST77.

At the step ST77, the CPU 201 decides whether blur-removing processing has completed on entire screen and, if any one of the pixels is not undergone yet the blur-removing processing, it returns to the step ST71 while if the processing has completed on the entire screen, it proceeds to step ST78.

At the step ST78, the CPU 201 entire-screen-moves the motion-blur-added target image based on the motion vector for the viewpoint to generate the arbitrary viewpoint image and proceeds to step ST79. At the step ST79, the CPU 201 forms a presentation image. In other words, any interpolation is performed on a portion in which no pixel value is presented to form the presentation image and the processing ends.

When, thus, no shutter operation is performed, it is possible to generate any arbitrary viewpoint images with a simple configuration without setting the motion vector and the exposure time ratio for each pixel. It is to be noted that the arbitrary viewpoint image in this moment is an image to which no motion blur by changing the viewpoint is added.

The processing coefficients used when no shutter operation is performed, is not limited to a case where they are obtained by using the model equations but may be generated through learning by using any teacher images and any student images.

INDUSTRIAL APPLICABILITY

As described above, an image-processing apparatus, an image-processing method, and an image-processing program according to the present invention may be useful in extracting information embedded into an image signal that can be obtained by picking-up a real society with an image sensor and be suitable for obtaining a high-resolution image from which any motion blurs are removed.

The invention claimed is:

1. An image-processing apparatus comprising:
   a motion-vector-setting section that sets a first motion vector in units of pixel in a target image;
   an exposure-time-ratio-setting section that sets in units of image an exposure time ratio that is a ratio between a time interval of the target image and a period of exposure time;
   a motion-blur-amount-setting section that sets a motion blur amount in units of pixel based on the first motion vector set in units of pixel in the motion-vector-setting section and the exposure time ratio set in the exposure-time-ratio-setting section;
   a processing-region-setting section that sets a processing region corresponding to a target pixel in the target image based on the motion blur amount set in the motion-blur-amount-setting section and a motion direction corresponding to the first motion vector;
   a processing-coefficient-setting section that sets a specific processing coefficient based on the motion blur amount set in the motion-blur-amount-setting section or sets a processing coefficient that corresponds to the motion blur amount and the motion direction of the target pixel;
   a pixel-value-generating section that generates a pixel value that corresponds to the target pixel by linear combination of a new pixel value for processing generated corresponding to the motion direction from the pixel value corresponding to the pixel in the processing region and the specific processing coefficient set in the processing-coefficient-setting section or by linear combination of the pixel value corresponding to the pixel in the processing region and the processing coefficient set corresponding to the motion blur amount and the motion direction;
   a motion-blur-adding section that adds a motion blur in units of pixel to an image containing the pixel value generated by the pixel-value-generating section based on an input second motion vector and the first motion vector; and
   an image-moving section that moves the motion-blur-added target image, to which motion-blur-adding section adds a motion blur, along a counter vector of the second motion vector.

2. The image-processing apparatus according to claim 1, wherein the motion-blur-adding section adds the motion blur to the image based on the exposure time ratio.

3. The image-processing apparatus according to claim 1, comprising a presentation-image-forming section that forms a presentation image by means of interpolation on a portion, which contains no pixel value, in the motion-blur-added target image moved by the image-moving section.

4. The image-processing apparatus according to claim 3, comprising a storage section that stores motion-blur-added peripheral images, to which the motion-blur-adding section adds a motion blur and which are images before and after the target image in time, by accumulating the pixel value generated in the pixel-value-generating section,
   wherein the presentation-image-forming section acquires from the motion-blur-added peripheral images a pixel value relative to the portion containing no pixel value when presenting the motion-blur-added target image to perform the interpolation on the portion containing no pixel value by using the pixel value.

5. The image-processing apparatus according to claim 3, wherein the presentation-image-forming section allocates a fixed value to the portion containing no pixel value in the motion-blur-added target image moved by the image-moving section.

6. The image-processing apparatus according to claim 3, wherein the presentation-image-forming section folds back a pixel value of pixel that stays out of an image frame by moving the motion-blur-added target image and allocates the folded pixel value to the portion containing no pixel value in the motion-blur-added target image moved by the image-moving section.

7. The image-processing apparatus according to claim 1 comprising a frame memory larger than the target image, wherein in the motion-blur-added target image moved by the image-moving section along the counter vector of the second motion vector, a pixel value that stays out of an image frame by the target image is also stored in the frame memory.

8. The image-processing apparatus according to claim 7, wherein the image-moving section consecutively stores the motion-blur-added target image moved by the image-moving section in the frame memory.

9. The image-processing apparatus according to claim 1 comprising:
- a target-pixel-setting section that sets the target pixel for each image based on the motion vector set in the motion-vector-setting section; and
- an integration section that outputs a single pixel value,
- wherein the processing-region-setting section sets a processing region corresponding to a target pixel for each image set by the target-pixel-setting section based on the motion blur amount set in the motion-blur-amount-setting section and a motion direction corresponding to the first motion vector;
- wherein the pixel-value-generating section generates a pixel value that corresponds to the target pixel for each image by linear combination of a new pixel value for processing generated corresponding to the motion direction from the pixel value corresponding to the pixel in the processing region set for each image and the specific processing coefficient set in the processing-coefficient-setting section or by linear combination of the pixel value corresponding to the pixel in the processing region and the processing coefficient set corresponding to the motion blur amount and the motion direction of the target pixel; and
- wherein the integration section performs integration processing on the pixel value that is generated in the pixel-value-generating section and corresponds to the target pixel, for each image, and generates and outputs the single pixel value.

10. An image-processing apparatus comprising:
- a target-pixel-setting section that sets a target pixel in a target image to be predicted;
- a motion-vector-setting section that sets a motion vector corresponding to an image containing the input target pixel;
- a processing-region-setting section that sets a processing region containing a pixel in the peripheral images whose space positions roughly agree with that of the target pixel;
- a processing-coefficient-setting section that sets a specific processing coefficient based on the motion blur amount corresponding to the motion vector or sets a processing coefficient that corresponds to the motion blur amount and the motion direction that correspond to the motion vector;
- a pixel-value-generating section that generates a pixel value that corresponds to the target pixel by linear combination of a new pixel value for processing generated corresponding to the motion direction from the pixel value corresponding to the pixel in the processing region and the specific processing coefficient set in the processing-coefficient-setting section or by linear combination of the pixel value corresponding to the pixel in the processing region and the processing coefficient set corresponding to the motion blur amount and the motion direction; and
- an image-moving section that moves a processed image containing the pixel value generated in the pixel-value-generating section along a counter vector of the input motion vector.

11. An image-processing method comprising:
- a motion-vector-setting step of setting a first motion vector in units of pixel in a target image;
- an exposure-time-ratio-setting step of setting in units of image all exposure time ratio that is a ratio between a time interval of the target image and a period of exposure time;
- a motion-blur-amount-setting step of setting a motion blur amount in units of pixel based on the first motion vector set in units of pixel in the motion-vector-setting step and the exposure time ratio set in the exposure-time-ratio-setting step;
- a processing-region-setting step of setting a processing region corresponding to a target pixel in the target image based on the motion blur amount set in the motion-blur-amount-setting step and a motion direction corresponding to the first motion vector;
- a processing-coefficient-setting step of setting a specific processing coefficient based on the motion blur amount set in the motion-blur-amount-setting step or setting a processing coefficient that corresponds to the motion blur amount and the motion direction of the target pixel;
- a pixel-value-generating step that includes generating with a processor a pixel value that corresponds to the target pixel by linear combination of a new pixel value for processing generated corresponding to the motion direction from the pixel value corresponding to the pixel in the processing region and the specific processing coefficient set in the processing-coefficient-setting step or by linear combination of the pixel value corresponding to the pixel in the processing region and the processing coefficient set corresponding to the motion blur amount and the motion direction;
- a motion-blur-adding step of adding a motion blur in units of pixel to an image containing the pixel value generated by the pixel-value-generating step based on an input second motion vector and the first motion vector; and
- an image-moving step of moving the motion-blur-added target image, to which a motion blur is added in the motion-blur-adding step, along a counter vector of the second motion vector.

12. An image-processing method comprising:
- a target-pixel-setting step of setting a target pixel in a target image to be predicted;
- a motion-vector-setting step of setting a motion vector corresponding to an image containing the input target pixel;
- a processing-region-setting step of setting a processing region containing a pixel in the peripheral images whose space positions roughly agree with that of the target pixel;
- a processing-coefficient-setting step of setting a specific processing coefficient based on the motion blur amount corresponding to the motion vector or setting a processing coefficient that corresponds to the motion blur amount and the motion direction that correspond to the motion vector;
- a pixel-value-generating step that includes generating with a processor a pixel value that corresponds to the target pixel by linear combination of a new pixel value or processing generated corresponding to the motion direction from the pixel value corresponding to the pixel in the processing region and the specific processing coefficient set in the processing-coefficient-setting step or by linear combination of the pixel value corresponding to the pixel in the processing region and the processing coefficient set corresponding to the notion blur amount and the motion direction; and an image-moving step of moving a processed image containing the pixel value generated in the pixel-value-generating step along a counter vector of the input motion vector.

13. A computer memory having an image-processing program stored thereon with computer executable instructions that when executed by a processor performs:

a motion-vector-setting step of setting a first motion vector in units of pixel in a target image;

an exposure-time-ratio-setting step of setting in units of image an exposure with ratio that is a ratio between a time interval of the target image and a period of exposure time;

a motion-blur-amount-setting step of setting a motion blur amount in units of pixel based on the first motion vector set in units of pixel in the motion-vector-setting step and the exposure time ratio set in the exposure-time-ratio-setting step;

a processing-region-setting step of setting a processing region corresponding to a target pixel in the target image based on the motion blur amount se in the motion-blur-amount-setting step and a motion direction corresponding to the first motion vector;

a processing-coefficient-setting step of setting a specific processing coefficient based on the motion blur amount set in the motion-blur-amount-setting step or setting a processing coefficient that corresponds to the motion blur amount and the mot on direction of the target pixel;

a pixel-value-generating step of generating a pixel value that corresponds to the target pixel by linear combination of a new pixel value for processing generated corresponding to the motion direction from the pixel value corresponding to the pixel in the processing region and the specific processing coefficient set in the processing-coefficient-setting step or by linear combination of the pixel value corresponding to the pixel in the processing region and the processing coefficient set corresponding to the motion blur amount and the motion direction;

a motion-blur-adding step of adding a motion blur in units of pixel to an mage containing the pixel value generated by the pixel-value-generating step based on an input second motion vector and the first motion vector; and an image-moving step of moving the motion-blur-added target image, to which a motion blur is added in the motion-blur-adding step, along a counter vector of the second motion vector.

14. A computer memory having an image-processing program stored thereon with computer executable instructions that when executed by a processor performs:

a target-pixel-setting step of setting a target pixel in a target image to be predicted;

a motion-vector-setting step of setting a motion vector corresponding to an image containing the input target pixel;

a processing-region-setting step of setting a processing region containing a pixel in the peripheral images whose space positions roughly agree with that of the target pixel;

a processing-coefficient-setting step of setting a specific processing coefficient based on the motion blur amount corresponding to the motion vector or setting a processing coefficient that corresponds to the motion blur amount and the motion direction that correspond to the motion vector;

a pixel-value-generating step of generating a pixel value that corresponds to the target pixel by linear combination of a new pixel value for processing generated corresponding to the motion direction from the pixel value corresponding to the pixel in the processing region and the specific processing coefficient set in the processing-coefficient-setting step or by linear combination of the pixel value corresponding to the pixel in the processing region and the processing coefficient set corresponding to the motion blur amount and the motion direction; and an image-moving step of moving a processed image containing the pixel value generated in the pixel-value-generating step along a counter vector of the input motion vector.

* * * * *